(12) United States Patent
Fleming, Jr. et al.

(10) Patent No.: US 10,474,375 B2
(45) Date of Patent: Nov. 12, 2019

(54) RUNTIME ADDRESS DISAMBIGUATION IN ACCELERATION HARDWARE

(71) Applicant: INTEL CORPORATION, Santa Clara, CA (US)

(72) Inventors: Kermin Elliott Fleming, Jr., Hudson, MA (US); Simon C. Steely, Jr., Hudson, NH (US); Kent D. Glossop, Nashua, NH (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,049

(22) Filed: Dec. 30, 2016

(65) Prior Publication Data
US 2018/0188983 A1    Jul. 5, 2018

(51) Int. Cl.
*G06F 3/06*    (2006.01)
*G06F 12/00*   (2006.01)
(Continued)

(52) U.S. Cl.
CPC ............ *G06F 3/0619* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

| 672,177 A | 4/1901 | William |
|---|---|---|
| 5,560,032 A | 9/1996 | Nguyen et al. |

(Continued)

FOREIGN PATENT DOCUMENTS

| EP | 2854026 A1 | 4/2015 |
|---|---|---|
| EP | 2660716 A1 | 11/2016 |

(Continued)

OTHER PUBLICATIONS

Parashar et al., "LEAP: A Virtual Platform Architecture for FPGAs," Intel Corporation, 6 pages, 2010.
(Continued)

*Primary Examiner* — Edward J Dudek, Jr.
*Assistant Examiner* — Ralph A Verderamo, III
(74) *Attorney, Agent, or Firm* — Nicholson De Vos Webster & Elliott LLP

(57) ABSTRACT

An integrated circuit includes a processor to execute instructions and to interact with memory, and acceleration hardware, to execute a sub-program corresponding to instructions. A set of input queues includes a store address queue to receive, from the acceleration hardware, a first address of the memory, the first address associated with a store operation and a store data queue to receive, from the acceleration hardware, first data to be stored at the first address of the memory. The set of input queues also includes a completion queue to buffer response data for a load operation. A disambiguator circuit, coupled to the set of input queues and the memory, is to, responsive to determining the load operation, which succeeds the store operation, has an address conflict with the first address, copy the first data from the store data queue into the completion queue for the load operation.

24 Claims, 24 Drawing Sheets

(51) Int. Cl.
  *G06F 13/16* (2006.01)
  *G06F 9/38* (2018.01)
  *G06F 9/30* (2018.01)
(52) U.S. Cl.
  CPC ........ *G06F 9/30043* (2013.01); *G06F 9/3826* (2013.01); *G06F 9/3834* (2013.01); *G06F 12/00* (2013.01); *G06F 13/16* (2013.01)

(56) References Cited

U.S. PATENT DOCUMENTS

| | | | |
|---|---|---|---|
| 5,574,944 | A | 11/1996 | Stager |
| 5,581,767 | A | 12/1996 | Katsuki et al. |
| 5,787,029 | A | 7/1998 | De Angel |
| 5,805,827 | A | 9/1998 | Chau et al. |
| 5,930,484 | A | 7/1999 | Tran et al. |
| 6,020,139 | A | 2/2000 | Schwartz et al. |
| 6,088,780 | A | 7/2000 | Yamada et al. |
| 6,141,747 | A * | 10/2000 | Witt ................. G06F 9/3834 711/138 |
| 6,205,533 | B1 | 3/2001 | Margolus et al. |
| 6,314,503 | B1 | 11/2001 | D'Errico et al. |
| 6,393,454 | B1 | 5/2002 | Chu |
| 6,393,536 | B1 * | 5/2002 | Hughes ................. G06F 9/3834 711/118 |
| 6,604,120 | B1 | 8/2003 | De |
| 6,615,333 | B1 * | 9/2003 | Hoogerbrugge ...... G06F 9/3834 711/169 |
| 6,725,364 | B1 | 4/2004 | Crabill |
| 7,000,072 | B1 | 2/2006 | Aisaka et al. |
| 7,181,578 | B1 | 2/2007 | Guha et al. |
| 7,257,665 | B2 | 8/2007 | Niell et al. |
| 7,290,096 | B2 | 10/2007 | Jeter, Jr. et al. |
| 7,379,067 | B2 | 5/2008 | Deering et al. |
| 7,486,678 | B1 | 2/2009 | Devanagondi et al. |
| 7,509,484 | B1 | 3/2009 | Golla et al. |
| 7,546,331 | B2 | 6/2009 | Islam et al. |
| 7,630,324 | B2 | 12/2009 | Li et al. |
| 7,660,911 | B2 | 2/2010 | McDaniel |
| 7,911,960 | B1 | 3/2011 | Aydemir et al. |
| 7,987,479 | B1 | 7/2011 | Day |
| 8,001,510 | B1 | 8/2011 | Miller et al. |
| 8,010,766 | B2 | 8/2011 | Bhattacharjee et al. |
| 8,055,880 | B2 | 11/2011 | Fujisawa et al. |
| 8,156,284 | B2 | 4/2012 | Vorbach et al. |
| 8,160,975 | B2 | 4/2012 | Tang et al. |
| 8,225,073 | B2 | 7/2012 | Master et al. |
| 8,495,341 | B2 | 7/2013 | Busaba et al. |
| 8,561,194 | B2 | 10/2013 | Lee |
| 8,578,117 | B2 | 11/2013 | Burda et al. |
| 8,812,820 | B2 | 8/2014 | Vorbach et al. |
| 8,935,515 | B2 | 1/2015 | Colavin et al. |
| 8,966,457 | B2 | 2/2015 | Ebcioglu et al. |
| 8,990,452 | B2 | 3/2015 | Branson et al. |
| 9,026,769 | B1 | 5/2015 | Jamil et al. |
| 9,104,474 | B2 | 8/2015 | Kaul et al. |
| 9,135,057 | B2 | 9/2015 | Branson et al. |
| 9,170,846 | B2 | 10/2015 | Delling et al. |
| 9,213,571 | B2 | 12/2015 | Ristovski et al. |
| 9,268,528 | B2 | 2/2016 | Tannenbaum et al. |
| 9,473,144 | B1 | 10/2016 | Thiagarajan et al. |
| 9,594,521 | B2 | 3/2017 | Blagodurov et al. |
| 9,658,676 | B1 | 5/2017 | Witek et al. |
| 9,696,928 | B2 | 7/2017 | Cain, III et al. |
| 9,760,291 | B2 | 9/2017 | Beale et al. |
| 9,762,563 | B2 | 9/2017 | Davis et al. |
| 9,847,783 | B1 | 12/2017 | Teh et al. |
| 9,923,905 | B2 | 3/2018 | Amiri et al. |
| 9,946,718 | B2 | 4/2018 | Bowman et al. |
| 10,108,417 | B2 | 10/2018 | Krishna et al. |
| 10,187,467 | B2 | 1/2019 | Nagai |
| 2002/0026493 | A1 | 2/2002 | Scardamalia et al. |
| 2002/0090751 | A1 | 7/2002 | Grigg et al. |
| 2002/0178285 | A1 | 11/2002 | Donaldson et al. |
| 2002/0184291 | A1 | 12/2002 | Hogenauer |
| 2003/0023830 | A1 | 1/2003 | Hogenauer |
| 2003/0028750 | A1 | 2/2003 | Hogenauer |
| 2003/0163649 | A1 | 8/2003 | Kapur et al. |
| 2003/0177320 | A1 | 9/2003 | Sah et al. |
| 2003/0225814 | A1 | 12/2003 | Saito et al. |
| 2003/0233643 | A1 | 12/2003 | Thompson et al. |
| 2004/0001458 | A1 | 1/2004 | Dorenbosch et al. |
| 2004/0022094 | A1 | 2/2004 | Radhakrishnan et al. |
| 2004/0022107 | A1 | 2/2004 | Zaidi et al. |
| 2004/0124877 | A1 | 7/2004 | Parkes |
| 2004/0263524 | A1 | 12/2004 | Lippincott |
| 2005/0025120 | A1 | 2/2005 | O'Toole et al. |
| 2005/0076187 | A1 | 4/2005 | Claydon |
| 2005/0108776 | A1 * | 5/2005 | Carver ............... G06Q 30/0251 725/135 |
| 2005/0134308 | A1 | 6/2005 | Okada et al. |
| 2005/0138323 | A1 | 6/2005 | Snyder |
| 2005/0166038 | A1 | 7/2005 | Wang et al. |
| 2005/0172103 | A1 | 8/2005 | Inuo et al. |
| 2006/0041872 | A1 | 2/2006 | Poznanovic et al. |
| 2006/0130030 | A1 | 6/2006 | Kwiat et al. |
| 2006/0179255 | A1 | 8/2006 | Yamazaki |
| 2006/0179429 | A1 | 8/2006 | Eggers et al. |
| 2007/0011436 | A1 | 1/2007 | Bittner, Jr. et al. |
| 2007/0033369 | A1 | 2/2007 | Kasama et al. |
| 2007/0118332 | A1 | 5/2007 | Meyers et al. |
| 2007/0143546 | A1 | 6/2007 | Narad |
| 2007/0180315 | A1 | 8/2007 | Aizawa et al. |
| 2007/0203967 | A1 | 8/2007 | Dockser et al. |
| 2007/0226458 | A1 | 9/2007 | Stuttard et al. |
| 2007/0276976 | A1 | 11/2007 | Gower et al. |
| 2008/0082794 | A1 * | 4/2008 | Yu .......................... G06F 9/3824 712/218 |
| 2008/0133889 | A1 | 6/2008 | Glew |
| 2008/0133895 | A1 | 6/2008 | Sivtsov et al. |
| 2008/0184255 | A1 | 7/2008 | Watanabe et al. |
| 2008/0218203 | A1 | 9/2008 | Arriens et al. |
| 2008/0263330 | A1 | 10/2008 | May et al. |
| 2008/0270689 | A1 | 10/2008 | Gotoh |
| 2008/0307258 | A1 | 12/2008 | Challenger et al. |
| 2009/0013329 | A1 | 1/2009 | May et al. |
| 2009/0037697 | A1 * | 2/2009 | Ramani ................. G06F 9/3834 712/214 |
| 2009/0063665 | A1 | 3/2009 | Bagepalli et al. |
| 2009/0113169 | A1 | 4/2009 | Yang et al. |
| 2009/0119456 | A1 | 5/2009 | Park et al. |
| 2009/0175444 | A1 | 7/2009 | Douglis et al. |
| 2009/0182993 | A1 | 7/2009 | Fant |
| 2009/0300324 | A1 | 12/2009 | Inuo |
| 2009/0300325 | A1 | 12/2009 | Paver et al. |
| 2009/0309884 | A1 | 12/2009 | Lippincott et al. |
| 2009/0328048 | A1 | 12/2009 | Khan et al. |
| 2010/0017761 | A1 | 1/2010 | Higuchi et al. |
| 2010/0115168 | A1 | 5/2010 | Bekooij |
| 2010/0180105 | A1 | 7/2010 | Asnaashari |
| 2010/0191911 | A1 | 7/2010 | Heddes et al. |
| 2010/0217915 | A1 | 8/2010 | O'Connor et al. |
| 2010/0228885 | A1 | 9/2010 | McDaniel et al. |
| 2010/0262721 | A1 | 10/2010 | Asnaashari et al. |
| 2010/0302946 | A1 | 12/2010 | Yang et al. |
| 2011/0004742 | A1 | 1/2011 | Hassan |
| 2011/0008300 | A1 | 1/2011 | Wouters et al. |
| 2011/0040822 | A1 | 2/2011 | Eichenberger et al. |
| 2011/0083000 | A1 | 4/2011 | Rhoades et al. |
| 2011/0099295 | A1 | 4/2011 | Wegener |
| 2011/0107337 | A1 | 5/2011 | Cambonie et al. |
| 2011/0202747 | A1 | 8/2011 | Busaba et al. |
| 2011/0302358 | A1 | 12/2011 | Yu et al. |
| 2011/0314238 | A1 | 12/2011 | Finkler et al. |
| 2011/0320724 | A1 | 12/2011 | Mejdrich et al. |
| 2012/0017066 | A1 | 1/2012 | Vorbach et al. |
| 2012/0066483 | A1 | 3/2012 | Boury et al. |
| 2012/0079168 | A1 | 3/2012 | Chou et al. |
| 2012/0089812 | A1 | 4/2012 | Smith |
| 2012/0124117 | A1 | 5/2012 | Yu et al. |
| 2012/0126851 | A1 | 5/2012 | Kelem et al. |
| 2012/0174118 | A1 | 7/2012 | Watanabe et al. |
| 2012/0239853 | A1 | 9/2012 | Moshayedi |
| 2012/0260239 | A1 | 10/2012 | Martinez et al. |

(56) References Cited

U.S. PATENT DOCUMENTS

| | | |
|---|---|---|
| 2012/0278543 A1 | 11/2012 | Yu et al. |
| 2012/0278587 A1 | 11/2012 | Caufield et al. |
| 2012/0303932 A1 | 11/2012 | Farabet et al. |
| 2012/0303933 A1 | 11/2012 | Manet et al. |
| 2012/0317388 A1 | 12/2012 | Driever et al. |
| 2012/0324180 A1 | 12/2012 | Asnaashari et al. |
| 2012/0330701 A1 | 12/2012 | Hyder et al. |
| 2013/0024875 A1 | 1/2013 | Wang et al. |
| 2013/0036287 A1 | 2/2013 | Chu et al. |
| 2013/0067138 A1 | 3/2013 | Schuette et al. |
| 2013/0080652 A1 | 3/2013 | Cradick et al. |
| 2013/0080993 A1 | 3/2013 | Stravers et al. |
| 2013/0081042 A1 | 3/2013 | Branson et al. |
| 2013/0125127 A1 | 5/2013 | Mital et al. |
| 2013/0145203 A1 | 6/2013 | Fawcett et al. |
| 2013/0151919 A1 | 6/2013 | Huynh |
| 2013/0315211 A1 | 11/2013 | Balan et al. |
| 2014/0098890 A1 | 4/2014 | Sermadevi et al. |
| 2014/0115300 A1 | 4/2014 | Bodine |
| 2014/0188968 A1 | 7/2014 | Kaul et al. |
| 2014/0281409 A1* | 9/2014 | Abdallah ............ G06F 9/3834 712/216 |
| 2014/0380024 A1* | 12/2014 | Spadini ............ G06F 9/3834 712/217 |
| 2015/0007182 A1 | 1/2015 | Rossbach et al. |
| 2015/0026434 A1 | 1/2015 | Basant et al. |
| 2015/0033001 A1 | 1/2015 | Ivanov et al. |
| 2015/0067305 A1* | 3/2015 | Olson ............ G06F 9/3836 712/225 |
| 2015/0082011 A1 | 3/2015 | Mellinger et al. |
| 2015/0089162 A1 | 3/2015 | Ahsan |
| 2015/0089186 A1* | 3/2015 | Kim ............ G06F 12/0215 711/213 |
| 2015/0100757 A1 | 4/2015 | Burger et al. |
| 2015/0106596 A1 | 4/2015 | Vorbach et al. |
| 2015/0113184 A1 | 4/2015 | Stanford-Jason et al. |
| 2015/0261528 A1 | 9/2015 | Ho et al. |
| 2015/0317134 A1 | 11/2015 | Kim et al. |
| 2016/0098279 A1* | 4/2016 | Glew ............ G06F 9/3012 712/239 |
| 2016/0098420 A1 | 4/2016 | Dickie et al. |
| 2016/0239265 A1 | 8/2016 | Duong et al. |
| 2017/0031866 A1 | 2/2017 | Nowatzki et al. |
| 2017/0083313 A1 | 3/2017 | Sankaralingam et al. |
| 2017/0092371 A1 | 3/2017 | Harari |
| 2017/0163543 A1 | 6/2017 | Wang et al. |
| 2017/0255414 A1 | 9/2017 | Gerhart et al. |
| 2017/0262383 A1 | 9/2017 | Lee et al. |
| 2017/0286169 A1 | 10/2017 | Ravindran et al. |
| 2017/0293766 A1 | 10/2017 | Schnjakin et al. |
| 2017/0315815 A1 | 11/2017 | Smith et al. |
| 2017/0315978 A1 | 11/2017 | Boucher et al. |
| 2017/0371836 A1 | 12/2017 | Langhammer |
| 2018/0081806 A1* | 3/2018 | Kothinti Naresh ............ G06F 12/0815 |
| 2018/0081834 A1 | 3/2018 | Wang et al. |
| 2018/0088647 A1 | 3/2018 | Suryanarayanan et al. |
| 2018/0095728 A1 | 4/2018 | Hasenplaugh et al. |
| 2018/0188997 A1 | 7/2018 | Fleming, Jr. et al. |
| 2018/0189063 A1 | 7/2018 | Fleming et al. |
| 2018/0189231 A1 | 7/2018 | Fleming, Jr. et al. |
| 2018/0189239 A1 | 7/2018 | Nurvitadhi et al. |
| 2018/0189675 A1 | 7/2018 | Nurvitadhi et al. |
| 2018/0218767 A1 | 8/2018 | Wolff |
| 2018/0248994 A1 | 8/2018 | Lee et al. |
| 2018/0285385 A1 | 10/2018 | West et al. |
| 2018/0293162 A1 | 10/2018 | Tsai et al. |
| 2018/0300181 A1 | 10/2018 | Hetzel et al. |
| 2018/0373509 A1 | 12/2018 | Zhang et al. |
| 2019/0004878 A1 | 1/2019 | Adler et al. |
| 2019/0004945 A1 | 1/2019 | Fleming et al. |
| 2019/0004955 A1 | 1/2019 | Adler et al. |
| 2019/0004994 A1 | 1/2019 | Fleming et al. |
| 2019/0005161 A1 | 1/2019 | Fleming et al. |
| 2019/0007332 A1 | 1/2019 | Fleming et al. |
| 2019/0018815 A1 | 1/2019 | Fleming et al. |
| 2019/0042217 A1 | 2/2019 | Glossop et al. |
| 2019/0042218 A1 | 2/2019 | Zhang |
| 2019/0042513 A1 | 2/2019 | Fleming, Jr. et al. |
| 2019/0095369 A1 | 3/2019 | Fleming et al. |
| 2019/0095383 A1 | 3/2019 | Fleming et al. |
| 2019/0101952 A1 | 4/2019 | Diamond et al. |
| 2019/0102179 A1 | 4/2019 | Fleming et al. |
| 2019/0102338 A1 | 4/2019 | Tang et al. |
| 2019/0129720 A1 | 5/2019 | Ivanov |
| 2019/0205263 A1 | 7/2019 | Fleming et al. |
| 2019/0205269 A1 | 7/2019 | Fleming, Jr. et al. |
| 2019/0205284 A1 | 7/2019 | Fleming et al. |

FOREIGN PATENT DOCUMENTS

| | | |
|---|---|---|
| RU | 2374684 C1 | 11/2009 |
| WO | 2014035449 A1 | 3/2014 |
| WO | 2007/031696 A1 | 3/2017 |

OTHER PUBLICATIONS

Kim et al., "Energy-Efficient and High Performance CGRA-based Multi-Core Architecture," Journal of Semiconductor Technology and Science, vol. 14, No. 3, 16 pages, Jun. 2014.

Wikipedia, The Free Encyclopedia, "Priority encoder," https://en.wikipedia.org/w/index.php?title=Priority_encoder&oldid=746908667, 2 pages, revised Oct. 30, 2016.

Wikipedia, The Free Encyclopedia, "Truth table," Logical Implication Table, https://en.wikipedia.org/wiki/Truth_table#Logical_implication, 1 page, revised Nov. 18, 2016.

Williston, Roving Reporter, Intel® Embedded Alliance, "Roving Reporter: FPGA + Intel® Atom™ = Configurable Processor," 5 pages, Dec. 2010.

Fleming et al., U.S. Appl. No. 15/396,038, titled "Memory Ordering in Acceleration Hardware," 81 pages, filed Dec. 30, 2016.

European Search Report for European Application No. EP17207172.2, 14 pages, dated Oct. 1, 2018.

Corrected Notice of Allowance from U.S. Appl. No. 14/037,468, dated May 29, 2019, 12 pages.

Notice of Allowance from U.S. Appl. No. 15/640,533, dated May 22, 2019, 19 pages.

Notice of Allowance from U.S. Appl. No. 15/640,535, dated May 24, 2019, 19 pages.

Corrected Notice of Allowance from U.S. Appl. No. 15/396,395, dated Jun. 7, 2019, 8 pages.

Corrected Notice of Allowance from U.S. Appl. No. 15/721,802, dated Jun. 12, 2019, 11 pages.

International Search Report and Written Opinion for Application No. PCT/US2019/020270, dated Jun. 14, 2019, 11 pages.

International Search Report and Written Opinion for Application No. PCT/US2019/019965, dated Jun. 13, 2019, 9 pages.

International Search Report and Written Opinion for Application No. PCT/US2019/020287, dated Jun. 12, 2019, 9 pages.

Notice of Allowance from U.S. Appl. No. 15/640,534, dated May 31, 2019, 9 pages.

Notice of Allowance from U.S. Appl. No. 15/721,809, dated Jun. 6, 2019, 32 pages.

Notice of Allowance from U.S. Appl. No. 15/859,454, dated Jun. 7, 2019, 55 pages.

Notice of Allowance from U.S. Appl. No. 16/024,801, dated Jun. 5, 2019, 64 pages.

"Full Day Tutorial Held at MICRO-49," Oct. 15-19, 2016, retrieved from https://www.microarch.org/micro49/ on Feb. 14, 2019, 2 pages.

Govindaraju et al.,"DySER: Unifying Functionality and Parallelism Specialization for Energy-Efficient Computing," Published by the IEEE Computer Society, Sep./Oct. 2012, pp. 38-51.

Govindaraju V., et al., "Dynamically Specialized Datapaths for Energy Efficient Computing," 2011, In Proceedings of the 17th International Conference on High Performance Computer Architecture, 12 pages.

(56) References Cited

OTHER PUBLICATIONS

Han S., et al., "Deep Compression: Compressing Deep Neural Networks with Pruning, Trained Quantization and Huffman Coding," ICLR, Feb. 2016, 14 pages.
Han S., et al., "EIE: Efficient Inference Engine on Compressed Deep Neural Network," 43rd ACM/IEEE Annual International Symposium on Computer Architecture, ISCA 2016, Seoul, South Korea, Jun. 18-22, 2016, retrieved from eie-isca2016, spreadsheet, http://eyeriss.mit.edu/benchmarking.html, 7 pages.
Han S., et al., "EIE: Efficient Inference Engine on Compressed Deep Neural Network," ISCA, May 2016, 12 pages.
Hauser J.R., et al., "Garp: a MIPS processor with a Reconfigurable Coprocessor," Proceedings of the 5th Annual IEEE Symposium on Field-Programmable Custom Computing Machines, 1997, 10 pages.
Hoogerbrugge J., et al., "Transport-Triggering vs. Operation-Triggering," 1994, In Compiler Construction, Lecture Notes in Computer Science, vol. 786, Springer, pp. 435-449.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Ibrahim Eng., Walaa Abd El Aziz, "Binary Floating Point Fused Multiply Add Unit", Faculty of Engineering, Cairo University Giza, Egypt, 2012, 100 Pages.
Intel® Architecture, "Instruction Set Extensions and Future Features Programming Reference," 319433-034, May 2018, 145 pages.
Intel, "Intel® 64 and IA-32 Architectures Software Developer Manuals," Oct. 12, 2016, Updated—May 18, 2018, 19 pages.
International Preliminary Report on Patentability for Application No. PCT/RU2011/001049, dated Jul. 10, 2014, 6 pages.
International Preliminary Report on Patentability for Application No. PCT/US2017/050663, dated Apr. 11, 2019, 11 pages.
International Search Report and Written Opinion for Application No. PCT/RU2011/001049, dated Sep. 20, 2012, 6 pages.
International Search Report and Written Opinion received for PCT Patent Application No. PCT/US2017/050663, dated Dec. 28, 2017, 14 pages.
Kalte H., et al., "Context Saving and Restoring for Multitasking in Reconfigurable Systems," International Conference on Field Programmable Logic and Applications, Aug. 2005, pp. 223-228.
King M., et al., "Automatic Generation of Hardware/Software Interfaces," Proceedings of the 17th International Conference on Architectural Support for Programming Languages and Operating Systems, ASPLOS'12, Mar. 2012, 12 pages.
Knuth D.E., et al., "Fast Pattern Matching in Strings," Jun. 1977, SIAM Journal of Computing, vol. 6(2), pp. 323-350.
Lee T., et al., "Hardware Context-Switch Methodology for Dynamically Partially Reconfigurable Systems," Journal of Information Science and Engineering, vol. 26, Jul. 2010, pp. 1289-1305.
Lewis D., et al., "The Stratix™ 10 Highly Pipelined FPGA Architecture," FPGA 2016, Altera, Feb. 23, 2016, 26 pages.
Lewis D., et al., "The Stratix™ 10 Highly Pipelined FPGA Architecture," FPGA'16, ACM, Feb. 21-23, 2016, pp. 159-168.
Li S., et al., "Case Study: Computing Black-Scholes with Intel® Advanced Vector Extensions," Sep. 6, 2012, 20 pages.
Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.
Matsen F.A., et al., "The CMU warp processor," In Supercomputers: Algorithms, Architectures, and Scientific Computation, 1986, pp. 235-247.
McCalpin J.D., "Memory Bandwidth and Machine Balance in Current High Performance Computers," IEEE Computer Society Technical Committee on Computer Architecture (TCCA) Newsletter, Dec. 1995, 7 pages.
McCalpin J.D., "STREAM: Sustainable memory bandwidth in high performance computers," 2016, 4 pages.
Mei B., et al., "ADRES: An Architecture with Tightly Coupled VLIW Processor and Coarse-Grained Reconfigurable Matrix," 2003, In Proceedings of International Conference on Field-Programmable Logic and Applications, 10 pages.
Merrill D., et al., "Revisiting sorting for GPGPU stream architectures," In Proceedings of the 19th International Conference on Parallel Architectures and Compilation Techniques (PACT'10), Feb. 2010, 17 pages.
Mirsky E., at al., "MATRIX: A Reconfigurable Computing Architecture with Configurable Instruction Distribution and Deployable Resources," 1996, In Proceedings of the IEEE Symposium on FPGAs for Custom Computing Machines, pp. 157-166.
Natalie E.J., et al., "On-Chip Networks," Synthesis Lectures on Computer Architecture, Morgan and Claypool Publishers, 2009, 148 pages.
Non-Final Office Action from U.S. Appl. No. 14/037,468, dated Oct. 19, 2017, 19 pages.
Non-Final Office Action from U.S. Appl. No. 15/396,402, dated Nov. 1, 2018, 22 pages.
Non-Final Office Action from U.S. Appl. No. 15/640,540, dated Oct. 26, 2018, 8 pages.
Non-Final Office Action from U.S. Appl. No. 15/640,543, dated Jan. 2, 2019, 46 pages.
Non-Final Office Action from U.S. Appl. No. 15/396,038, dated Oct. 5, 2018, 38 pages.
Non-Final Office Action from U.S. Appl. No. 15/859,473, dated Oct. 15, 2018, 10 pages.
Non-Final Office Action from U.S. Appl. No. 13/994,582, dated Mar. 23, 2017, 9 pages.
Non-Final Office Action from U.S. Appl. No. 13/994,582, dated Feb. 7, 2018, 12 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Non-Final Office Action from U.S. Appl. No. 15/283,295, dated Apr. 30, 2018, 18 pages.
Non-Final Office Action from U.S. Appl. No. 15/396,395, dated Jul. 20, 2018, 18 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.
Non-Final Office Action from U.S. Appl. No. 15/640,535, dated May 15, 2018, 13 pages.
Non-Final Office Action from U.S. Appl. No. 15/640,541, dated Apr. 12, 2019, 61 pages.
Non-Final Office Action from U.S. Appl. No. 15/640,542, dated Apr. 2, 2019, 59 pages.
Non-Final Office Action from U.S. Appl. No. 15/719,285, dated Feb. 25, 2019, 47 pages.
Abandonment from U.S. Appl. No. 15/640,544, dated Mar. 20, 2018, 2 pages.
Advisory Action from U.S. Appl. No. 14/037,468, dated Aug. 11, 2017, 3 pages.
Arvind., et al., "Executing a Program on the MIT Tagged-Token Dataflow Architecture," Mar. 1990, IEEE Transactions on Computers, vol. 39 (3), pp. 300-318.
Asanovic K., et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.
Ball T., "What's in a Region? or Computing Control Dependence Regions in Near-Linear Time for Reducible Control Flow," Dec. 1993, ACM Letters on Programming Languages and Systems, 2(1-4):1-16, 24 pages.
"Benchmarking DNN Processors," Nov. 2016, 2 pages.
Bluespec, "Bluespec System Verilog Reference Guide," Jun. 16, 2010, Bluespec, Inc, 453 pages.

(56) References Cited

OTHER PUBLICATIONS

Bohm I., "Configurable Flow Accelerators," Mar. 3, 2016, XP055475839. retrieved from http://groups.inf.ed.ac.uk/pasta/rareas_cfa.html on Oct. 25, 2018, 3 pages.
Burger D., et al., "Scaling to the End of Silicon with EDGE Architectures," Jul. 12, 2004, vol. 37 (7), pp. 44-55.
Canis A., et al., "LegUp: An Open-Source High-Level Synthesis Tool for FPGA-Based Processor/Accelerator Systems," ACM Transactions on Embedded Computing Systems, vol. 1(1), Article 1, Jul. 2012, 25 pages.
Carloni L.P., et al., "The Theory of Latency Insensitive Design," Sep. 2001, IEEE Transactions on Computer-Aided Design of Integrated Circuits and Systems, vol. 20 (9), 18 pages.
Chandy K.M., et al., "Parallel Program Design: A Foundation," Addison-Wesley Publishing Company, Aug. 1988, 552 pages.
Chen Y., et al., "Eyeriss: A Spacial Architecture for Energy-Efficient Dataflow for Convolutional Neural Networks," Jun. 2016, 53 pages.
Chen Y., et al., "Eyeriss: A Spacial Architecture for Energy-Efficient Dataflow for Convolutional Neural Networks," International Symposium on Computer Architecture (ISCA), Jun. 2016, pp. 367-379.
Chen Y., et al., "Eyeriss: An Energy-Efficient Reconfigurable Accelerator for Deep Convolutional Neural Networks," IEEE International Conference on Solid-State Circuits (ISSCC), Feb. 2016, pp. 262-264.
Chen Y., et al., "Eyeriss: An Energy-Efficient Reconfigurable Accelerator for Deep Convolutional Neural Networks," IEEE International Solid-State Circuits Conference, ISSCC, 2016, 9 pages.
Chen Y., et al., "Eyeriss: An Energy-Efficient Reconfigurable Accelerator for Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.
Chen Y., et al., "Eyeriss v2: A Flexible and High-Performance Accelerator for Emerging Deep Neural Networks," Jul. 2018, 14 pages.
Chen Y., et al., "Understanding the Limitations of Existing Energy-Efficient Design Approaches for Deep Neural Networks," Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Chen Y.H., et al., "Eyeriss: An Energy-Efficient Reconfigurable Accelerator for Deep Convolutional Neural Networks," 2016 IEEE International Solid-State Circuits Conference (ISSCC), Jan. 2016, 12 pages.
Compton K., et al., "Reconfigurable Computing: A Survey of Systems and Software," ACM Computing Surveys, Jun. 2002, vol. 34 (2), pp. 171-210.
Cong J., et al., "Supporting Address Translation for Accelerator-Centric Architectures," Feb. 2017, IEEE International Symposium on High Performance Computer Architecture (HPCA), 12 pages.
"Coral Collaboration: Oak Ridge, Argonne, Livermore," Benchmark codes, downloaded from https://asc.llnl.gov/CORAL-benchmarks/ on Nov. 16, 2018, 6 pages.
Corrected Notice of Allowance from U.S. Appl. No. 14/037,468, dated Apr. 1, 2019, 10 pages.
Corrected Notice of Allowance from U.S. Appl. No. 15/640,534, dated Apr. 26, 2019, 21 pages.
Corrected Notice of Allowance from U.S. Appl. No. 15/640,535, dated Feb. 13, 2019, 7 pages.
Corrected Notice of Allowance from U.S. Appl. No. 15/721,802, dated Dec. 18, 2018, 8 pages.
Dally W.J., et al., "Principles and Practices of Interconnection Networks," Morgan Kaufmann, 2003, 584 pages.
Dennis J.B., et al., "A Preliminary Architecture for a Basic Data-Flow Processor," 1975, In Proceedings of the 2nd Annual Symposium on Computer Architecture, pp. 125-131.
Dijkstra E.W., "Guarded Commands, Nondeterminacy and Formal Derivation of Programs," Aug. 1975, Communications of the ACM, vol. 18 (8), pp. 453-457.

Eisenhardt S., et al., "Optimizing Partial Reconfiguration of Multi-Context Architectures," Dec. 2008, 2008 International Conference on Reconfigurable Computing and FPGAs, 6 pages.
Emer J., et al., "Asim: A Performance Model Framework," Feb. 2002, Computer, vol. 35 (2), pp. 68-76.
Emer J., et al., "Hardware Architectures for Deep Neural Networks at CICS/MTL Tutorial," Mar. 27, 2017, 258 pages.
Emer J., et al., "Hardware Architectures for Deep Neural Networks at ISCA Tutorial," Jun. 24, 2017, 290 pages.
Emer J., et al., "Hardware Architectures for Deep Neural Networks at MICRO-49 Tutorial," Oct. 16, 2016, 300 pages.
Emer J., et al., "Tutorial on Hardware Architectures for Deep Neural Networks," Nov. 2016, 8 pages.
Emer J.S., et al., "A Characterization of Processor Performance in the VAX-11/780," In Proceedings of the 11th Annual International Symposium on Computer Architecture, Jun. 1984, vol. 12 (3), pp. 274-283.
Extended European Search Report for Application No. 17210484.6, dated May 29, 2018, 8 pages.
Final Office Action from U.S. Appl. No. 13/994,582, dated Oct. 3, 2017, 11 pages.
Final Office Action from U.S. Appl. No. 14/037,468, dated Jun. 1, 2017, 18 pages.
Final Office Action from U.S. Appl. No. 14/037,468, dated Jun. 15, 2018, 7 pages.
Final Office Action from U.S. Appl. No. 14/037,468, dated May 16, 2016, 24 pages.
Final Office Action from U.S. Appl. No. 14/037,468, dated Oct. 5, 2016, 17 pages.
Final Office Action from U.S. Appl. No. 15/396,038, dated Mar. 11, 2019, 36 pages.
Final Office Action from U.S. Appl. No. 15/396,402, dated May 17, 2019, 85 pages.
Final Office Action from U.S. Appl. No. 15/721,809, dated Dec. 26, 2018, 46 pages.
Final Office Action from U.S. Appl. No. 15/859,473, dated Feb. 26, 2019, 13 pages.
Fleming K., et al., "Leveraging Latency-Insensitivity to Ease Multiple FPGA Design," In Proceedings of the ACM/SIGDA International Symposium on Field Programmable Gate Arrays, FPGA'12, Feb. 22-24, 2012, pp. 175-184.
Fleming K.E., et al., "Leveraging Latency-Insensitive Channels to Achieve Scalable Reconfigurable Computation," Feb. 2013, 197 pages.
Yang T., et al., "Deep Neural Network Energy Estimation Tool," IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al ., "A Method to Estimate the Energy Consumption of Deep Neural Networks," Asilomar Conference on Signals, Systems and Computers, Oct. 2017, 5 pages.
Yang T., et al ., "Designing Energy-Efficient Convolutional Neural Networks using Energy-Aware Pruning," IEEE Conference on Computer Vision and Pattern Recognition (CVPR), Jul. 2017, 9 pages.
Yang T., et al., "Designing Energy-Efficient Convolutional Neural Networks using Energy-Aware Pruning," IEEE Conference on Computer Vision and Pattern Recognition CVPR 2017, Jul. 21-26, 2017, retrieved from http://www.rle.mit.edu/eems/wp-content/uploads/2017/07/2017_cvpr_poster.pdf on Feb. 21, 2019, 1 page.
Yang T., et al., "Designing Energy-Efficient Convolutional Neural Networks using Energy-Aware Pruning," IEEE CVPR, Mar. 2017, 6 pages.
Yang T., et al., "NetAdapt: Platform-Aware Neural Network Adaptation for Mobile Applications," European Conference on Computer Vision (ECCV), Version 2, Sep. 28, 2018, 16 pages.
Ye Z.A., et al., "CHIMAERA: A High-Performance Architecture with a Tightly-Coupled Reconfigurable Functional Unit," Proceedings of the 27th International Symposium on Computer Architecture (ISCA'00), 2000, 11 pages.

(56) References Cited

OTHER PUBLICATIONS

Yu Z., et al., "An Asynchronous Array of Simple Processors for DSP Applications," IEEE International Solid-State Circuits Conference, ISSCC'06, Feb. 8, 2006, 10 pages.
Non-Final Office Action from U.S. Appl. No. 15/721,802, dated Mar. 8, 2018, 8 pages.
Non-Final Office Action from U.S. Appl. No. 15/721,809, dated Jun. 14, 2018, 12 pages.
Non-Final Office Action from U.S. Appl. No. 15/855,964, dated Dec. 13, 2018, 13 pages.
Notice of Allowance from U.S. Appl. No. 15/283,295, dated Jan. 3, 2019, 7 pages.
Notice of Allowance from U.S. Appl. No. 15/640,534, dated Jan. 4, 2019, 37 pages.
Notice of Allowance from U.S. Appl. No. 15/721,802, dated Nov. 30, 2018, 30 pages.
Notice of Allowance from U.S. Appl. No. 15/640,533, dated Oct. 10, 2018, 8 pages.
Notice of Allowance from U.S. Appl. No. 15/640,535, dated Oct. 9, 2018, 7 pages.
Notice of Allowance from U.S. Appl. No. 15/640,538, dated Oct. 17, 2018, 10 pages.
Notice of Allowance from U.S. Appl. No. 13/994,582, dated Aug. 7, 2018, 8 pages.
Notice of Allowance from U.S. Appl. No. 14/037,468, dated Aug. 28, 2018, 9 pages.
Notice of Allowance from U.S. Appl. No. 14/037,468, dated Mar. 7, 2019, 51 pages.
Notice of Allowance from U.S. Appl. No. 15/283,295, dated Apr. 10, 2019, 49 pages.
Notice of Allowance from U.S. Appl. No. 15/396,395, dated Dec. 28, 2018, 36 pages.
Notice of Allowance from U.S. Appl. No. 15/396,395, dated May 15, 2019, 23 pages.
Notice of Allowance from U.S. Appl. No. 15/640,533, dated Feb. 14, 2019, 43 pages.
Notice of Allowance from U.S. Appl. No. 15/640,534, dated Apr. 2, 2019, 9 pages.
Notice of Allowance from U.S. Appl. No. 15/640,534, dated Sep. 12, 2018, 7 pages.
Notice of Allowance from U.S. Appl. No. 15/640,535, dated Feb. 6, 2019, 38 pages.
Notice of Allowance from U.S. Appl. No. 15/640,540, dated Mar. 14, 2019, 39 pages.
Notice of Allowance from U.S. Appl. No. 15/719,281, dated Jan. 24, 2019, 36 pages.
Notice of Allowance from U.S. Appl. No. 15/721,802, dated Jul. 31, 2018, 6 pages.
Notice of Allowance from U.S. Appl. No. 15/721,802, dated Mar. 18, 2019, 23 pages.
Notice of Allowance from U.S. Appl. No. 15/855,964, dated Apr. 24, 2019, 15 pages.
Notice of Allowance from U.S. Appl. No. 15/859,466, dated May 17, 2019, 56 pages.
Panesar G., et al., "Deterministic Parallel Processing," International Journal of Parallel Programming, Aug. 2006, vol. 34 (4), pp. 323-341.
Parashar A., et al., "Efficient Spatial Processing Element Control via Triggered Instructions," IEEE Micro, vol. 34 (3), Mar. 10, 2014, pp. 120-137.
Pellauer M., et al., "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Raaijmakers S., "Run-Time Partial Reconfiguration on the Virtex-11 Pro," 2007, 69 pages.
Schmit H., et al., "PipeRench: A Virtualized Programmable Datapath in 0.18 Micron Technology," 2002, IEEE 2002 Custom Integrated Circuits Conference, pp. 63-66.
Shin T., et al., "Minimizing Buffer Requirements for Throughput Constrained Parallel Execution of Synchronous Dataflow Graph," ASPDAC '11 Proceedings of the 16th Asia and South Pacific Design Automation Conference, Jan. 2011, 6 pages.
Smith A., et al., "Compiling for EDGE Architectures," Appears in the Proceedings of the 4th International Symposium on code Generation and Optimization, 2006, 11 pages.
Smith A., et al., "Dataflow Predication," 2006, In Proceedings of the 39th Annual IEEE/ACM International Symposium on Microarchitecture, 12 pages.
Suleiman A., et al., "Towards Closing the Energy Gap Between HOG and CNN Features for Embedded Vision," IEEE International Symposium of Circuits and Systems (ISCAS), May 2017, 4 pages.
Swanson S., et al., "The WaveScalar Architecture," May 2007, ACM Transactions on Computer Systems, vol. 25 (2), Article No. 4, 35 pages.
Sze V., "Designing Efficient Deep Learning Systems," in Mountain View, CA, Mar. 27-28, 2019, retrieved from https://professional.mit.edu/programs/short-programs/designing-efficient-deep-learning-systems-OC on Feb. 14, 2019, 2 pages.
Sze V., et al., "Efficient Processing of Deep Neural Networks: A Tutorial and Survey," Mar. 2017, 32 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities," IEEE Custom Integrated Circuits Conference (CICC), Oct. 2017, 9 pages.
Taylor M.B., et al., "The Raw Microprocessor: A Computational Fabric for Software Circuits and General-Purpose Programs," 2002, IEEE Micro, vol. 22 (2), pp. 25-35.
"The LLVM Compiler Infrastructure," retrieved from http://www.llvm.org/, on May 1, 2018, maintained by the llvm-admin team, 4 pages.
Truong D.N., et al., "A 167-Processor Computational Platform in 65 nm CMOS," IEEE Journal of Solid-State Circuits, Apr. 2009, vol. 44 (4), pp. 1130-1144.
"Tutorial at Micro-50," The 50th Annual IEEE/ACM International Symposium on Microarchitecture, Oct. 14-18, 2017, retrieved from https://www.microarch.org/micro50/ on Feb. 14, 2019, 3 pages.
"Tutorial on Hardware Architectures for Deep Neural Networks at ISCA 2017," The 44th International Symposium on Computer Architecture, Jun. 24-28, 2017, retrieved from http://isca17.ece.utoronto.ca/doku.php on Feb. 14, 2019, 2 pages.
Van De Geijn R.A., et al., "SUMMA: Scalable Universal Matrix Multiplication Algorithm," 1997, 19 pages.
Vijayaraghavan M., et al., "Bounded Dataflow Networks and Latency-Insensitive Circuits," In Proceedings of the 7th IEEE/ACM International Conference on Formal Methods and Models for Codesign (MEMOCODE'09), Jul. 13-15, 2009, pp. 171-180.
Wikipedia, "TRIPS Architecture," retrieved from https://en.wikipedia.org/wiki/TRIPS_architecture on Oct. 14, 2018, 4 pages.
Corrected Notice of Allowance from U.S. Appl. No. 15/855,964, dated Jun. 25, 2019, 7 pages.
Corrected Notice of Allowance from U.S. Appl. No. 15/640,534, dated Jul 2, 2019, 12 pages.
Final office action from U.S. Appl. No. 15/640,542, dated Aug. 7, 2019, 46 pages.
International Search Report and Written Opinion for Application No. PCT/US2019/020243, dated Jun. 19, 2019, 11 pages.
Non-Final office action from U.S. Appl. No. 16/236,423, dated Aug. 21, 2019, 75 pages.
Notice of Allowance from U.S. Appl. No. 15/640,535, dated Jun. 21, 2019, 8 pages.
Notice of Allowance from U.S. Appl. No. 15/396,395, dated Aug. 7, 2019, 12 pages.
Notice of Allowance from U.S. Appl. No. 15/640,535, dated Aug. 21, 2019, 13 pages.
Notice of Allowance from U.S. Appl. No. 15/640,541, dated Aug. 13, 2019, 19 pages.

(56) References Cited

OTHER PUBLICATIONS

Notice of Allowance from U.S. Appl. No. 15/640,538, dated Jul. 3, 2019, 76 pages.
Notice of Allowance from U.S. Appl. No. 15/640,540, dated Jul. 1, 2019, 36 pages.
Notice of Allowance from U.S. Appl. No. 15/640,543, dated Jul. 29, 2019, 43 pages.
Notice of Allowance from U.S. Appl. No. 15/719,285, dated Jul. 23, 2019, 26 pages.

* cited by examiner

| | Input Queue ID | Output Queue ID | Depedency Queue ID | MemOp | Use CAM? |
|---|---|---|---|---|---|
| Logical | Channel 0 — 610 | Compl. Chan. 1 — 620 | DepIn: Channel B0<br>DepOut: Counter C0 — 630 | Load — 640 | Yes — 645 |
| Binary (provisional) | 001 | 010 | 1000/0001 | 00 | 1 |

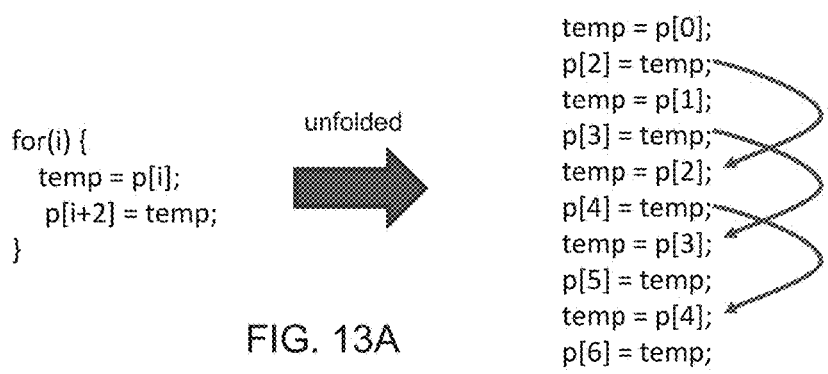
FIG. 13A
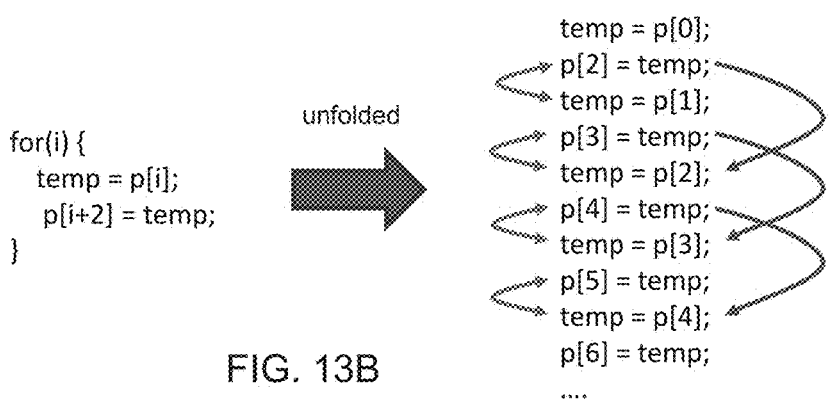
FIG. 13B
| | Inputs | Outputs | Control | MemOp | Use CAM? |
|---|---|---|---|---|---|
| Logical | Channel 0 | Compl. Chan. 1 | DepIn: Counter C0 DepOut: Counter C1 | Load | Yes |
| | Channel 1 Channel 2 | None | DepIn: Counter C1 DepOut: Counter C0 | Store | Yes |
FIG. 14A

FIG. 15C

| Counter_0 | 0 |
|---|---|
| Counter_1 | 1 |

| p[2] | 0 |
|---|---|
|  |  |
|  |  |
|  |  |
|  |  |
|  |  |
|  |  |

CAM

*Incoming Value*
Outgoing Value
Scheduled Value

| Load Addr. | Store Addr. | Store Data | Compl. Queue 0 | |
|---|---|---|---|---|
| p[1] | p[2] |  | 1 | 0 |
| *p[2]* | p[3] |  |  |  |
|  | *p[4]* |  |  |  |
|  |  |  |  |  |
|  |  |  |  |  |
|  |  |  |  |  |
|  |  |  |  |  |

FIG. 15D

| Counter_0 | 1 |
|---|---|
| Counter_1 | 0 |

| p[2] | [0] |
|---|---|
|  |  |
|  |  |
|  |  |
|  |  |
|  |  |

CAM

*Incoming Value*
Outgoing Value
Scheduled Value

| Load Addr. | Store Addr. | Store Data | Compl. Queue 0 | |
|---|---|---|---|---|
| p[1] | p[2] |  | 1 | 0 |
| p[2] | p[3] |  | 0 |  |
| *p[3]* | p[4] |  |  |  |
|  | *p[5]* |  |  |  |
|  |  |  |  |  |
|  |  |  |  |  |
|  |  |  |  |  |

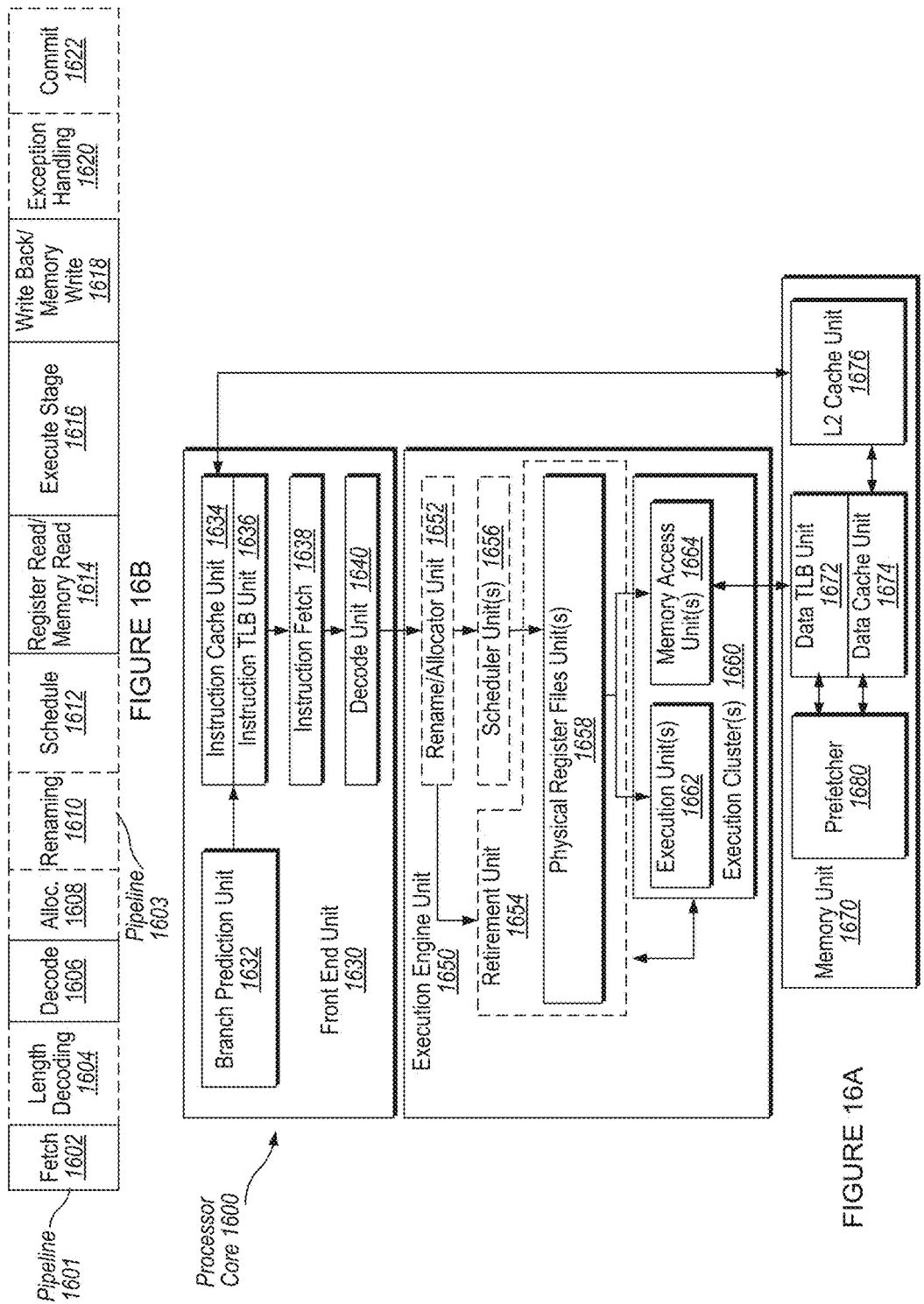

US 10,474,375 B2

RUNTIME ADDRESS DISAMBIGUATION IN ACCELERATION HARDWARE

FEDERALLY SPONSORED RESEARCH OR DEVELOPMENT

This invention was made with Government support under contract number H98230-13-D-0124 awarded by the Department of Defense. The Government has certain rights in the invention.

TECHNICAL FIELD

The present disclosure relates to the acceleration hardware, and in particular, to runtime address disambiguation in acceleration hardware such as spatial arrays.

BACKGROUND

Acceleration hardware refers to devices that speed up data communications, storage and retrieval, encryption and decryption, mathematical operations, graphics, Web page viewing, and the like. Acceleration hardware may include individual integrated circuit (also called an IC or chip), a printed circuit card, or a self-contained system. A few examples of acceleration hardware include a network access accelerator (NAS), a graphics accelerator, and a floating point accelerator (FPA). In one embodiment, acceleration hardware is instantiated as spatial architecture, which is energy efficient and a high-performance means of accelerating user applications in computing systems using spatial arrays. A spatial architecture includes an array of processing components, such as gates in a Field Programmable Gate Array (FPGA) or other processing elements (PE).

BRIEF DESCRIPTION OF THE DRAWINGS

FIG. 8 is a block diagram of an exemplary load instruction, both logical and in binary, according to an embodiment of the present disclosure.

FIG. 13A is flow diagram illustrating logical execution of an example code, according to an embodiment of the present disclosure.

FIG. 13B is the flow diagram of FIG. 9A, illustrating memory-level parallelism in an unfolded version of the example code, according to an embodiment of the present disclosure.

FIG. 14A is a block diagram of exemplary memory arguments for a load operation and for a store operation, according to an embodiment of the present disclosure.

FIGS. 15A, 15B, 15C, 15D, 15E, 15F, 15G, 15H, and 15I are block diagrams illustrating functional flow of load operations and store operations for an exemplary program through queues and the disambiguator circuit of the microarchitecture of FIG. 14B, according to an embodiment of the present disclosure.

FIG. 16A is a block diagram illustrating an in-order pipeline and a register renaming stage, out-of-order issue/execution pipeline according to one embodiment.

FIG. 16B is a block diagram illustrating a micro-architecture for a processor or an integrated circuit that includes the memory subsystem and the acceleration hardware of FIGS. 1A-1B, according to an embodiment of the present disclosure.

DESCRIPTION OF EMBODIMENTS

Figure 1A:
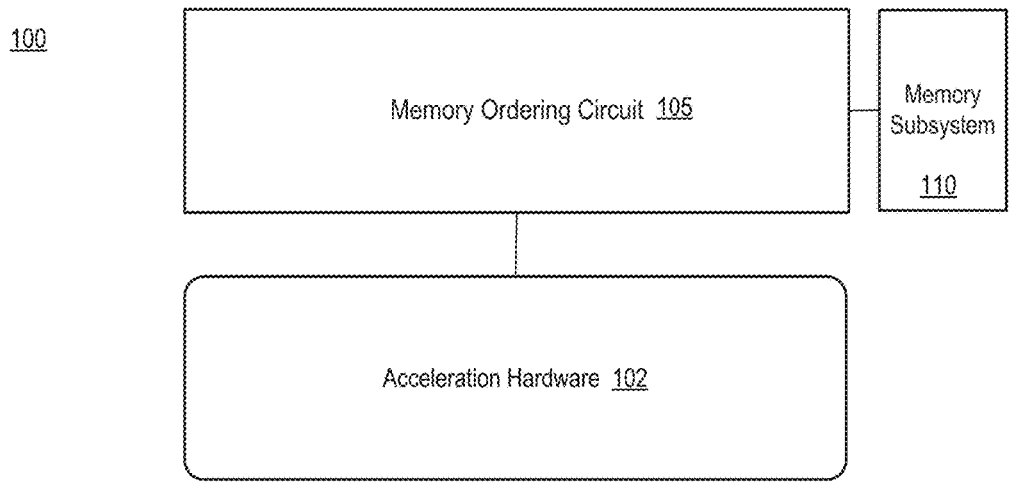
FIG. 1A is a block diagram of a system that employs a memory ordering circuit interposed between a memory subsystem and acceleration hardware, according to an embodiment of the present disclosure.

Disclosed is architecture for describing memory ordering dependencies within acceleration hardware. As discussed, one example of acceleration hardware is spatial computing fabric ("spatial fabric"), such as exists in a Field Programmable Gate Array (FPGA), in a Loop-Processing Unit (LPU), or the like. A challenge faced by such architectures is the mapping of a broad set of existing sequential or partially parallel applications to the spatial array, which is distributed by nature and highly parallel. The main difficulty in performing this mapping is the automatic parallelization of memory accesses in legacy programs due to a centralized, largely sequential memory model present in legacy programming environments.

Consider, for example, the following code:

```
for (i) {
    p[f(i)] = p[g(i)];
}
```

In general, compilers cannot prove that f(i) is not the same as g(i), either for the same value of i or different values of i across loop bodies. This is known as pointer or memory aliasing. To generate statically correct code, compilers are usually forced to serialize the accesses to the array, p. However, it is often the case at runtime that f(i) and g(i) are not equal, giving an opportunity to obtain dynamic parallelism in hardware. In spatial architectures, however, no mechanisms exist to check for and exploit dependencies that facilitate exploiting parallelism that may arise during code execution.

The disclosed architecture provides flexibility and parallelism within runtime microarchitecture, while preserving memory semantics of an original sequential program, including preservation of dependencies between memory operations that should occur in a certain order. The disclosed microarchitecture, for example, enables parallelization and acceleration of legacy sequential codes within acceleration hardware, facilitating the acceleration of software applications.

In one embodiment, an integrated circuit includes memory ordering circuitry coupled to a memory subsystem and to acceleration hardware, which may include a patchwork of processing components. A processor executing corresponding instructions may request memory operations to the memory subsystem out of program order. The memory ordering circuitry of the disclosed architecture may ensure that, as the acceleration hardware executes a sub-program corresponding to instructions of a program, results of corresponding memory operations are ordered in sequential order of the program. To ensure memory operations are scheduled and executed in program order, the memory ordering circuitry may include a directed logical channel formed between predecessor and successor memory operations, and a dependency token may be passed in association with an address within this channel to indicate dependency to a subsequent memory operation. A directed logical channel may be referred to as queue herein, which may be implemented with various hardware structures as will be explained. The location within this logical channel and of an associated dependency token may be tracked, depending on operation type, using memory arguments within queued memory operations.

For example, the memory ordering circuitry may queue the memory operations in an operations queue. The memory ordering circuitry may also receive, from the acceleration hardware in an input queue, addresses in whatever order the acceleration hardware executes and delivers the addresses for the memory operations. For example, for a load operation, a load address queue may receive an address from which to retrieve data from the memory. Similarly, for a store operation, a store address queue may receive an address to which to write data to the memory, and a store data queue to buffer data to be written to that address. By separating the buffering of addresses from the buffering of data, store operations may be performed in two phases: first to schedule a store operation to a particular address, and second, to request the store operation upon receipt of the data to be stored.

Furthermore, disclosed architecturally-defined memory operations may be capable of honoring memory ordering constraints through the manipulation of dependency tokens. Use of dependency tokens may ensure retention of data dependency of a memory operation within a program with a preceding memory operation. A memory operation may trigger generation of a dependency token upon the result of the operation becoming available to other memory operations. This generation may include the option of passing on a dependency token received from a preceding memory operation, such as duplication of that dependency token. These tokens are then passed to program-subsequent memory operations in a spatial execution graph representing the program. Upon the reception of a dependency token from a preceding memory operation, the subsequent operation is enabled for scheduling. In one embodiment, a counter may be used to track how many dependency tokens have been generated for any given channel, e.g., providing a compact representation of a queue. A counter that saturates, and thus cannot provide an additional unique token to those already passed to pending memory operations, may trigger a stall in scheduling an immediately preceding operation. The ordering of memory operations produced by a compiler, or the program memory graph (or hand-assembled code), ensures that program memory order is honored within parallel-executing acceleration hardware such as spatial fabric.

Accordingly, as a dependency token is received from the acceleration hardware with an incoming address in the memory, the ordering of an associated memory operation may be scheduled and ultimately executed in program order. In one example, a dependency exists between a store operation and a preceding load operation when the store is to the same address in memory as the load operation. A dependency token may be generated (or duplicated) to be passed with the load operation, so that ordering circuitry may schedule completion of the load operation (that carries the dependency token) before that of the store operation. Ordering the store operation before the load operation in this example may avoid the scenario in which the store operation eliminates existing data before the load operation has a chance to read the existing data. Similarly, a dependency may exist between a load operation and a prior store operation to the same address in memory. In this case, the prior store operation may need to complete writing to the address before the load operation can read the correct data from that same address. Furthermore, load-load and store-store dependencies may also exist for which dependency tokens may facilitate in-order scheduling and completion of serial load operations or serial store operations, respectively.

In one embodiment, the disclosed microarchitecture may include a memory interface coupled to a memory subsystem, which includes a memory to store data corresponding to instructions being executed for a program. The microarchitecture may also include an operations queue to buffer memory operations corresponding to the instructions, and a acceleration hardware of processing components that are to execute the sub-program corresponding to the instructions. The microarchitecture may also include a set of input queues coupled to the acceleration hardware, including a store address queue, a store data queue, a load address queue, and associated dependency queues or counters. The store address queue may receive, from the acceleration hardware, a store address of the memory that is associated with a store operation. The store data queue may receive, from the acceleration hardware, data to be stored at the store address of the memory. The microarchitecture may also include a completion queue to buffer response data for load operations, and a load address queue in which to receive a load address for a load operation. When a load response is received from the memory, data of the load response may be stored in an in-order next slot of the completion queue, which may then be sent out to the acceleration hardware with any dependency token.

The microarchitecture may further include a disambiguator circuit that may provide a means by which the microarchitecture may check for address conflicts as early as possible during scheduling of memory operations, even before data is available for those memory operations. For example, the disambiguator circuit may store prior program-order memory accesses in a disambiguator queue, which may be queried for the presence of a particular address. The disambiguator circuit may be implemented, for example, as a content-address memory (CAM) or a counting Bloom filter, which will be discussed in more detail. In one embodiment, a scheduler circuit may query, in program order and on behalf of a succeeding memory operation, the disambiguator circuit to determine whether there exists an address conflict with that succeeding memory operation. A succeeding memory operation is one that semantically follows and a preceding memory operation is one that semantically comes before. This early checking of address conflicts may improve both memory latency and throughput, as memory operations can be issued in parallel (provided no address conflict) and without suffering the latency of serialized memory access.

So, for example, assuming the above-referenced store operation precedes the load operation in a program, and the store operation has been queued in the CAM, the scheduler circuit may query the disambiguator circuit to determine whether the load address matches the store address. The disambiguator circuit may then, responsive to determining that the load address is not the same as the store address, trigger the scheduler circuit to proceed with issuing the load operation to the memory. In contrast, the disambiguator circuit may, responsive to determining that the load address is the same as the store address, and thus conflicts, copy the data from the store data queue into the completion queue for the load operation, to perform "store forwarding" of the data for the load operation.

To perform this data forwarding, in one embodiment, the disambiguator circuit may buffer the data from the store address queue (once received) and thus may directly forward the data to the completion queue. Alternatively, or additionally, the disambiguator circuit may store an entry into the disambiguation queue that includes the store address and a pointer that points to the location at which the store data queue will receive the data. Upon the scheduler circuit querying the disambiguator circuit, the scheduler circuit may mark, with the pointer, the load operation as a store forward, so that the scheduler circuit may perform the data forwarding from the store data queue to the completion queue in response to the store data queue receiving the data. The pointer may be a type of second dependency token, which may be associated with an index into the store data queue.

Furthermore, the scheduler circuit may schedule the succeeding load operation for completion once the store operation has been scheduled, and there is a load address available for the succeeding load operation. In one embodiment, the scheduler circuit schedules the succeeding load operation by annotating an indexed slot of the completion queue with the location of the pointer into the store data queue. The completion queue, in this way, knows to retrieve data to complete the load operation from the location in the store data queue. The load operation may then complete, without sending a request to memory, once the data arrives in the store data queue and is forwarded to the completion queue. This type of store forwarding saves time (in processing cycles), ensures correct program order in issuing memory operations, and therefore, improves both memory latency and throughput.

FIG. 1A is a block diagram of a system 100 that employs a memory ordering circuit 105 interposed between a memory subsystem 110 and acceleration hardware 102, according to an embodiment of the present disclosure. The memory subsystem 110 may include known memory components, including cache, memory, and one or more memory controller(s) associated with a processor-based architecture. The acceleration hardware 102 may be coarse-grained spatial architecture made up of lightweight processing elements (or other types of processing components) connected by an inter-processing element (PE) network or another type of inter-component network.

In one embodiment, programs, viewed as control data flow graphs, are mapped onto the spatial architecture by configuring PEs and a communications network. Generally, PEs are configured as dataflow operators, similar to functional units in a processor: once the input operands arrive at the PE, some operation occurs, and results are forwarded to downstream PEs in a pipelined fashion. Dataflow operators (or other types of operators) may choose to consume incoming data on a per-operator basis. Simple operators, like those handling the unconditional evaluation of arithmetic expressions often consume all incoming data. It is sometimes useful, however, for operators to maintain state, for example, in accumulation.

The PEs communicate using dedicated virtual circuits, which are formed by statically configuring a circuit-switched communications network. These virtual circuits are flow controlled and fully back pressured, such that PEs will stall if either the source has no data or the destination is full. At runtime, data flows through the PEs implementing a mapped algorithm according to a data-flow graph, also referred to as a subprogram herein. For example, data may be streamed in from memory, through the acceleration hardware 102, and then back out to memory. Such an architecture can achieve remarkable performance efficiency relative to traditional multicore processors: compute, in the form of PEs, is simpler and more numerous than larger cores and communication is direct, as opposed to an extension of the memory subsystem 110. Memory system parallelism, however, helps to support parallel PE computation. If memory accesses are serialized, high parallelism is likely unachievable. To facilitate parallelism of memory accesses, the disclosed memory ordering circuit 105 includes memory ordering architecture and microarchitecture, as will be explained in detail. In one embodiment, the memory ordering circuit 105 is a request address file circuit (or "RAF") or other memory request circuitry.

Figure 1B:
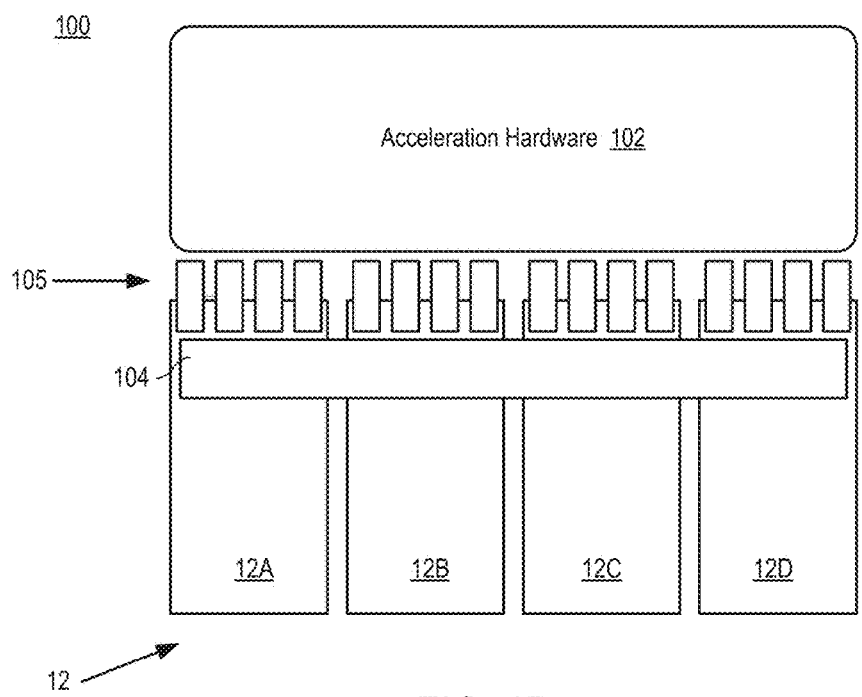
FIG. 1B is a block diagram of the system of FIG. 1A, but which employs multiple memory ordering circuits, according to an embodiment of the present disclosure.

FIG. 1B is a block diagram of the system 100 of FIG. 1A but which employs multiple memory ordering circuits 105, according to an embodiment of the present disclosure. Each memory ordering circuit 105 may function as an interface between the memory subsystem 110 and a portion of the acceleration hardware 102. The memory subsystem 110 may include a plurality of cache slices 12 (e.g., cache slices 12A, 12B, 12C, and 12D in the embodiment of FIG. 1B), and a certain number of memory ordering circuits 105 (four in this embodiment) may be used for each cache slice 12. A crossbar 104 may connect the memory ordering circuits 105 to banks of cache that make up each cache slice 12A, 12B, 12C, and 12D. For example, there may be eight banks of memory in each cache slice in one embodiment. The system 100 may be instantiated on a single die, for example, as a system on a chip (SoC). In one embodiment, the SoC includes the acceleration hardware 102. In an alternative embodiment, the acceleration hardware 102 is an external programmable chip such as an FPGA or CGRA, and the memory ordering circuits 105 interface with the acceleration hardware 102 through an input/output hub or the like.

Each memory ordering circuit 105 may accept read and write requests to the memory subsystem 110. The requests from the acceleration hardware 102 arrive at the memory ordering circuit 105 in a separate channel for each node of the data-flow graph that initiates read or write accesses, also referred to as load or store accesses herein. Buffering is provided so that the processing of loads will return the requested data to the acceleration hardware 102 in the order it was requested. In other words, iteration six data is returned before iteration seven data, and so forth. Furthermore, note that the request channel from a memory ordering circuit 105 to a particular cache bank may be implemented as an ordered channel and any first request that leaves before a second request will arrive at the cache bank before the second request.

Figure 2:
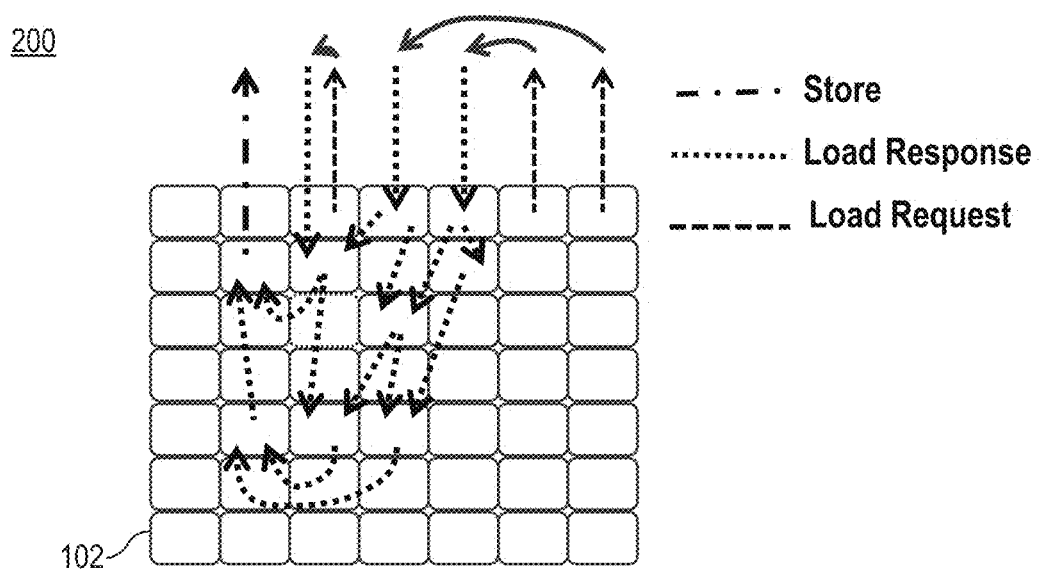
FIG. 2 is a block diagram illustrating general functioning of memory operations into and out of acceleration hardware, according to an embodiment of the present disclosure.

FIG. 2 is a block diagram 200 illustrating general functioning of memory operations into and out of the acceleration hardware 102, according to an embodiment of the present disclosure. The operations occurring out the top of the acceleration hardware 102 are understood to be made to and from a memory of the memory subsystem 110. Note that two load requests are made, followed by corresponding load responses. While the acceleration hardware 102 performs processing on data from the load responses, a third load request and response occur, which trigger additional acceleration hardware processing. The results of the acceleration hardware processing for these three load operations are then passed into a store operation, and thus a final result is stored back to memory.

By considering this sequence of operations, it may be evident that spatial arrays more naturally map to channels. Furthermore, the acceleration hardware 102, such as spatial fabric, is latency-insensitive in terms of the request and response channels, and inherent parallel processing that may occur. The acceleration hardware may also decouple execution of a program from implementation of the memory subsystem 110 (FIG. 1A), as interfacing with the memory occurs at discrete moments separate from multiple processing steps taken by the acceleration hardware 102. For example, a load request to and a load response from memory are separate actions, and may be scheduled differently in different circumstances depending on dependency flow of memory operations. The use of spatial fabric, for example, for processing instructions facilitates spatial separation and distribution of such a load request and a load response.

Figure 3:
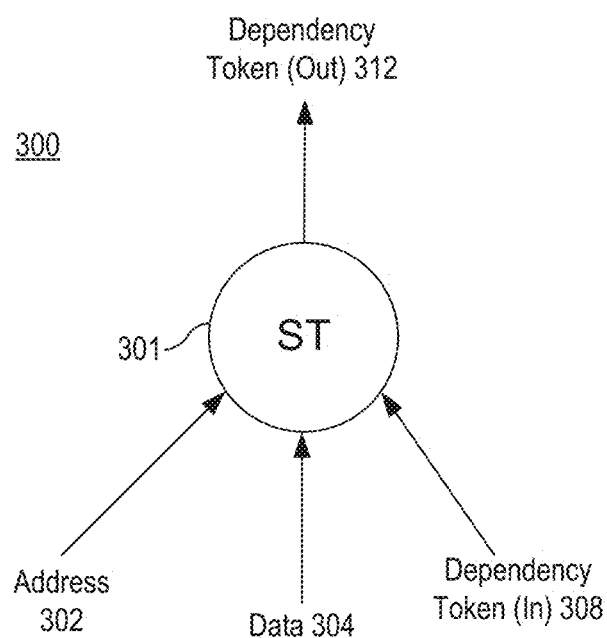
FIG. 3 is a block diagram illustrating a spatial dependency flow for a store operation, according to an embodiment of the present disclosure.

FIG. 3 is a block diagram 300 illustrating a spatial dependency flow for a store operation 301, according to an embodiment of the present disclosure. Reference to a store operation is exemplary, as the same flow may apply to a load operation (but without incoming data), or to other operators such as a fence. A fence is an ordering operation for memory subsystems that ensures that all prior memory operations of a type (such as all stores or all loads) have completed. The store operation 301 may receive an address 302 (of memory) and data 304 received from the acceleration hardware 102. The store operation 301 may also receive an incoming dependency token 308, and in response to the availability of these three items, the store operation 301 may generate an outgoing dependency token 312. The incoming dependency token, which may, for example, be an initial dependency token of a program, may be provided in a compiler-supplied configuration for the program, or may be provided by execution of memory-mapped input/output (110). Alternatively, if the program has already been running, the incoming dependency token 308 may be received from the acceleration hardware 102, e.g., in association with a preceding memory operation from which the store operation 301 depends. The outgoing dependency token 312 may be generated based on the address 302 and data 304 being required by a program-subsequent memory operation.

Figure 4:
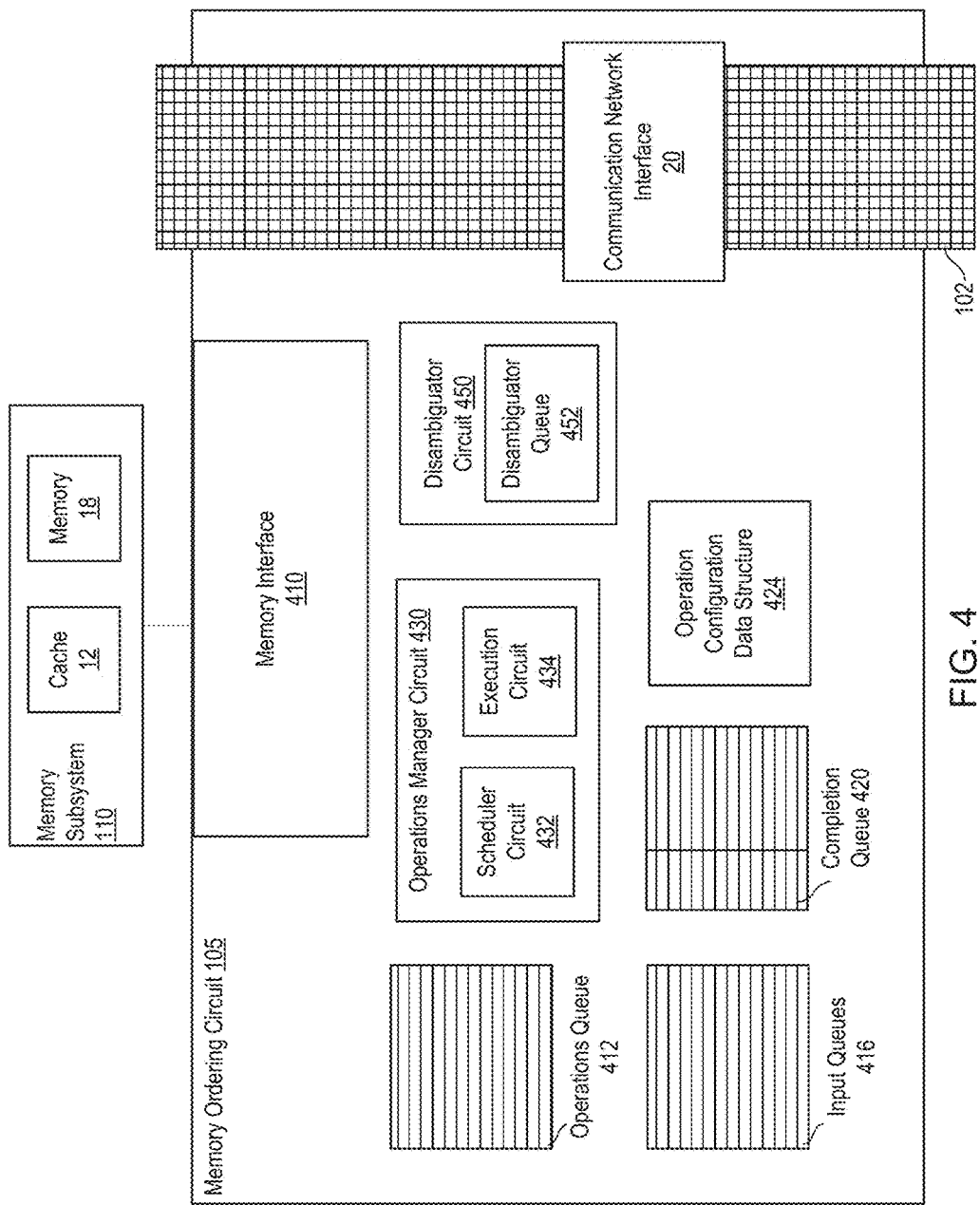
FIG. 4 is a detailed block diagram of the memory ordering circuit of FIG. 1, according to an embodiment of the present disclosure.

FIG. 4 is a detailed block diagram of the memory ordering circuit 105 of FIG. 1A, according to an embodiment of the present disclosure. The memory ordering circuit 105 may be coupled to an out-of-order memory subsystem 110, which as discussed, may include cache 12 and memory 18, and associated out-of-order memory controller(s). The memory ordering circuit 105 may include, or be coupled to, a communications network interface 20 that may be either an inter-tile or an intra-tile network interface, and may be a circuit switched network interface (as illustrated), and thus include circuit-switched interconnects. Alternatively, or additionally, the communications network interface 20 may include packet-switched interconnects.

The memory ordering circuit 105 may further include, but not be limited to, a memory interface 410, an operations queue 412, input queue(s) 416, a completion queue 420, an operation configuration data structure 424, an operations manager circuit 430 that may further include a scheduler circuit 432 and an execution circuit 434, and a disambiguator circuit 450 that includes a disambiguator queue 452. In one embodiment, the memory interface 410 may be circuit-switched, and in another embodiment, the memory interface 410 may be packet-switched, or both may exist simultaneously. The operations queue 412 may buffer memory operations (with corresponding arguments) that are being processed for request, and may, therefore, correspond to addresses and data coming into the input queues 416.

More specifically, the input queues 416 may be an aggregation of at least the following: a load address queue, a store address queue, a store data queue, and a dependency queue. When implementing the input queue 416 as aggregated, the memory ordering circuit 105 may provide for sharing of logical queues, with additional control logic to logically separate the queues, which are individual channels with the memory ordering circuit. This may maximize input queue usage, but may also require additional complexity and space for the logic circuitry to manage the logical separation of the aggregated queue. Alternatively, as will be discussed with reference to FIG. 5, the input queues 416 may be implemented in a segregated fashion, with a separate hardware queue for each. Whether aggregated (FIG. 4) or disaggregated (FIG. 5), implementation for purposes of this disclosure is substantially the same, with the former using additional logic to logically separate the queues within a single, shared hardware queue.

When shared, the input queues 416 and the completion queue 420 may be implemented as ring buffers of a fixed size. A ring buffer is an efficient implementation of a circular queue that has a first-in-first-out (FIFO) data characteristic. These queues may, therefore, enforce a semantical order of a program for which the memory operations are being requested. In one embodiment, a ring buffer (such as for the store address queue) may have entries corresponding to entries flowing through an associated queue (such as the store data queue or the dependency queue) at the same rate. In this way, a store address may remain associated with corresponding store data.

More specifically, the load address queue may buffer an incoming address of the memory 18 from which to retrieve data. The store address queue may buffer an incoming address of the memory 18 to which to write data, which is buffered in the store data queue. The dependency queue may buffer dependency tokens in association with the addresses of the load address queue and the store address queue. Each queue, representing a separate channel, may be implemented with a fixed or dynamic number of entries. When fixed, the more entries that are available, the more efficient complicated loop processing may be made. But, having too many entries costs more area and energy to implement. In some cases, e.g., with the aggregated architecture, the disclosed input queue 416 may share queue slots. Use of the slots in a queue may be statically allocated.

The completion queue 420 may be a separate set of queues to buffer data received from memory in response to memory commands issued by load operations. The completion queue 420 may be used to hold a load operation that has been scheduled but for which data has not yet been received (and thus has not yet completed). The completion queue 420, may therefore, be used to reorder data and operation flow.

The operations manager circuit 430, which will be explained in more detail with reference to FIGS. 5 through 15I, may provide logic for scheduling and executing queued memory operations when taking into account dependency tokens used to provide correct ordering of the memory operations, and entries queued in the disambiguator circuit 450. The operation manager circuit 430 may access the operation configuration data structure 424 to determine which queues are grouped together to form a given memory operation. For example, the operation configuration data structure 424 may include that a specific dependency counter (or queue), input queue, output queue, and completion queue are all grouped together for a particular memory operation. As each successive memory operation may be assigned a different group of queues, access to varying queues may be interleaved across a sub-program of memory operations. Knowing all of these queues, the operations manager circuit 430 may interface with the operations queue 412, the input queue(s) 416, the completion queue(s) 420, and the memory subsystem 110 to initially issue memory operations to the memory subsystem 110 when successive memory operations become "executable," and to next complete the memory operation with some acknowledgement from the memory subsystem. This acknowledgement may be, for example, data in response to a load operation command or an acknowledgement of data being stored in the memory in response to a store operation command.

The disambiguator circuit 450 may provide the means by which the operations manager circuit 430 may track store operations, and check whether a succeeding load operation has an address conflict with any pending store operation. To do so, the disambiguator circuit may store entries into the disambiguator queue 452 for store operations, each entry including a store address and a pointer that points to a location in the store data queue associated with the store address. This pointer may be generated by the scheduler circuit 432 annotating an index into the store data queue 452 at that location, e.g., the indexed slot within the store data queue that will receive data to be stored at the store address. Other types of pointers are envisioned depending on the types of queues used. The operations manager circuit 430 may then, on behalf of the succeeding load operation, request that the disambiguator circuit 450 perform a search of the disambiguator queue 452 to determine whether a load address matches (e.g., conflicts with) the store address for any of the pending store operation entries in the disambiguator. Accordingly, the disambiguator circuit 450 may perform an early address conflict check, before arrival of associated data. This early checking of address conflicts may improve both memory latency and throughput, as memory operations can be issued in parallel (provided no address conflict) and without incurring the latency of serialized memory access.

In one embodiment, the disambiguator circuit 450 may buffer the data from the store address queue and thus may directly forward the data to the completion queue 420 for the succeeding load operation. In another embodiment, as will be discussed in more detail, the operations manager circuit 430 may use the entry in the disambiguator queue 452 (located based on an address match with the load address) to forward data, upon arrival into the store data queue, to the completion queue 420, thus allowing the succeeding load operation. Completion of the load operation may, therefore, occur without sending a load request to the memory subsystem 110, and may significantly improve latency and throughput of handling memory operations in and out of the acceleration hardware 102.

Note that the operations manager circuit 430 may further trigger generation of a dependency token to indicate, to the succeeding load operation, a dependency on the data being stored by the store operation. The operations manager circuit 430 may include the dependency token with the store operation, when scheduled, and be sent with the store operation to memory, e.g., in a store command.

In one embodiment, the disambiguator circuit 450 is a content-addressable memory (CAM) or a counting Bloom filter. A CAM is a hardware search engine that is faster than algorithmic approaches for search-intensive applications. A CAM may be composed of conventional semiconductor memory (usually SRAM), which may be the disambiguator queue 452 as referred to herein, with added comparison circuitry that enables a search operation to complete in a single clock cycle. Two common search-intensive tasks that use CAMs include packet forwarding and packet classification in routers. In the present disclosure, a CAM may be employed to search for matching memory addresses (e.g., between succeeding loads and pending stores), and provide, to the operations manager circuit 430, metadata information such as the store address and pointer, into an index of the store data queue, associated with the store address. The CAM may also buffer data in conjunction with such metadata, which data may be forwarded to succeeding memory operations. A Bloom filter is a space-efficient probabilistic data structure that is used to test whether an element is a member of a set. False positive matches are possible, but false negatives are not, and thus the Bloom filter has a 100% recall rate. In other words, a query returns either "possibly in set" or "definitely not in the set." Elements may be added to the set, and with a counting Bloom filter, elements may be removed. A similar disambiguator queue 452 (e.g., SRAM or other type of re-writable memory) may store the set.

Figure 5:
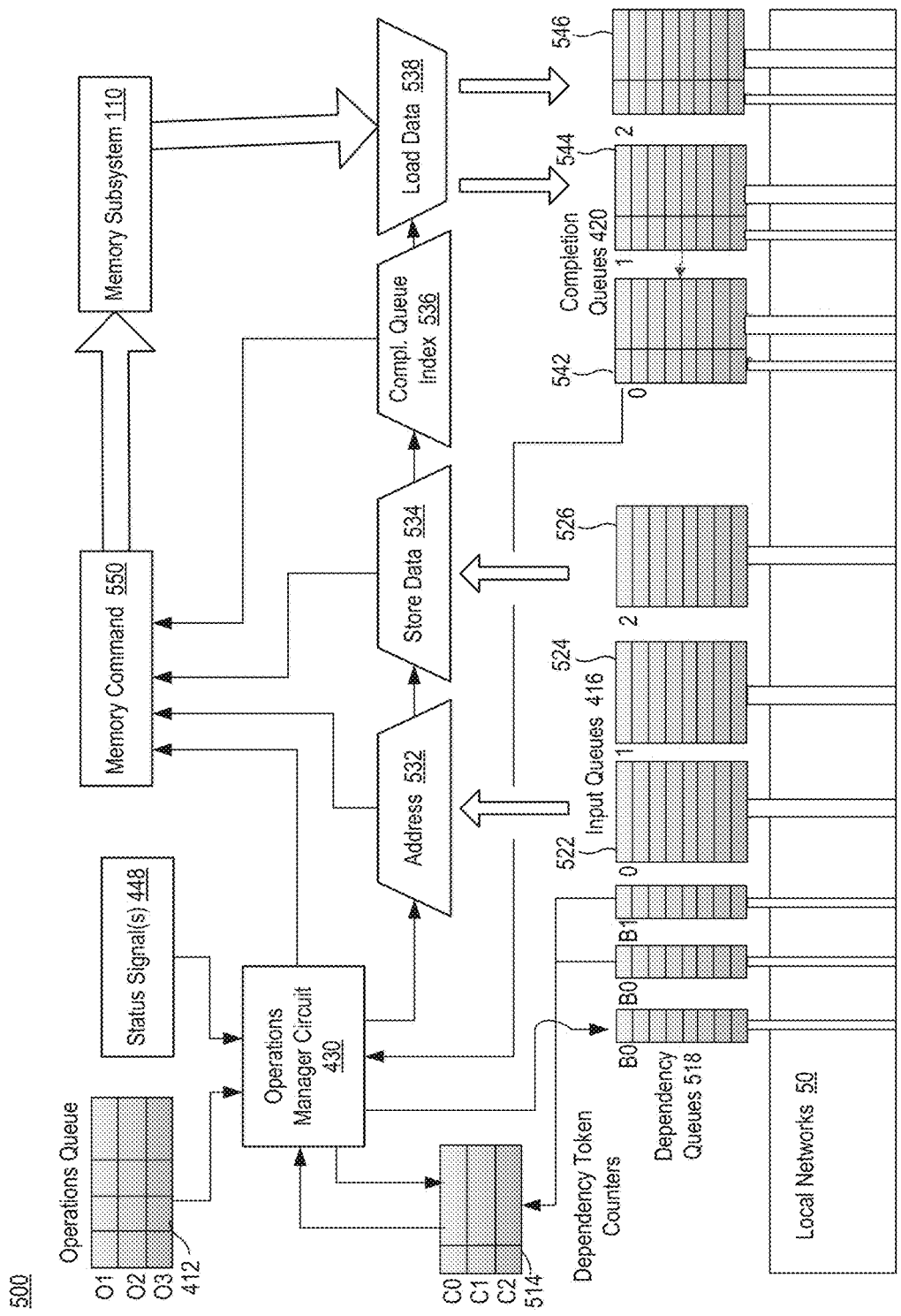
FIG. 5 is a flow diagram of a microarchitecture of the memory ordering circuit of FIG. 1, according to an embodiment of the present disclosure.

FIG. 5 is a flow diagram of a microarchitecture 500 of the memory ordering circuit 105 of FIG. 1A, according to an embodiment of the present disclosure. The memory subsystem 110 may allow illegal execution of a program in which ordering of memory operations is wrong, due to the semantics of C language (and other object-oriented program languages). The microarchitecture 500 may enforce the ordering of the memory operations (sequences of loads from and stores to memory) so that results of instructions that the acceleration hardware 102 executes are properly ordered. A number of local networks 50 are illustrated to represent a portion of the acceleration hardware 102 coupled to the microarchitecture 500.

From an architectural perspective, there are at least two goals: first, to run general sequential codes correctly, and second, to obtain high performance in the memory operations performed by the microarchitecture 500. To ensure program correctness, the compiler expresses the dependency between the store operation and the load operation to an array, p, in some fashion, which are expressed via dependency tokens as will be explained. To improve performance, the microarchitecture 500 finds and issues as many load commands of an array in parallel as is legal with respect to program order.

In one embodiment, the microarchitecture 500 may include the operations queue 412, the input queues 416, the completion queues 420, and the operations manager circuit 430 discussed with reference to FIG. 4, above, where individual queues may be referred to as channels. The microarchitecture 500 may further include a plurality of dependency token counters 514 (e.g., one per input queue), a set of dependency queues 518 (e.g., one each per input queue), an address multiplexer 532, a store data multiplexer 534, a completion queue index multiplexer 536, and a load data multiplexer 538. The operations manager circuit 430, in one embodiment, may direct these various multiplexers in generating a memory command 550 (to be sent to the memory subsystem 110) and in receipt of responses of load commands back from the memory subsystem 110, as will be explained.

The input queues 416, as mentioned, may include a load address queue 522, a store address queue 524, and a store data queue 526. (The small numbers 0, 1, 2 are channel labels and will be referred to later in FIG. 8 and FIG. 14A.) In various embodiments, these input queues may be multiplied to contain additional channels, to handle additional parallelization of memory operation processing. Each dependency queue 518 may be associated with one of the input queues 416. More specifically, the dependency queue 518 labeled B0 may be associated with the load address queue 522 and the dependency queue labeled B1 may be associated with the store address queue 524. If additional channels of the input queues 416 are provided, the dependency queues 518 may include additional, corresponding channels.

In one embodiment, the completion queues 420 may include a set of output buffers 544 and 546 for receipt of load data from the memory subsystem 110 and a completion queue 542 to buffer addresses and data for load operations according to an index maintained by the operations manager circuit 430. The operations manager circuit 430 can manage the index to ensure in-order execution of the load operations, and to identify data received into the output buffers 544 and 546 that may be moved to scheduled load operations in the completion queue 542.

More specifically, because the memory subsystem 110 is out of order, but the acceleration hardware 102 completes operations in order, the microarchitecture 500 may re-order memory operations with use of the completion queue 542. Three different sub-operations may be performed in relation to the completion queue 542, namely to allocate, enqueue, and dequeue. For allocation, the operations manager circuit 430 may allocate an index into the completion queue 542 in an in-order next slot of the completion queue. The operations manager circuit may provide this index to the memory subsystem 110, which may then know the slot to which to write data for a load operation. To enqueue, the memory subsystem 110 may write data as an entry to the indexed, in-order next slot in the completion queue 542 like random access memory (RAM), setting a status bit of the entry to valid. To dequeue, the operations manager circuit 430 may present the data stored in this in-order next slot to complete the load operation, setting the status bit of the entry to invalid. Invalid entries may then be available for a new allocation.

In one embodiment, the status signals 448 may refer to statuses of the input queues 416, the completion queues 420, the dependency queues 518, and the dependency token counters 514. These statuses, for example, may include an input status, an output status, and a control status, which may refer to the presence or absence of a dependency token in association with an input or an output. The input status may include the presence or absence of addresses and the output status may include the presence or absence of store values and available completion buffer slots. The dependency token counters 514 may be a compact representation of a queue and track a number of dependency tokens used for any given input queue. If the dependency token counters 514 saturate, no additional dependency tokens may be generated for new memory operations. Accordingly, the memory ordering circuit 105 may stall scheduling new memory operations until the dependency token counters 514 becomes unsaturated.

Figure 6:
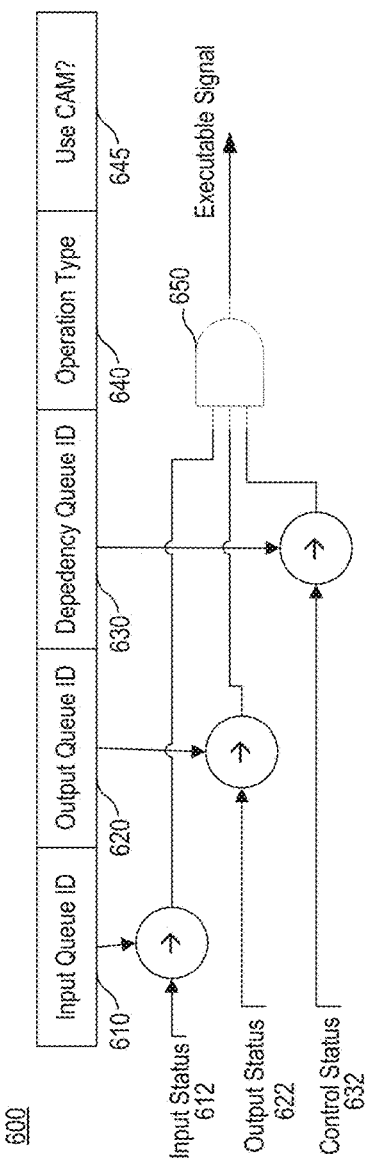
FIG. 6 is a block diagram of an executable determiner circuit, according to an embodiment of the present disclosure.

With additional reference to FIG. 6, FIG. 6 is a block diagram of an executable determiner circuit 600, according to an embodiment of the present disclosure. The memory ordering circuit 105 may be set up with several different kinds of memory operations, for example a load and a store:
ldNo[d,x] result.outN, addr.in64, order.in0, order.out0
stNo[d,x] addr.in64, data.inN, order.in0, order.out0

The executable determiner circuit 600 may be integrated as a part of the scheduler circuit 432 and which may perform a logical operation to determine whether a given memory operation is executable, and thus ready to be issued to memory. A memory operation may be executed when the queues corresponding to its memory arguments have data and an associated dependency token is present. These memory arguments may include, for example, an input queue identifier 610 (indicative of a channel of the input queue 416), an output queue identifier 620 (indicative of a channel of the completion queues 420), a dependency queue identifier 630 (e.g., what dependency queue or counter should be referenced), an operation type indicator 640 (e.g., load operation or store operation), and a CAM indicator 645 (e.g., whether to query the disambiguator queue 452 for an address conflict for load operations or to store an entry into the disambiguator queue 452 for store operations).

In one embodiment, these memory arguments are queued within the operations queue 412, and used to schedule issuance of memory operations in association with incoming addresses and data from memory and the acceleration hardware 102. (See FIG. 7.) Incoming status signals 448 may be logically combined with these identifiers and then the results may be added (e.g., through an AND gate 650) to output an executable signal, e.g., which is asserted when the memory operation is executable. The status signals 448, as inputs, may include an input status 612 for the input queue identifier 610, an output status 622 for the output queue identifier 620, and a control status 632 (related to dependency tokens) for the dependency queue identifier 630.

For a load operation, and by way of example, the memory ordering circuit 105 may issue a load command when the load operation has an address (input status) and room to buffer the load result in the completion queue 542 (output status). Similarly, the memory ordering circuit 105 may issue a store command for a store operation when the store operation has both an address and data value (input status). Accordingly, the status signals 448 may communicate a level of emptiness (or fullness) of the queues to which the status signals pertain. The operation type may then dictate whether the logic results in an executable signal depending on what address and data should be available.

To implement dependency ordering, the scheduler circuit 432 may extend memory operations to include dependency tokens as underlined above in the example load and store operations. The control status 632 may indicate whether a dependency token is available within the dependency queue identified by the dependency queue identifier 630, which could be one of the dependency queues 518 (for an incoming memory operation) or a dependency token counter 514 (for a completed memory operation). Under this formulation, a dependent memory operation requires an additional ordering token to execute and generates an additional ordering token upon completion of the memory operation, where completion means that data from the result of the memory operation has become available to program-subsequent memory operations.

In one embodiment, with further reference to FIG. 5, the operations manager circuit 430 may direct the address multiplexer 532 to select an address argument that is buffered within either the load address queue 522 or the store address queue 524, depending on whether a load operation or a store operation is currently being scheduled for execution. If it is a store operation, the operations manager circuit 430 may also direct the store data multiplexer 534 to select corresponding data from the store data queue 526. The operations manager circuit 430 may also direct the completion queue index multiplexer 536 to retrieve a load operation entry, indexed according to queue status and/or program order, within the completion queues 420, to complete a load operation. The operations manager circuit 430 may also direct the load data multiplexer 538 to select data received from the memory subsystem 110 into the completion queues 420 for a load operation that is awaiting completion. In this way, the operations manager circuit 430 may direct selection of inputs that go into forming the memory command 550, e.g., a load command or a store command, or that the execution circuit 434 is waiting for to complete a memory operation.

Figure 7:
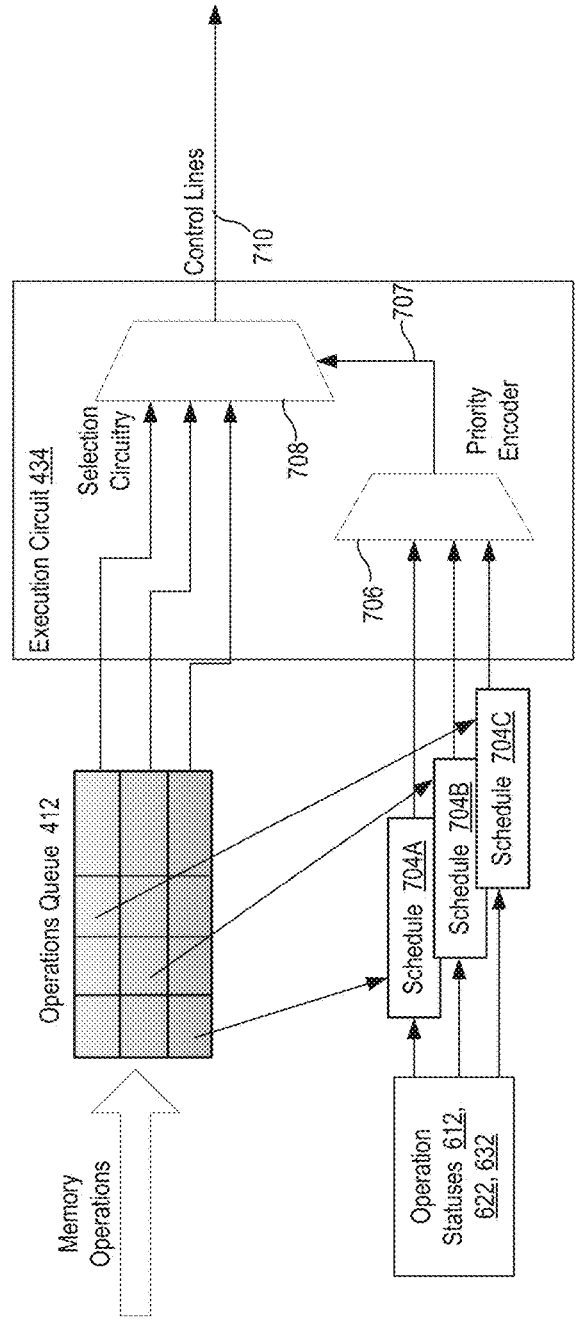
FIG. 7 is a block diagram of a priority encoder, according to an embodiment of the present disclosure.

FIG. 7 is a block diagram the execution circuit 434 that may include a priority encoder 706 and selection circuitry 708 and which generates output control line(s) 710, according to one embodiment of the present disclosure. In one embodiment, the execution circuit 434 may access queued memory operations (in the operations queue 412) that have been determined to be executable (FIG. 6). The execution circuit 434 may also receive the schedules 704A, 704B, 704C for multiple of the queued memory operations that have been queued and also indicated as ready to issue to memory. The priority encoder 706 may thus receive an identity of the executable memory operations that have been scheduled and execute certain rules (or follow particular logic) to select the memory operation from those coming in that has priority to be executed first. The priority encoder 706 may output a selector signal 707 that identifies the scheduled memory operation that has a highest priority, and has thus been selected.

The priority encoder 706, for example, may be a circuit (such as a state machine or a simpler converter) that compresses multiple binary inputs into a smaller number of outputs, including possibly just one output. The output of a priority encoder is the binary representation of the original number starting from zero of the most significant input bit. So, in one example, when memory operation 0 ("zero"), memory operation one ("1"), and memory operation two ("2") are executable and scheduled, corresponding to 704A, 704B, and 704C, respectively. The priority encoder 706 may be configured to output the selector signal 707 to the selection circuitry 708 indicating the memory operation zero as the memory operation that has highest priority. The selection circuitry 708 may be a multiplexer in one embodiment, and be configured to output its selection (e.g., of memory operation zero) onto the control lines 710, as a control signal, in response to the selector signal from the priority encoder 706 (and indicative of selection of memory operation of highest priority). This control signal may go to the multiplexers 532, 534, 536, and/or 538 as discussed with reference to FIG. 5, to populate the memory command 550 that is next to issue be sent) to the memory subsystem 110. The transmittal of the memory command may be understood to be issuance of a memory operation to the memory subsystem 110.

FIG. 8 is a block diagram of an exemplary load operation 800, both logical and in binary form, according to an embodiment of the present disclosure. Referring back to FIG. 6, the logical representation of the load operation 800 may include channel zero ("0") (corresponding to the load address queue 522) as the input queue identifier 610 and completion channel one ("1") (corresponding to the output buffer 544) as the output queue identifier 620. The dependency queue identifier 630 may include two identifiers, channel B0 (corresponding to the first of the dependency queues 518) for incoming dependency tokens and counter C0 for outgoing dependency tokens. The operation type 640 has an indication of "Load," which could be a numerical indicator as well, to indicate the memory operation is a load operation. The CAM indicator 645 may be a binary "zero" or "one" decision whether to query the disambiguator circuit 450 during scheduling the memory operation. Below the logical representation of the logical memory operation is a binary representation for exemplary purposes, e.g., where a load is indicated by "00" and the "1" for the CAM indicator 645 may indicate the need to query the disambiguator queue 452 during scheduling the load operation. The load operation of FIG. 8 may be extended to include other configurations such as a store operation (FIG. 14A) or other type of memory operations, such as a fence.

Figure 9:
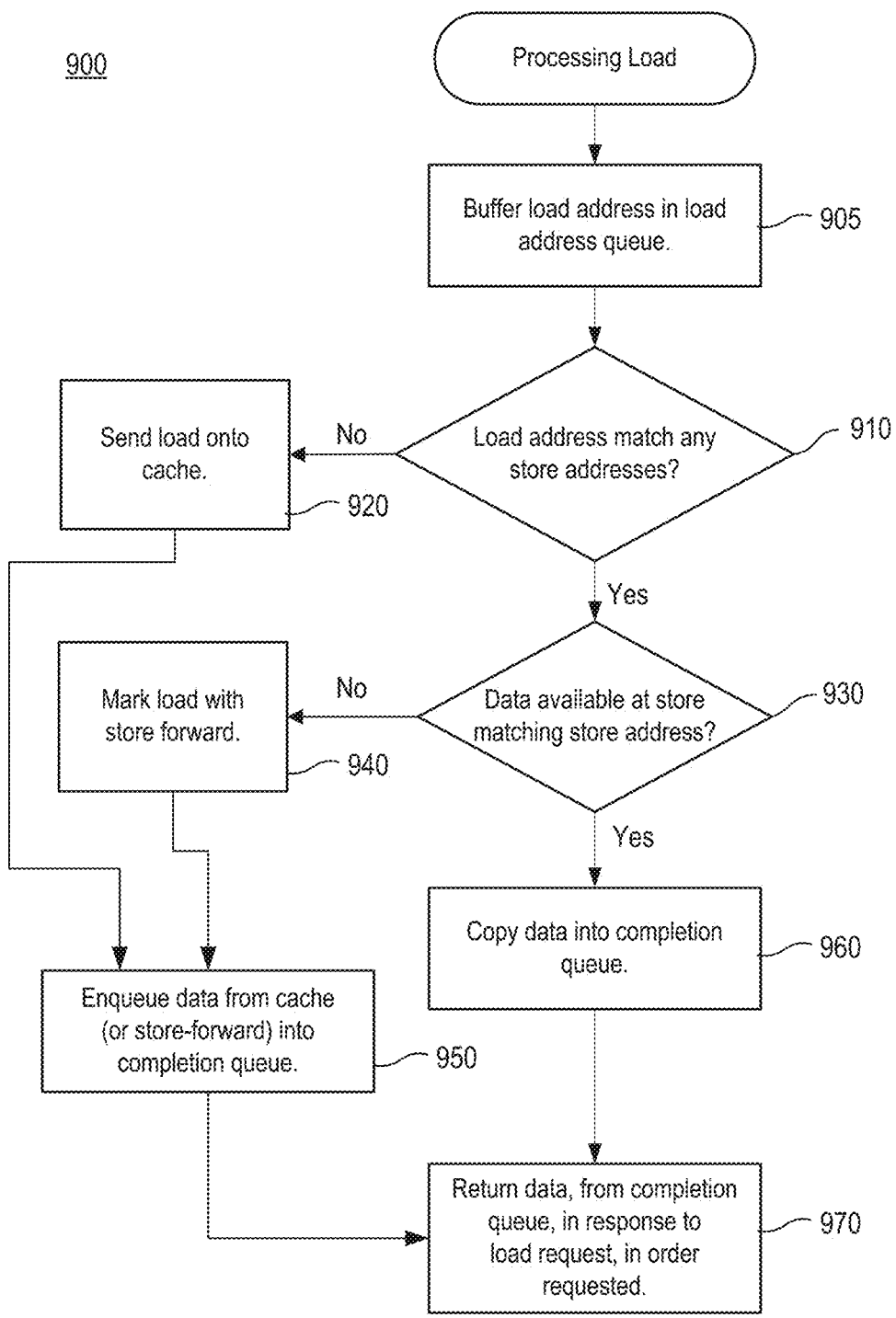
FIG. 9 is a flow chart of a method for processing a load operation with the disclosed microarchitecture, according to an embodiment of the present disclosure.

FIG. 9 is a flow chart of a method 900 for processing a load operation with the disclosed microarchitecture, according to an embodiment of the present disclosure. The method 900 may be performed by a system that may include hardware (e.g., circuitry, dedicated logic, and/or programmable logic), software (e.g., instructions executable on a computer system to perform hardware simulation), or a combination thereof. In an illustrative example, the method 900 may be performed by the memory ordering circuit 105 and various subcomponents of the memory ordering circuit 105. The method 900 may or may not use the disambiguation circuit 450, for example, and may incorporate disambiguation logic into the memory operations manager circuit 430 to perform the method 900. The disambiguation circuit 450 may also be used, as may be the disambiguator queue 452 (such as the CAM or counting Bloom filter). In one example, any of the input queues 416 and the completion queue 420 may be implemented as ring buffers.

More specifically, referring to FIG. 9, the method 900 may start with processing a load operation, with the memory ordering circuit 105 buffering a load address in the load address queue 522 (905). The method 900 may continue with determining whether the load address matches any of the store addresses stored in the store address queue 524 (910). If the answer is no, the method 900 may continue with the memory ordering circuit 105 sending the load operation onto the cache 12 (920) followed by placing the data received from the cache into the completion queue 542 (950). If the answer is yes, the method 900 may continue with the memory ordering circuit 105 determining whether data is available in the store data queue 526 for the store operation having the store address that matches the load address (930). If the answer to block 930 is no, the method 900 may continue with the memory ordering circuit 105 marking the load operation as a store forward pointing to the location in the store address queue 524 at which the data will be received from the acceleration hardware (940). Once the data does arrive, the method 900 may continue with the memory ordering circuit 105 enqueuing the data from the store forward into the completion queue 542 (950). The method 900 may then complete with the memory ordering circuit 105 returning the data, from the completion queue 542, to the acceleration hardware in response to the load request and in the order requested (970).

With further reference to FIG. 9, assuming the answer was yes to the determinations at blocks 910 and 930, the method 900 may continue with the memory ordering circuit 105 copying the data from the store address queue 526 to an in-order next slot in the completion queue 542 (960). The method 900 may then complete with the memory ordering circuit 105 returning the data, from the completion queue 542, to the acceleration hardware in response to the load request and in the order requested (970). Accordingly, with either a store forward or availability of the data in the store data queue for a succeeding load operation (having the same address as the store operation), the disambiguation logic of the memory ordering circuit 105 may copy data to the completion queue without issuing a command for the load operation to the memory subsystem 110, thus reducing latency and increasing throughput of performing memory operations on behalf of a processor.

Figure 10:
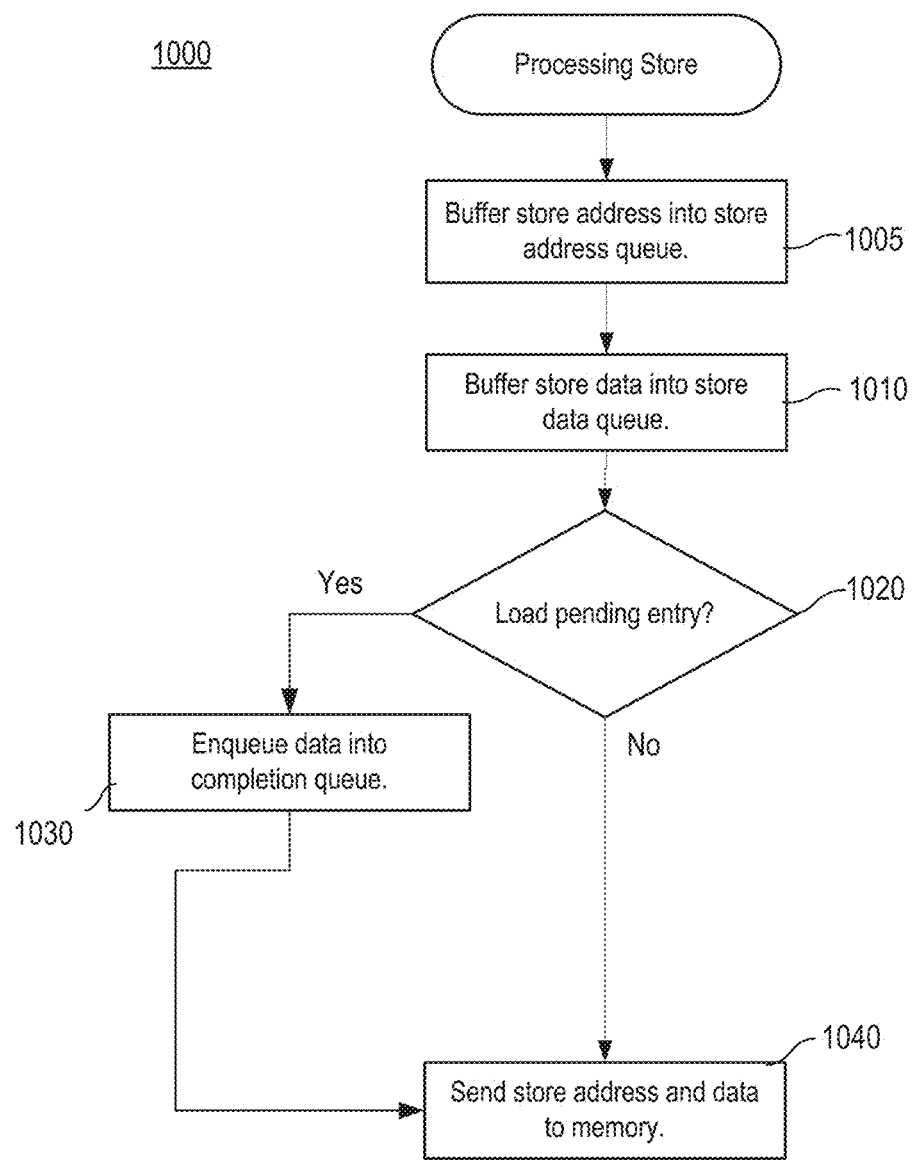
FIG. 10 is a flow chart of a method for processing a store operation with the disclosed microarchitecture, according to an embodiment of the present disclosure.

FIG. 10 is a flow chart of a method 1000 for processing a store operation with the disclosed microarchitecture, according to an embodiment of the present disclosure. The method 1000 may be performed by a system that may include hardware (e.g., circuitry, dedicated logic, and/or programmable logic), software (e.g., instructions executable on a computer system to perform hardware simulation), or a combination thereof. In an illustrative example, the method 1000 may be performed by the memory ordering circuit 105 and various subcomponents of the memory ordering circuit 105. The method 1000 may or may not use the disambiguation circuit 450, for example, and may incorporate disambiguation logic into the memory operations manager circuit 430 to perform the method 1000. The disambiguation circuit 450 may also be used, as may be the disambiguator queue 452 (such as the CAM or counting Bloom filter). In one example, any of the input queues 416 and the completion queue 420 may be implemented as ring buffers.

More specifically, referring to FIG. 10, the method 1000 may start with processing a load operation, with the memory ordering circuit 105 buffering a store address into the store address queue 524 (1005). The method 1000 may continue with the memory ordering circuit 105 buffering store data for the store address into the store data queue 526 (1010). The method 1000 may continue with the memory ordering circuit 105 determining whether a load operation is pending within the input queues 416 that has the same address as the store address (1020). If the answer is yes, the method 1000 may continue with the memory ordering circuit 1030 enqueuing the data into the completion queue 542 for the load operation, which may then be completed (sent to the acceleration hardware) (1030). The method 1000 may continue with the memory ordering circuit 105 sending the store address and the data to the memory 18, to complete the store operation. If the answer is no at block 1020, the method 1000 may continue with the memory ordering circuit 105 directly sending the store address and the data to the memory 18, to complete the store operation (1040).

Figure 11A:
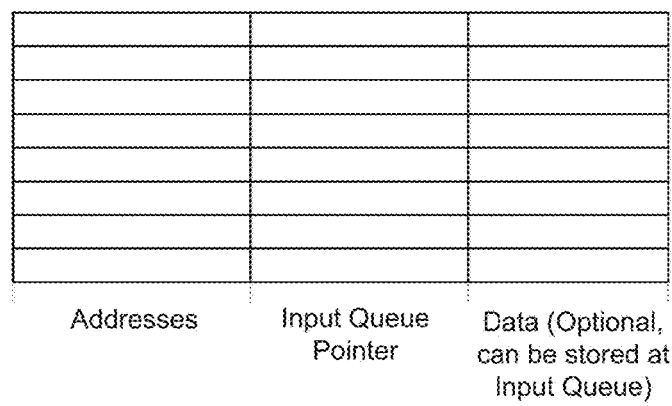
FIG. 11A is a diagrammatic representation of a content-addressable memory (CAM) implementation of a disambiguator circuit, according to an embodiment of the present disclosure.

FIG. 11A is a diagrammatic representation of a content-addressable memory (CAM) 1150 implementation of the disambiguator circuit 450, according to an embodiment of the present disclosure. As previously discussed, the disambiguator circuit 450 may store prior program-ordered memory accesses and may be queried for the presence of a particular address by using the CAM 1150 or a counting Bloom filter 1150' (FIG. 11B), for example.

In one embodiment, the example of the CAM 1150 may be used for storing metadata (e.g., as entries) related to the pending memory operations associated with the prior program-ordered memory accesses. In one implementation, this metadata includes addresses (e.g., store addresses of pending store operations) and a corresponding input queue pointer, which may be determined based on dependency tokens indicating proper program order of incoming memory operations. In an optional implementation, the disambiguator circuit 450 may further store data associated with the store operations that are pending in the input queues, e.g., once the data is received from the acceleration hardware 102. Buffering the data may help in quickly and easily forwarding store data to the completion queue 542 for load operations, but the store data queue may also be directed (e.g., by the operations manager circuit 430) to forward that store data to the completion queue.

More specifically, when store operations are scheduled, the scheduler circuit 432 may store the metadata (store address and pointer to store data queue) into an entry of the CAM 1150. This forms a view of upcoming modifications to memory. Each store operation may be removed, once executed, but may be retained for a period of time (provided sufficient space in the CAM 1150) to continue to provide data forwarding for additional succeeding memory operations. The scheduler circuit 432 may then query the CAM 1150, and obtain a program-ordered view of the memory. Such a view may enable non-dependent load operations, e.g., that do not conflict with an entry in the CAM, to be sent to memory in parallel with completing the store operation. The scheduler circuit 432 may, for dependent load operations that do have an address conflict to an entry in the CAM, either stall, or preferred, perform data forwarding to the completion queue 420. In one embodiment, access to the disambiguation circuit 450 may occur in legal program order as determined by ordering of dependency token flows. As it may be preferred to query the CAM 1150 as soon as an address for a memory operation is available, the memory ordering circuit 105 may track dependency token flows for dependent memory operations, even in the case where some memory operations have true data dependency.

Accordingly, to optimize memory performance, the disambiguator circuit 450 or the memory operations manager circuit 430 may forward data to dependent accesses, rather than issuing a memory operation to the memory 18, as illustrated with reference to FIGS. 9-10. Because addresses are typically available before corresponding data, the disambiguator circuit 450 may provide an annotation for store operations to forward store data to dependent load operations when the store data becomes available. The use of pointers at such annotations has been discussed, but any sort of index or indicia may be used as well. Example flow annotations are depicted in FIG. 12, in which to service multiple dependent memory operations, the memory ordering circuit 105 chains together annotations such that dependent memory operations are served in subsequent cycles.

Figure 11B:
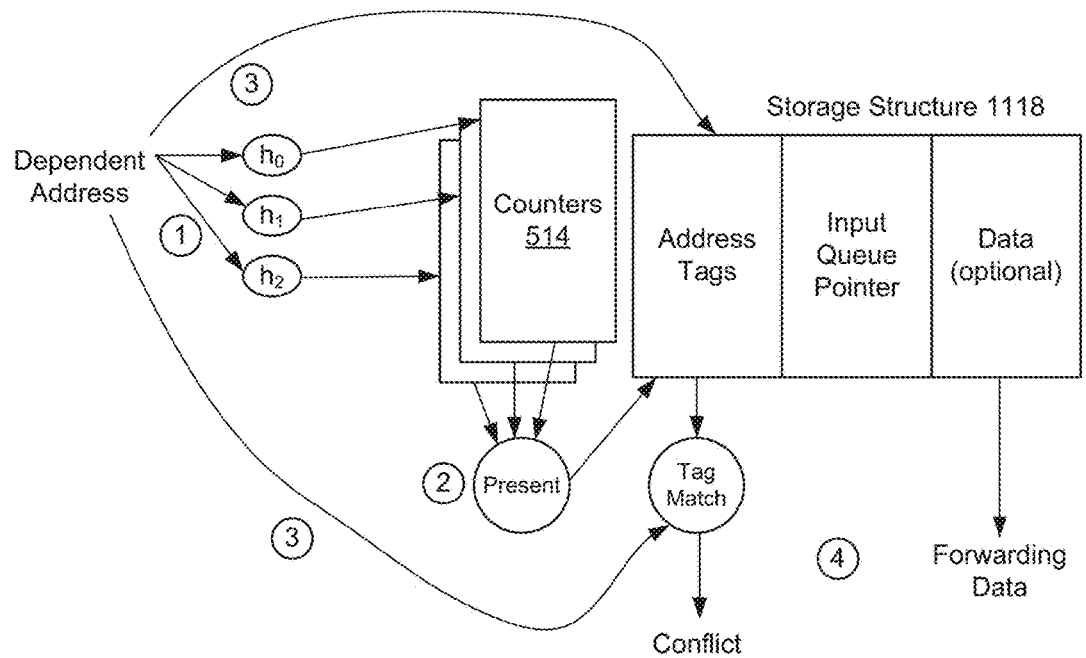
FIG. 11B is a diagrammatic representation of counting Bloom filter implementation of a disambiguator circuit, according to an embodiment of the present disclosure.

FIG. 11B is a diagrammatic representation of counting Bloom filter 1150' implementation of a disambiguator circuit, according to an embodiment of the present disclosure. Bloom filters enable a concise representation of a set, in this case being represented as addresses of pending memory operations. As discussed, a Bloom filter may result in false positives. If all $h_i$ return non-zero, additional checking may be performed. The operations manager circuit 430 may not expect a conflict, so this allows saving energy and area. In performing disambiguation without checking the CAM 1150, for example, this may improve scaling and energy use by checking a filter and storage structure 1118. The contents of the storage structure 1118 may include, but not be limited to, address tags (optional, used to eliminate filter false positives), an input queue pointer, and data (which, again, is option for use in forwarding.

In one embodiment, the operations manager circuit 430 may, as part of a first step, check a dependency token of a current memory operation, $h_i$, with current dependency token counters 514. If there is a match ("present"), at a second step, the address of the memory operation may be compared with address tags of the storage structure 118, used to help identify and filter out false positives. If there is a tag match, at a third step, the operations manager circuit 430 has found a conflict in address of the memory operations (between one being scheduled and one that is pending or completed). The operations manager circuit 420 may then, at a fourth step, optionally forward data of a pending or completed store operation to a dependent (e.g., succeeding) store or load operation. If conflicts are infrequent, serial structures may be used. For example, memory argument buffers within the operations queue 412 may be examined using a queue pointer rather than storing full address tags. This greatly reduces storage in the case that a partial address tag is stored, followed by a serial lookup of input queues.

Figure 12:
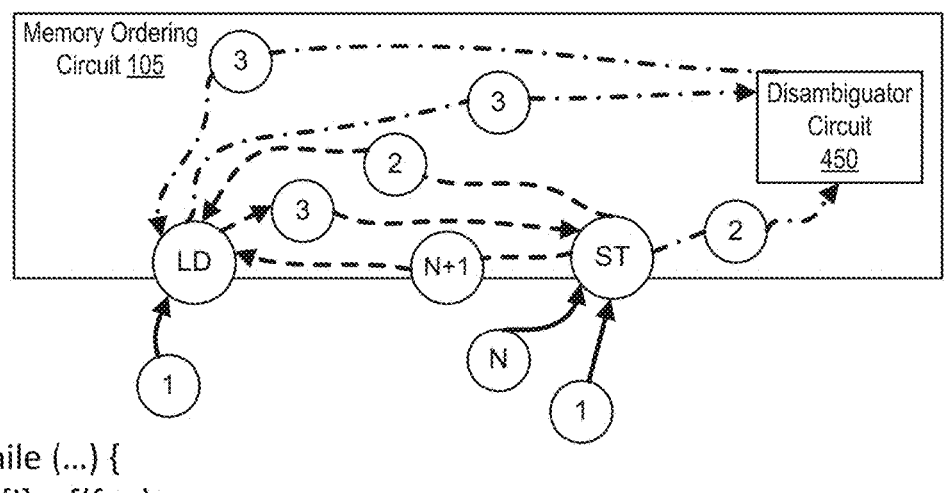
FIG. 12 is a dataflow graph representation of a dependent loop illustrating dependency detection and forwarding using the disambiguator circuit, according to an embodiment of the present disclosure.

FIG. 12 is a dataflow graph representation 1200 of a dependent loop illustrating dependency detection and forwarding using the disambiguator circuit 450, according to an embodiment of the present disclosure. In one embodiment, a store address may flow into the load operation; and, a store address and a dependency token (N) may flow into the store operations (e.g., by way of the input queues 416) in a first step. The dependency token, N, may indicate a dependency of the store operation on a previous memory operation. A further dependency token (N+1) may flow, in a subsequent step, between the store operation and the load operation to indicate the load operation depends on the completion of the store operation, e.g., wants to load data from the same address.

During a second step, an annotation may be provided to the disambiguator circuit (e.g., by the operations manager circuit 430) indicating a location in the store address queue 524 at which the store data will arrive. This may be any pointer, and in one embodiment, may be an index into the store data queue. The disambiguator circuit 450 may store an entry in the disambiguator queue 452 that includes the annotation and the store address. Also during the second step, dependency information flows between the store operation and the load operation.

During a third step, the operations manager circuit 430 may query the disambiguator circuit 450, and determine that there is an address conflict between the load operation and the store operation. The operations manager circuit 430 may then retrieve the entry for the store address, including the annotation or pointer, with which to perform store forwarding. The operations manager circuit may subsequently mark the load operation as a store forward, and generate a second annotation of a next in-order slot in the completion queue 542, to schedule the load operation. The second annotation may be performed by annotating the next in-order slot of the completion queue with the location of the pointer, so that the operations manager circuit 430 knows the location in the store data queue 526 from which to forward the data upon receipt of the data in the store data queue.

An example of memory ordering and disambiguation by the memory ordering circuit 105 will be illustrated with a simplified example for purposes of explanation with relation to FIGS. 13A-13B, 14A-14B, and 15A-15I. For this example, the following code includes an array, p, which is accessed by indices i and i+2:

```
for(i) {
    temp = p[i];
    p[i+2] = temp;
}
```

Assume, for this example, that array p contains 0,1,2,3, 4,5,6, and at the end of loop execution, array p will contain 0,1,0,1,0,1,0. This code may be transformed by unrolling the loop, as illustrated in FIGS. 13A and 13B. True address dependencies are annotated by arrows in FIG. 13A, which in each case, a load operation is dependent on a store operation to the same address. For example, for the first of such dependencies, a store (e.g., a write) to p[2] needs to occur before a load (e.g., a read) from p[2], and second of such dependencies, a store to p[3] needs to occur before a load from p[3], and so forth. As a compiler is to be pessimistic, the compiler annotates dependencies between two memory operations, load p[i] and store p[i+2]. Note that only sometimes do reads and writes conflict. The micro-architecture 500 is designed to extract memory-level parallelism where memory operations may move forward at the same time when there are no conflicts to the same address. This is especially the case for load operations, which expose latency in code execution due to waiting for preceding dependent store operations to complete. In the example code in FIG. 13B, safe reorderings are noted by the arrows on the left of the unfolded code.

The way the microarchitecture may perform this reordering is discussed with reference to FIGS. 14A-14B and 15A-15I. In the present embodiment, further optimizations are obtained through use of the disambiguation circuit 450, which provides a program-ordered view of memory and opportunities to directly fulfill succeeding load operations that depend on data to be received for scheduled store operations.

FIG. 14A is a block diagram of exemplary memory arguments for a load operation 1402 and for a store operation 1404, according to an embodiment of the present disclosure. These, or similar, memory arguments were discussed with relation to FIG. 8 and will not be repeated here. Note, however, that the store operation 1404 has no indicator for the output queue identifier because no data is being output to the acceleration hardware 102. Instead, the store address in channel 1 and the data in channel 2 of the input queues 416, as identified in the input queue identifier memory argument, are to be scheduled for transmission to the memory subsystem 110 in a memory command to complete the store operation 1404. Furthermore, the input channels and output channels of the dependency queues are both implemented with counters. Because the load operations and the store operations as displayed in FIGS. 13A and 13B are interdependent, the counters may be cycled between the load operations and the store operations within the flow of the code. Furthermore, note that both the load operation 1402 and the store operation 1404 are to use the CAM 1250 during performance of the memory ordering, as will be discussed.

Figure 14B:
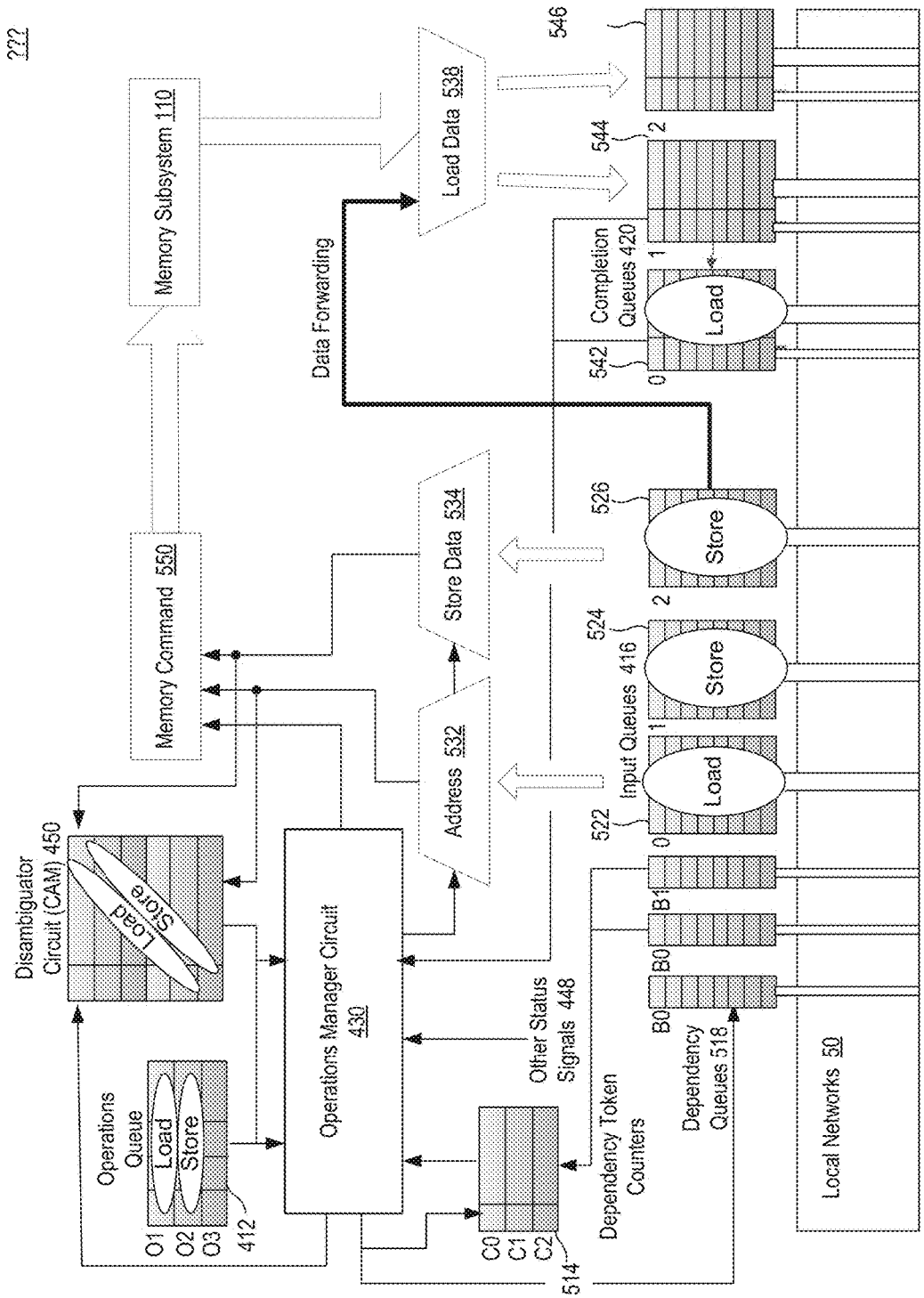
FIG. 14B is a block diagram illustrating flow of load operations and the store operations, such as those of FIG. 14A, through the disclosed microarchitecture and disambiguator circuit, according to an embodiment of the present disclosure.

FIG. 14B is a block diagram illustrating flow of the load operations and store operations, such as the load operation 1402 and the store 1404 operation of FIG. 14A, through the microarchitecture 500 of the memory ordering circuit of FIG. 5, according to an embodiment of the present disclosure. For simplicity of explanation, not all of the components are displayed, but reference may be made back to the additional components displayed in FIG. 5. Various ovals indicating "Load" for the load operation 1402 and "Store" for the store operation 1404 are overlaid on some of the components of the microarchitecture 500 as indication of how various channels of the queues are being used as the memory operations are queued and ordered through the microarchitecture 500. Added to the microarchitecture of FIG. 5 is the disambiguator circuit 450, such as the CAM 1250 for purposes of the present example. The disambiguator circuit 450 may be coupled to the operations manager circuit 430, to the input queue 416, and to the completion queue 420.

In general, the memory subsystem 110 is out of order. To ensure memory operations complete in order, the operations manager circuit 430 may allocate an in-order next slot in an index of the completion queue 542 for each semantically-succeeding load operation. This indexed slot may be sent to the memory subsystem 110, so that a return value is correctly written to the completion buffer 542. Requiring each load operation to issue to memory, however, is not efficient for many programs.

If, however, the disambiguator circuit 450 indicates that the load operation depends on a store operation that is pending, and has an entry in the disambiguator queue 452, the data may be forwarded from the store data queue 526. More specifically, when the operations manager circuit 430 queries the disambiguator circuit 450, the disambiguator circuit 450 may indicate an address conflict with a store operation. In this case, the operations manager circuit 430 may annotate (e.g., write) to the completion buffer index the location in the store data queue associated with the store operation on which the load operation depends. The operations manager circuit may perform the annotation by adding the pointer stored in the entry of the disambiguator queue 452 (for the store operation) in a memory address argument of the load operation during scheduling. After performing this annotation, the operations manager circuit 430 is said to have scheduled the load operation.

The store operation is also considered scheduled, even if the data has not yet been received into the store data queue 526. Upon receipt of the data in the store data queue, the execution circuit 434 of the operations manager circuit 430 may detect the arrival of the data, forward the data to the indexed slot of the completion queue 542, and issue the store operation to the memory, including the store address and the data. The load operation may then complete, with the execution circuit 434 sending the forwarded data from the indexed slot in the completion queue into the acceleration hardware 102, as a load response.

FIGS. 15A, 15B, 15C, 15D, 15E, 15F, 15G, 15H, and 15I are block diagrams illustrating functional flow of load operations and store operations for the exemplary program of FIGS. 13A and 13B through queues of the microarchitecture of FIG. 14B, according to an embodiment of the present disclosure. Each figure may correspond to a next cycle of processing by the microarchitecture 500. Values that are italicized are incoming values (into the queues), values that are bolded are outgoing values (out of the queues), and values that are underlined are values that have been scheduled for completion. All other values with normal fonts are retained values already existing in the queues.

Figure 15A:
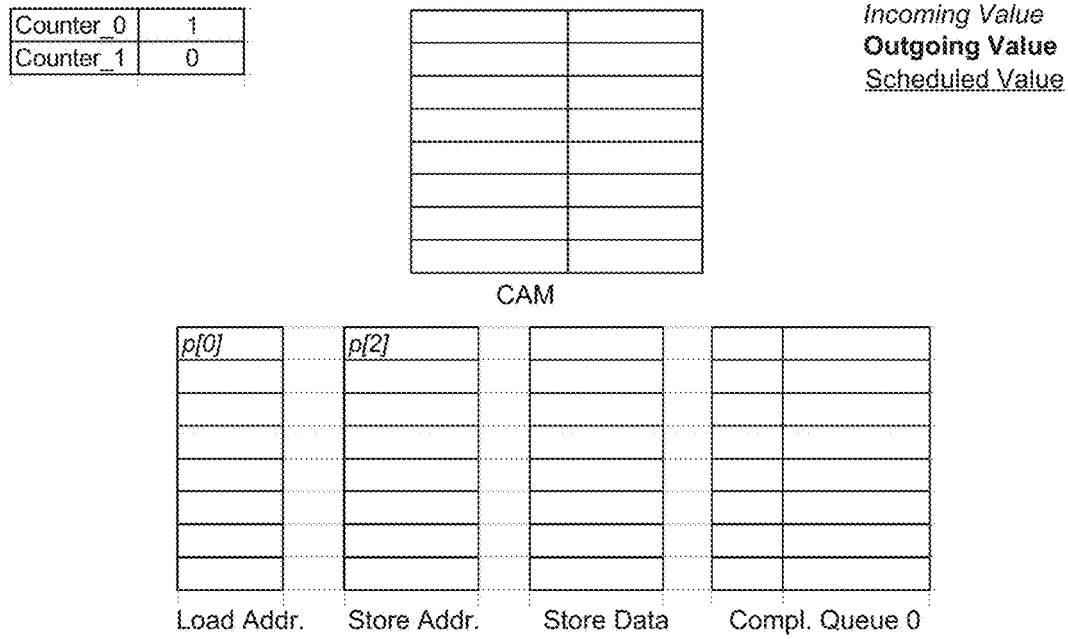

In FIG. 15A, the address p[0] is incoming into the load address queue 522, and the address p[2] is incoming into the store address queue 524, starting the control flow process. Note that counter C0, for dependency input for the load address queue, is "1" and counter C1, for dependency output, is zero. In contrast, the "1" of C0 indicates a dependency out value for the store operation. This indicates an incoming dependency for the load operation of p[0] and an outgoing dependency for the store operation of p[2]. These values, however, are not yet active, but will become active, in this way, in FIG. 14B.

Figure 15B:
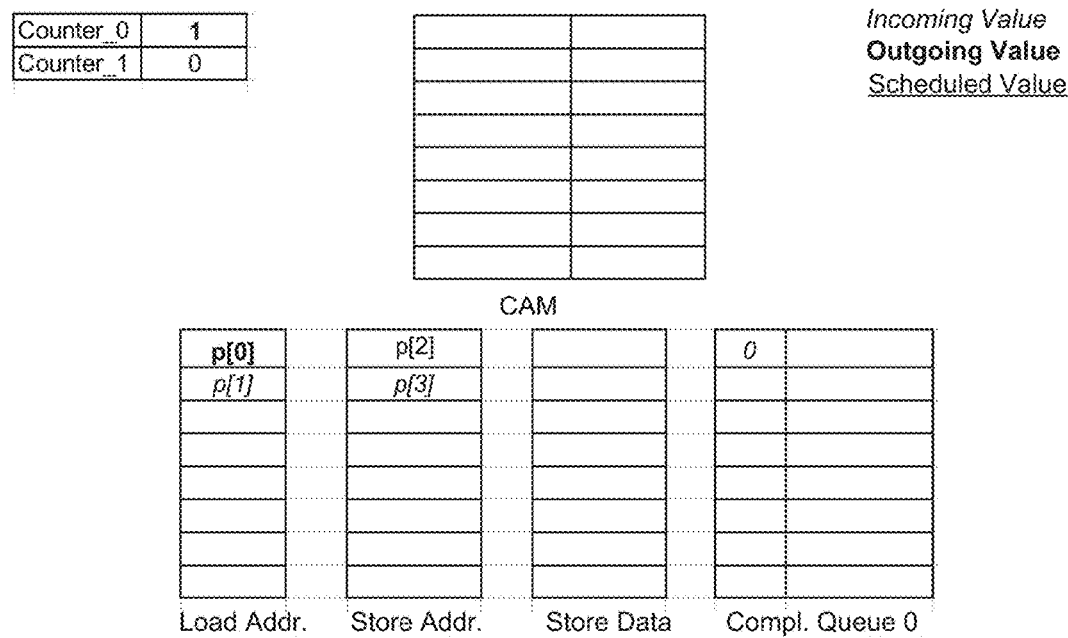

In FIG. 15B, address p[0] is bolded to indicate it is outgoing in this cycle. A new address p[1] is incoming into the load address queue and a new address p[3] is incoming into the store address queue. A zero ("0")-valued bit in the completion queue 542 is also incoming, which indicates any data present for that indexed entry is invalid. The value for the counter C1 is unchanged, and the value for counter C0 is bolded, indicating it is outgoing, corresponding to the outgoing load operation to address p[0].

In FIG. 15C, the outgoing address p[0] has now left the load address queue and a new address p[2] is incoming into the load address queue. And, the data (valued "0") is incoming, form memory, into the completion queue for the load from address p[0]. Further, the validity bit is set to "1" to indicate that the data in the completion queue is valid. Furthermore, a new address p[4] is incoming into the store address queue, and the address p[2] in the store address queue is underlined to indicate the store operation to p[2] has been scheduled. The value for counter C0 is indicated as outgoing and the value for counter C1 is indicated as incoming. The value of "1" for C1 indicates an incoming dependency for store operation to address p[4].

The address p[2] along with pointer "0" (pointing to the first slot in the store data queue) may be stored in an entry of the CAM, and are underlined to indicate that the entry is associated with the scheduled store operation to address p[2]. Note that the address p[2] for the newest (incoming) load operation is dependent on the value that first needs to be stored by the store operation for address p[2], which is at the top of the store address queue. Later, the indexed entry in the completion queue for the load operation from address p[2] may be annotated to link to the store data queue to a location to receive data to be written to address p[2], to effect data forwarding (FIG. 15F).

In FIG. 15D, the address p[1] in the load address queue is bolded to indicate it is outgoing to the memory. The corresponding "0" entry in the completion queue is likewise bolded as outgoing to the memory for address p[1]. Furthermore, a new address p[3] is incoming into the load address queue and a new address p[5] is incoming into the store address queue. The values for the counters C0 and C1 have switched, and the value for counter C0 is bolded as also outgoing with the load operation from address p[1], and the value for counter C1 is indicated as incoming and associated with the new store operation to address p[5]. The entry of address p[2] and pointer "0" remain in the CAM for the store operation to address p[2], as does the address p[2] in the store address queue, scheduled for completion.

Figure 15E:
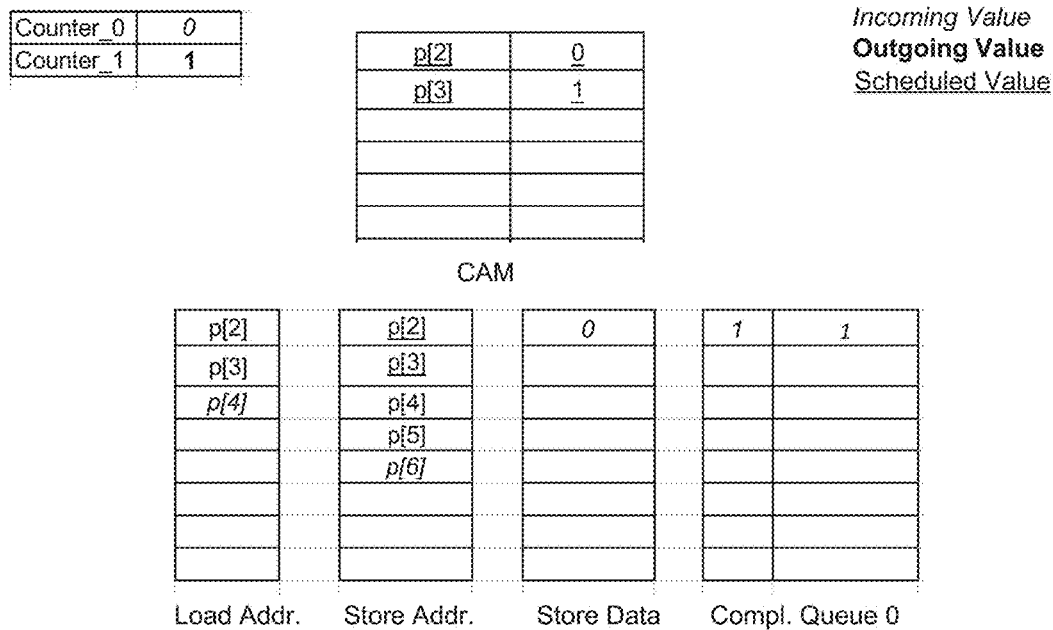
Figure 15F:
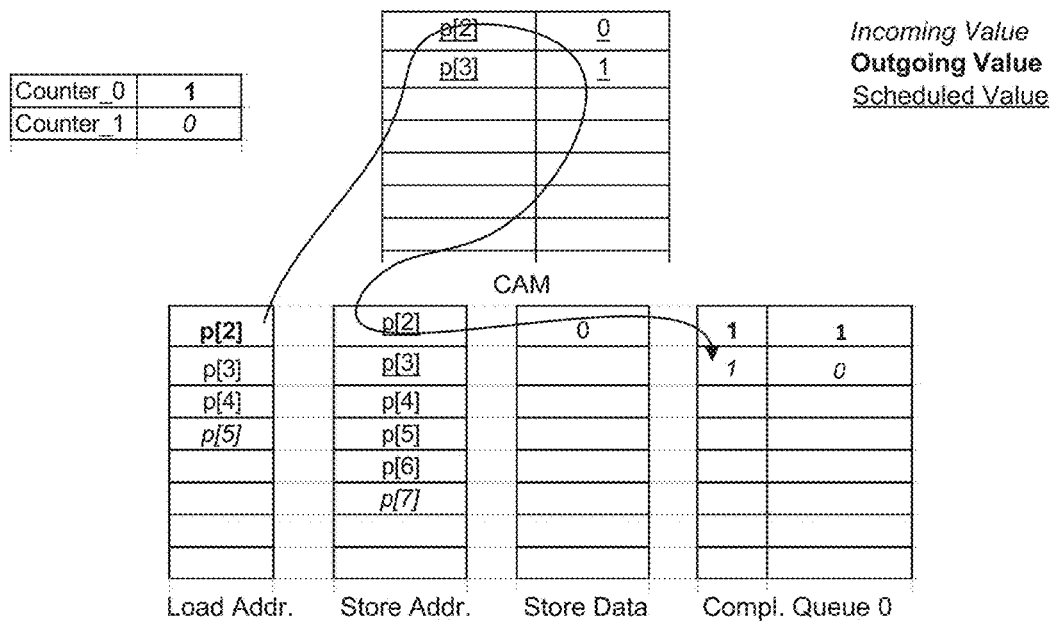

In FIG. 15E, the value ("0") for the address p[2] is incoming into the store data queue, while a new address p[4] comes into the load address queue and a new address p[6] comes into the store address queue. The counter values for C0 and C1 again are switched, with a value of "1" being bolded for counter C1, indicating it is outgoing, and the value of "0" being italicized for counter C0 indicating it is incoming for the new load operation from address p[4].

With further reference to FIG. 15E, the completion queue has a value of "1" indicated as incoming from memory for load p[1] (which was sent out to the memory in FIG. 15D). The entry in the CAM for address p[2] and pointer "0" remains, and a new entry is stored in the CAM for store to address p[3], which includes pointer "1," e.g., that points to index value one of the store data queue. The store to address p[3] has also been scheduled, so these values are all underlined.

In FIG. 15F, a store forward may be performed by noting the data (valued "0") needed by the store operation from address p[2] (which is bolded to indicate it would be outgoing to the memory) may be forwarded from the pointer location "0" in the store data queue to the in-order next slot of the completion queue. This data is now in the second slot of the completion queue, and the data forwarding is indicated with the swirly line. Further, a new address p[5] is incoming into the load address queue and a new address p[7] is incoming into the store address queue. The values for the counters C0 and C1 are again switched, and the value for counter C0 is bolded as outgoing (corresponding to outgoing load operation to address p[1]) and the value for counter C1 is italicized as incoming (corresponding to incoming store operation to address p[7]).

Figure 15G:
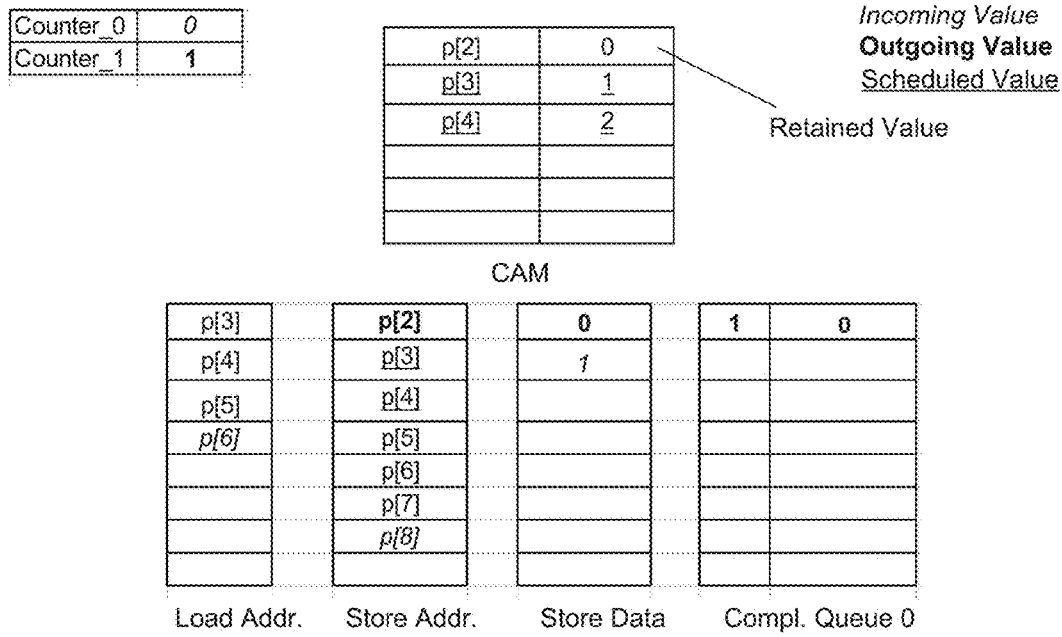

In FIG. 15G, the address p[2] and pointer "0" in the first entry in the CAM are no longer underlined, but may be retained for potential future forwarding to a subsequent, dependent memory operation. The address p[3] and pointer "1" in the second entry in the CAM remain underlined as still being associated with scheduled store operation to p[3]. A third entry may be stored in the CAM in conjunction with scheduling the store operation to address p[4] that includes pointer "2," to indicate pointing to a third slot in the index of the store data queue. The address p[4] and pointer "2" are also, therefore, underlined to indicate being associated with scheduled store operation to address p[4].

With further reference to FIG. 15G, the address p[2] for the store operation in the store address queue is bolded, indicating it is outgoing with the data (valued "0") in the store data queue. The value "0" in the completion queue for the load operation to p[2] is outgoing, but this time to the acceleration hardware to complete the load operation from p[2] without sending a request to memory. The store data queue is also receiving data valued "1" for the store p[3].

Furthermore, address p[6] is coming into the load address queue for a new load operation, and a new address p[8] is also incoming into the store address queue for a new store operation. The values of the counters C0 and C1 are again switched, and the value for counter C0 is incoming (corresponding to the new load operation to address p[6]) while the value for counter C1 is outgoing (corresponding to the outgoing store operation to p[2]).

Figure 15H:
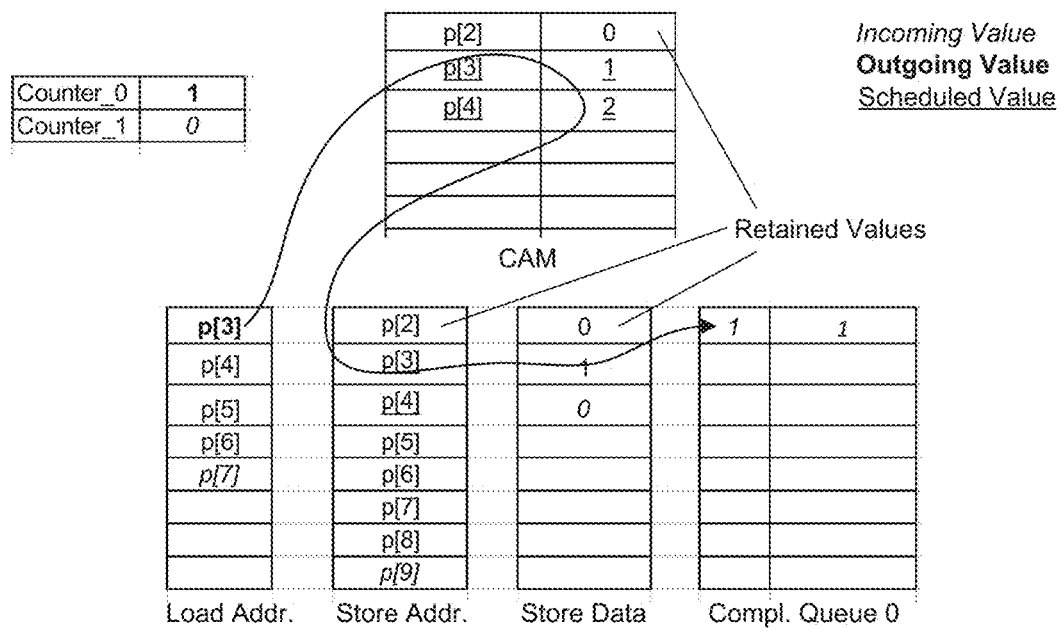

In FIG. 15H, the load operation from address p[3] may complete, again with data forwarding, from the store data received into the store data queue for address p[3], as the load operation succeeds the store operation as indicated by the dependency tokens provided by the counters C0 and C1. For example, the bolded "1" for counter C0 indicates outgoing dependency for the load operation to address p[3]. The memory ordering circuit 105, furthermore, may first query the CAM to find the address conflict to address p[3] between the outgoing load operation and the scheduled store operation. The memory ordering circuit 105 may retrieve the pointer "1," and then forward the data stored in the store data queue corresponding to index "1" to the completion queue (shown again by the swirly line). This data forwarding occurred without first scheduling the load operation from address p[3], and therefore the memory ordering circuit 105 has provided significant savings in latency and throughput with bypassing scheduling the load operation, sending a command to memory for the load operation, and receiving a load response from the memory for the load operation.

With continued reference to FIG. 15H, a new address p[7] is incoming into the load address queue and a new address p[9] is incoming into the store address queue. Because the store address p[2] and store data (valued "0") are retained, the CAM, the store address queue, and the store data queue continue to fill up. Indeed, the store address queue is now full. To free up some space in the store address queue, the alternative embodiment of the CAM includes buffering the data for the store operation p[2] in the CAM itself. In this way, data may still be provided for address p[2] while still cleaning out indexed slots of the store address and data queues.

Figure 15I:
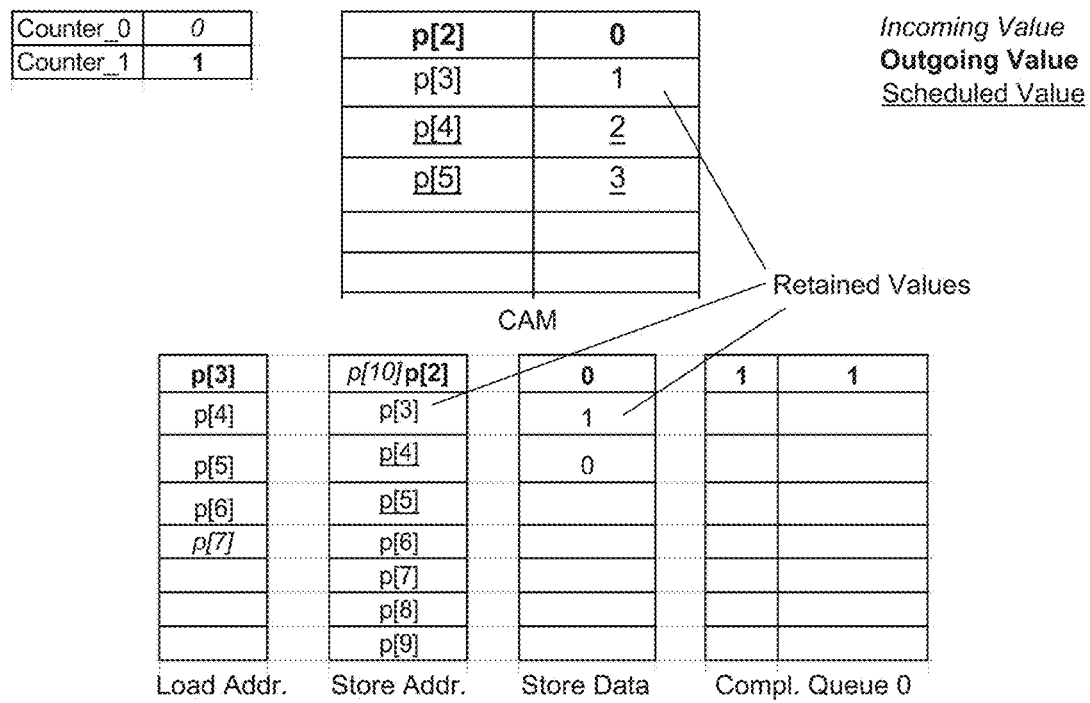

In FIG. 15I, the store address queue has run out of space to be able to queue address p[10] for the next store operation. In this scenario, the retained values for address p[2] may be evicted from the address and store data queues to make room to avoid stalling. This may be done in this case with no adverse effects because there are no foreseeable dependencies to address p[2] in the program, although any data buffered in the CAM for the store to address p[2] could optionally be retained (because the disambiguation queue is not yet full). Note that the address p[3] and pointer "1" may still be retained in the CAM and the address p[3] and data (valued "1") may be retained in the store address and data queues. The entries to the store address and data queues for p[3] may then be evicted in the next cycle. With longer input queues, the memory ordering circuit 105 need not reach the point of eviction so quickly, with the tradeoff being more hardware to perform the memory ordering and disambiguation.

With further reference to FIG. 15I, the address p[5] is underlined in the store address queue, to indicate that this store operation has now also been scheduled. An additional entry may be stored in the CAM that includes the address p[5] and a pointer "3" to indicate pointing to a fourth slot of an index of the store data queue. These values are also underlined to indicate that the associated store operation to address p[5] has been scheduled for completion. The data value "1" in the completion queue is bolded, as is the address p[3] in the load address queue, to indicate this load operation is outgoing to the acceleration hardware, performed with data forwarding in FIG. 15H.

In the present embodiment, the process of executing the code of FIGS. 13A and 13B may continue on with bouncing dependency tokens between "0" and "1" for the load operations and the store operations. This is due to the tight dependencies between p[i] and p[i+2]. Other code with less frequent dependencies may generate dependency tokens at a slower rate, and thus reset the counters C0 and C1 at a slower rate, causing the generation of tokens of higher values (corresponding to further semantically-separated memory operations).

Note, furthermore, that the microarchitecture 500 may also handle the reordering of store-store dependencies, load-load dependencies, and store-load dependencies with use of the disambiguation circuit 450, e.g., the CAM 1250. In particular store-store reordering is valuable when a succeeding store has received its data and the preceding store has not. Thus, there is an opportunity to release the succeeding store early. In this way, a store-store dependency may be similar to the load-store: the dependent store checks for an address conflict against the CAM and may issue if no conflict is found.

More specifically, in some embodiments, requests arising from the same memory operation are not re-ordered with respect to one another. Instead, these accesses may be guaranteed to be in order. The memory ordering circuit 105 may release a logically-succeeding store operation early, ahead of logically-preceding store operations, provided that the store operation checks the CAM 1250. The memory ordering circuit may still need to insert the store addresses, to check subsequent memory operations.

There is a small issue, however, when the same store address occurs twice in the same channel. If the memory ordering circuit 105 does nothing, the memory ordering circuit may block issuance of the dependent store operation, because the dependent store operation sees the query address in the CAM and has no way of knowing that the dependency is not actually real. To fix this, the operation manager circuit 430 may add some markers to CAM entries, for example, a bit vector encoding the memory operations that produced the address in the CAM 1250. The bit vector is a string of bits, with one bit representing each unique store operation that could be implemented on the memory interface at the same time. The bit vector is set to one ("1") if a particular memory operation has written the address associated with the entry in the CAM and zero ("0") if the address has not been written. In this way, the operations manager circuit 430 may know whether the conflict is real by checking the address and the bit vector in the CAM. If a different store operation produced the address, the conflict is real; otherwise, it is false. Bits in the bit vector are cleared when store operations to the associated address are sent to the memory subsystem. A CAM entry may be de-allocated when those operations have been sent and no bits in the bit vector are set. De-allocated entries may be reused by other store operations.

FIG. 16A is a block diagram illustrating a micro-architecture for a processor 1600 to perform operations of a processor or an integrated circuit that includes the memory subsystem 110 and the acceleration hardware 102 of FIGS. 1A-1B, according to an embodiment. Specifically, processor 1600 depicts an in-order architecture core and a register renaming logic, out-of-order issue/execution logic to be included in a processor according to at least one embodiment of the disclosure.

Processor 1600 includes a front end unit 1630 coupled to an execution engine unit 1650, and both are coupled to a memory unit 1670. The processor 1600 may include a reduced instruction set computing (RISC) core, a complex instruction set computing (CISC) core, a very long instruction word (VLIW) core, or a hybrid or alternative core type. As yet another option, processor 1600 may include a special-purpose core, such as, for example, a network or communication core, compression engine, graphics core, or the like. In one embodiment, processor 1600 may be a multi-core processor or may be part of a multi-processor system.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1640 may be implemented using various different mechanisms. Examples of suitable mechanisms include, but are not limited to, look-up tables, hardware implementations, programmable logic arrays (PLAs), microcode read only memories (ROMs), etc. The instruction cache unit 1634 is further coupled to the memory unit 1670. The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler circuit unit(s) 1656. The scheduler circuit unit(s) 1656 represents any number of different scheduler circuits, including reservations stations (RS), central instruction window, etc. The scheduler unit(s) 1656 is coupled to the physical register set(s) unit(s) 1658. Each of the physical register set(s) units 1658 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 1658 is overlapped by the retirement unit 1654 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1654 and the physical register set(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1656, physical register set(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which may include a data prefetcher 1680, a data TLB unit 1672, a data cache unit (DCU) 1674, and a level 2 (L2) cache unit 1676, to name a few examples. In some embodiments DCU 1674 is also known as a first level data cache (L1 cache). The DCU 1674 may handle multiple outstanding cache misses and continue to service incoming stores and loads. It also supports maintaining cache coherency. The data TLB unit 1672 is a cache used to improve virtual address translation speed by mapping virtual and physical address spaces. In one exemplary embodiment, the memory access units 1664 may include a load unit, a store address unit, and a store data unit, each of which is coupled to the data TLB unit 1672 in the memory unit 1670. The L2 cache unit 1676 may be coupled to one or more other levels of cache and eventually to a main memory.

In one embodiment, the data prefetcher 1680 speculatively loads/prefetches data to the DCU 1674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Note that instruction cache unit 1634, data cache unit 1674, and L2 cache unit 1676 would not generally implement the process described in this disclosure, as generally these cache units use on-die memory that does not exhibit page-locality behavior.

FIG. 16B is a block diagram illustrating an in-order pipeline and a register renaming stage, out-of-order issue/execution pipeline implemented by processor 1600 of FIG. 16A according to some embodiments of the disclosure. The solid lined boxes in FIG. 16B illustrate an in-order pipeline 1601, while the dashed lined boxes illustrate a register renaming, out-of-order issue/execution pipeline 1603. In FIG. 16B, the pipelines 1601 and 1603 include a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624. In some embodiments, the ordering of stages 1602-1624 may be different than illustrated and are not limited to the specific ordering shown in FIG. 16B.

Figure 17:
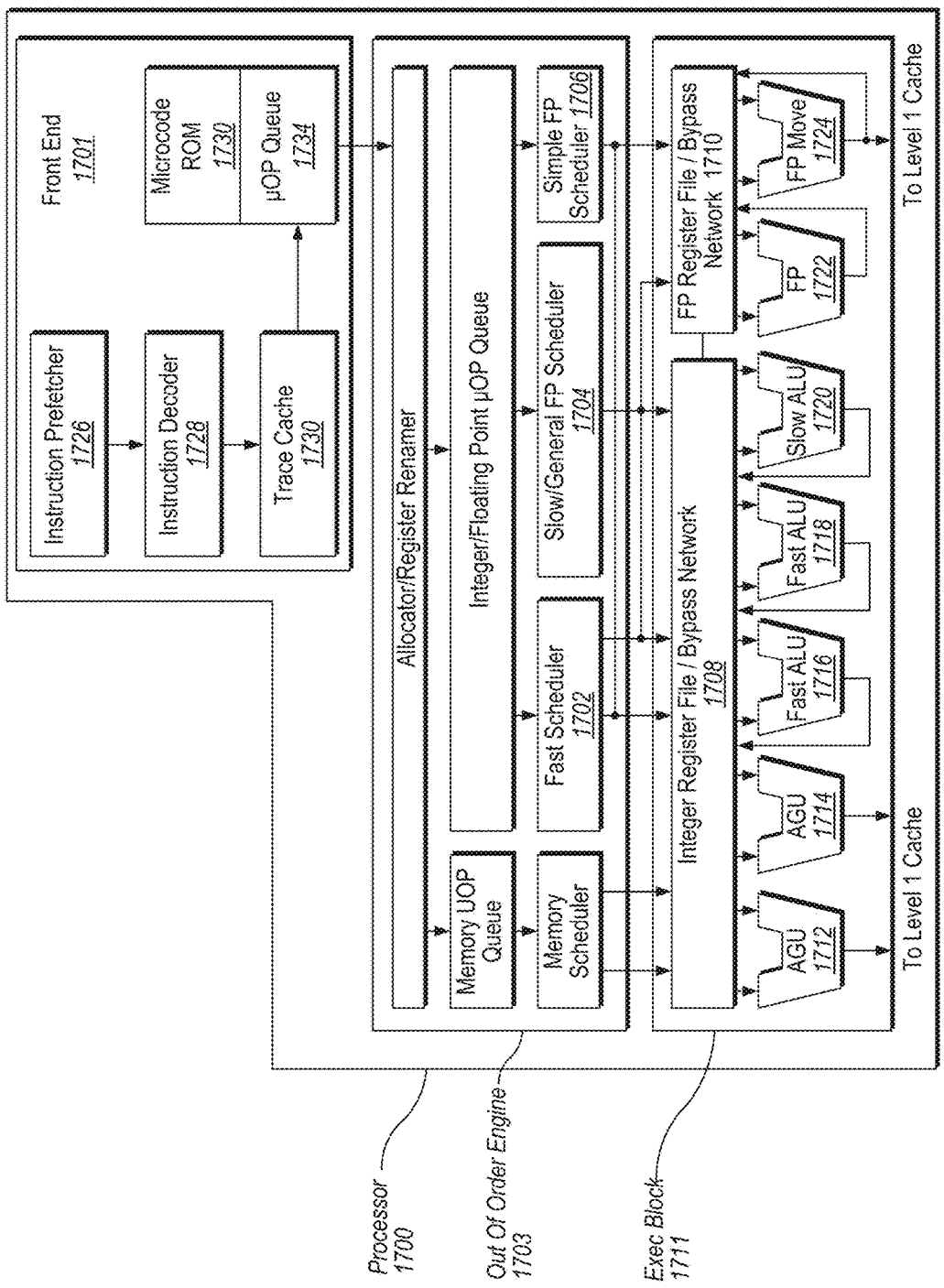
FIG. 17 illustrates a block diagram of the micro-architecture for a processor or an integrated circuit that includes the memory subsystem and the acceleration hardware of FIGS. 1A-1B, according to an embodiment of the present disclosure.

FIG. 17 illustrates a block diagram of the micro-architecture for a processor 1700 that includes logic circuits of a processor or an integrated circuit that includes the memory subsystem 110 and the acceleration hardware 102 of FIGS. 1A-1B, according to an embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1701 is the part of the processor 1700 that fetches instructions to be executed and prepares them to be used later in the processor pipeline. The embodiments of the page additions and content copying can be implemented in processor 1700.

The front end 1701 may include several units. In one embodiment, the instruction prefetcher 1716 fetches instructions from memory and feeds them to an instruction decoder 1718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1730 takes decoded uops and assembles them into program ordered sequences or traces in the uop queue 1734 for execution. When the trace cache 1730 encounters a complex instruction, microcode ROM (or RAM) 1732 provides the uops needed to complete the operation.

Some instructions are converted into a single micro-op, whereas others need several micro-ops to complete the full operation. In one embodiment, if more than four micro-ops are needed to complete an instruction, the decoder 1718 accesses the microcode ROM 1732 to do the instruction. For one embodiment, an instruction can be decoded into a small number of micro ops for processing at the instruction decoder 1718. In another embodiment, an instruction can be stored within the microcode ROM 1732 should a number of micro-ops be needed to accomplish the operation. The trace cache 1730 refers to an entry point programmable logic array (PLA) to determine a correct micro-instruction pointer for reading the micro-code sequences to complete one or more instructions in accordance with one embodiment from the micro-code ROM 1732. After the microcode ROM 1732 finishes sequencing micro-ops for an instruction, the front end 1701 of the machine resumes fetching micro-ops from the trace cache 1730.

The out-of-order execution engine 1703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1702, slow/general floating point scheduler 1704, and simple floating point scheduler 1706. The uop schedulers 1702, 1704, 1706, determine when a uop is ready to execute based on the readiness of their dependent input register operand sources and the availability of the execution resources the uops need to complete their operation. The fast scheduler 1702 of one embodiment can schedule on each half of the main clock cycle while the other schedulers can only schedule once per main processor clock cycle. The schedulers arbitrate for the dispatch ports to schedule uops for execution.

Register sets 1708, 1710, sit between the schedulers 1702, 1704, 1706, and the execution units 1712, 1714, 1716, 1718, 1720, 1722, 1724 in the execution block 1711. There is a separate register set 1708, 1710, for integer and floating point operations, respectively. Each register set 1708, 1710, of one embodiment also includes a bypass network that can bypass or forward just completed results that have not yet been written into the register set to new dependent uops. The integer register set 1708 and the floating point register set 1710 are also capable of communicating data with the other. For one embodiment, the integer register set 1708 is split into two separate register sets, one register set for the low order 32 bits of data and a second register set for the high order 32 bits of data. The floating point register set 1710 of one embodiment has 128 bit wide entries because floating point instructions typically have operands from 64 to 128 bits in width.

The execution block 1711 contains the execution units 1712, 1714, 1716, 1718, 1720, 1722, 1724, where the instructions are actually executed. This section includes the register sets 1708, 1710, that store the integer and floating point data operand values that the micro-instructions need to execute. The processor 1700 of one embodiment is comprised of a number of execution units: address generation unit (AGU) 1712, AGU 1714, fast ALU 1716, fast ALU 1718, slow ALU 1720, floating point ALU 1712, floating point move unit 1714. For one embodiment, the floating point execution blocks 1712, 1714, execute floating point, MMX, SIMD, and SSE, or other operations. The floating point ALU 1712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1716, 1718. The fast ALUs 1716, 1718, of one embodiment can execute fast operations with an effective latency of half a clock cycle. For one embodiment, most complex integer operations go to the slow ALU 1720 as the slow ALU 1720 includes integer execution hardware for long latency type of operations, such as a multiplier, shifts, flag logic, and branch processing. Memory load/store operations are executed by the AGUs 1722, 1724. For one embodiment, the integer ALUs 1716, 1718, 1720, are described in the context of performing integer operations on 64 bit data operands. In alternative embodiments, the ALUs 1716, 1718, 1720, can be implemented to support a variety of data bits including 16, 32, 128, 256, etc. Similarly, the floating point units 1722, 1724, can be implemented to support a range of operands having bits of various widths. For one embodiment, the floating point units 1722, 1724, can operate on 128 bits wide packed data operands in conjunction with SIMD and multimedia instructions.

In one embodiment, the uops schedulers 1702, 1704, 1706, dispatch dependent operations before the parent load has finished executing. As uops are speculatively scheduled and executed in processor 1700, the processor 1700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register set of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register set or different register sets. Furthermore, in one embodiment, floating point and integer data may be stored in different registers or the same registers.

Figure 18:
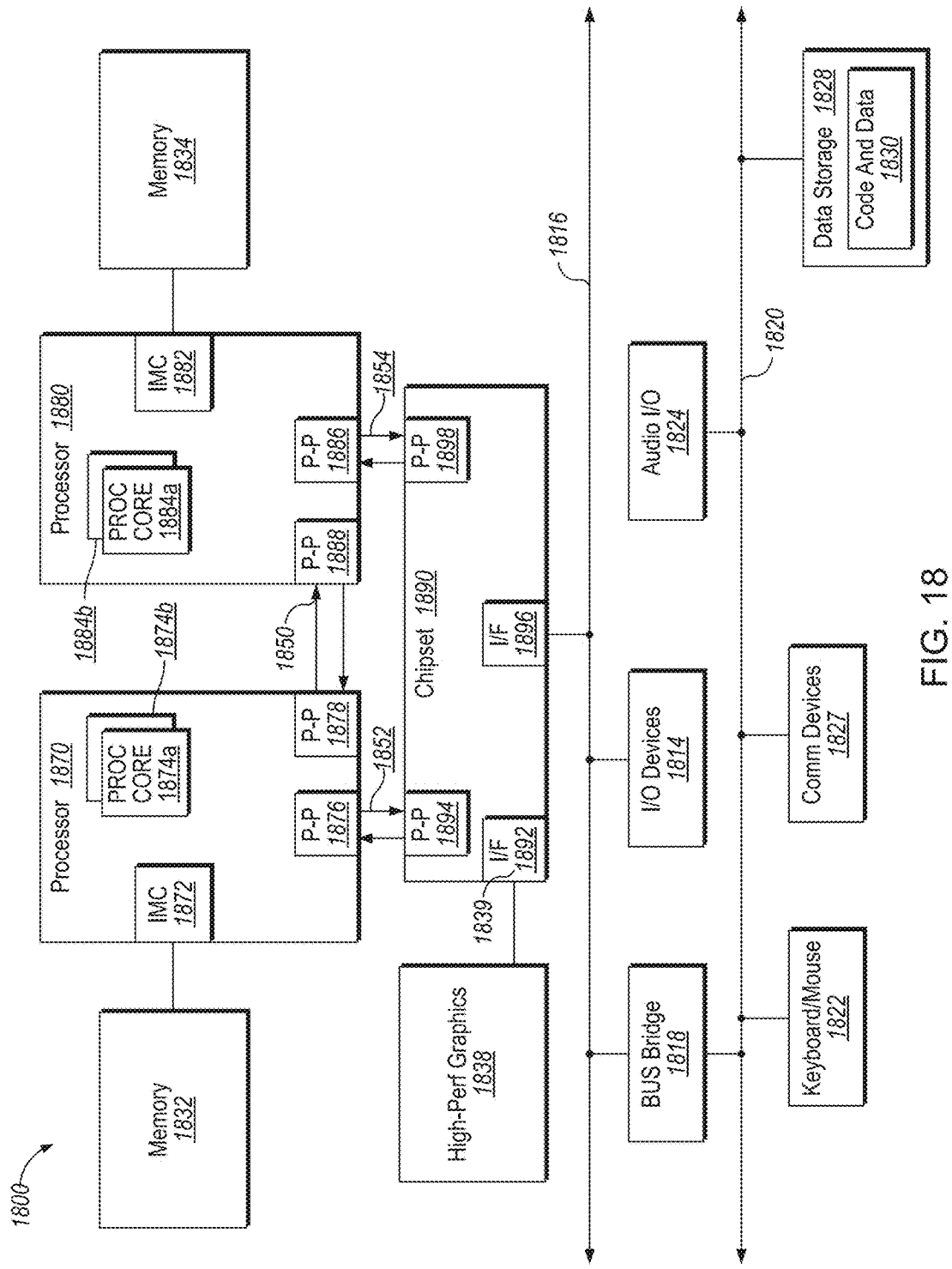
FIG. 18 is a block diagram of a computer system according to one implementation.

Embodiments may be implemented in many different system types. Referring now to FIG. 18, shown is a block diagram of a multiprocessor system 1800 in accordance with an implementation. As shown in FIG. 18, multiprocessor system 1800 is a point-to-point interconnect system, and includes a first processor 1870 and a second processor 1880 coupled via a point-to-point interconnect 1850. As shown in FIG. 18, each of processors 1870 and 1880 may be multicore processors, including first and second processor cores (i.e., processor cores 1874a and 1874b and processor cores 1884a and 1884b), although potentially many more cores may be present in the processors.

While shown with two processors 1870, 1880, it is to be understood that the scope of the present disclosure is not so limited. In other implementations, one or more additional processors may be present in a given processor.

Processors 1870 and 1880 are shown including integrated memory controller units 1872 and 1882, respectively. Processor 1870 also includes as part of its bus controller units point-to-point (P-P) interfaces 1876 and 1888; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may also exchange information with a high-performance graphics circuit 1838 via a high-performance graphics interface 1839.

A shared cache (not shown) may be included in either processor or outside of both processors, yet connected with the processors via P-P interconnect, such that either or both processors' local cache information may be stored in the shared cache if a processor is placed into a low power mode. Page locality may also be created in the shared cache across one or more cache controllers when allocating entries to the shared cache.

Chipset 1890 may be coupled to a first bus 1816 via an interface 1896. In one embodiment, first bus 1816 may be a Peripheral Component Interconnect (PCI) bus, or a bus such as a PCI Express bus or interconnect bus, although the scope of the present disclosure is not so limited.

Figure 19:
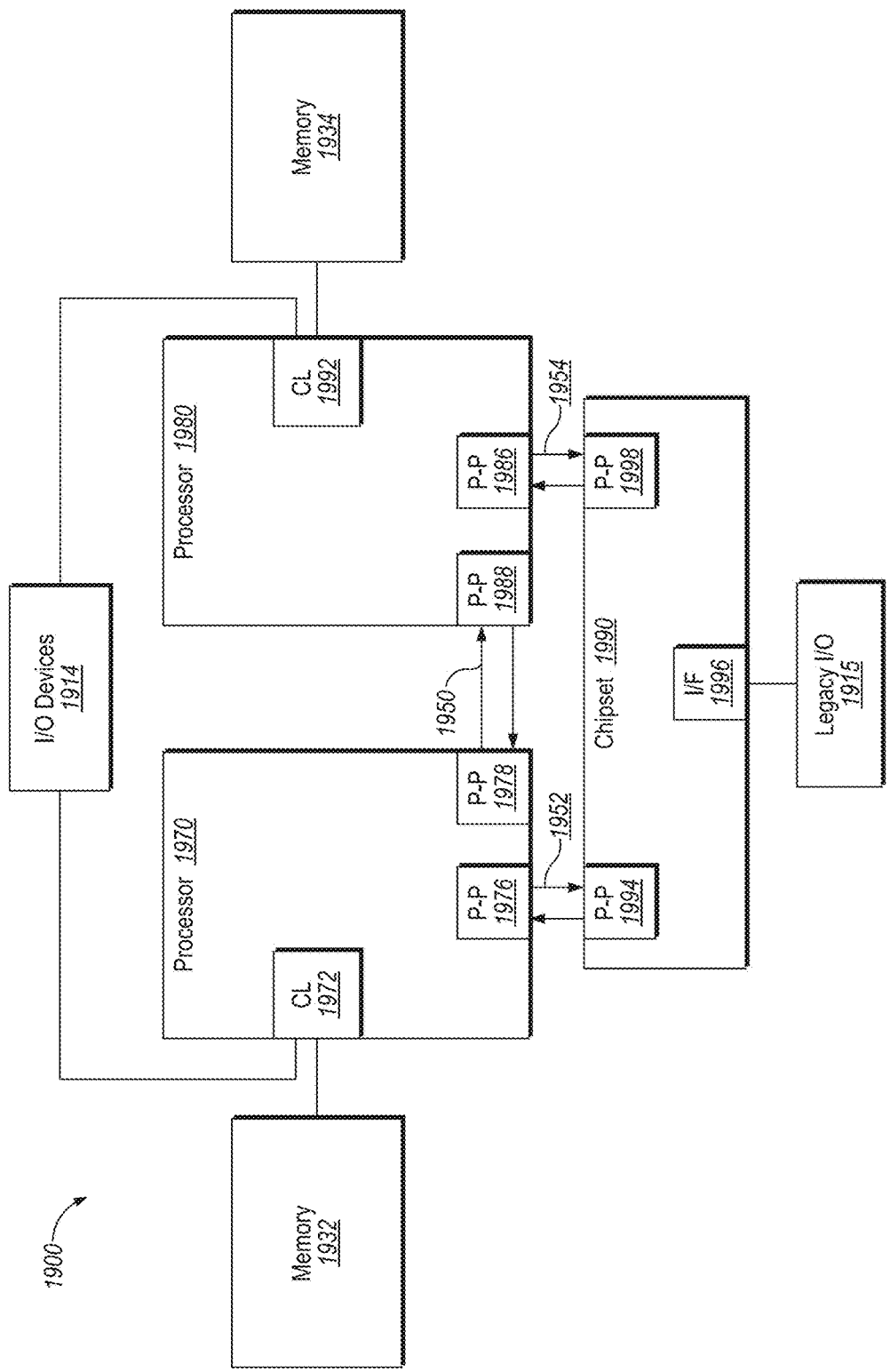
FIG. 19 is a block diagram of a computer system according to another implementation.

Referring now to FIG. 19, shown is a block diagram of a third system 1600 in accordance with an embodiment of the present disclosure. Like elements in FIGS. 18 and 19 bear like reference numerals, and certain aspects of FIG. 19 have been omitted from FIG. 18 in order to avoid obscuring other aspects of FIG. 19.

FIG. 19 illustrates that the processors 1970, 1980 may include integrated memory and I/O control logic ("CL") 1972 and 1992, respectively. For at least one embodiment, the CL 1972, 1982 may include integrated memory controller units such as described herein. In addition. CL 1972, 1992 may also include I/O control logic. FIG. 19 illustrates that the memories 1932, 1934 are coupled to the CL 1972, 1992, and that I/O devices 1914 are also coupled to the control logic 1972, 1992. Legacy I/O devices 1915 are coupled to the chipset 1990.

Figure 20:
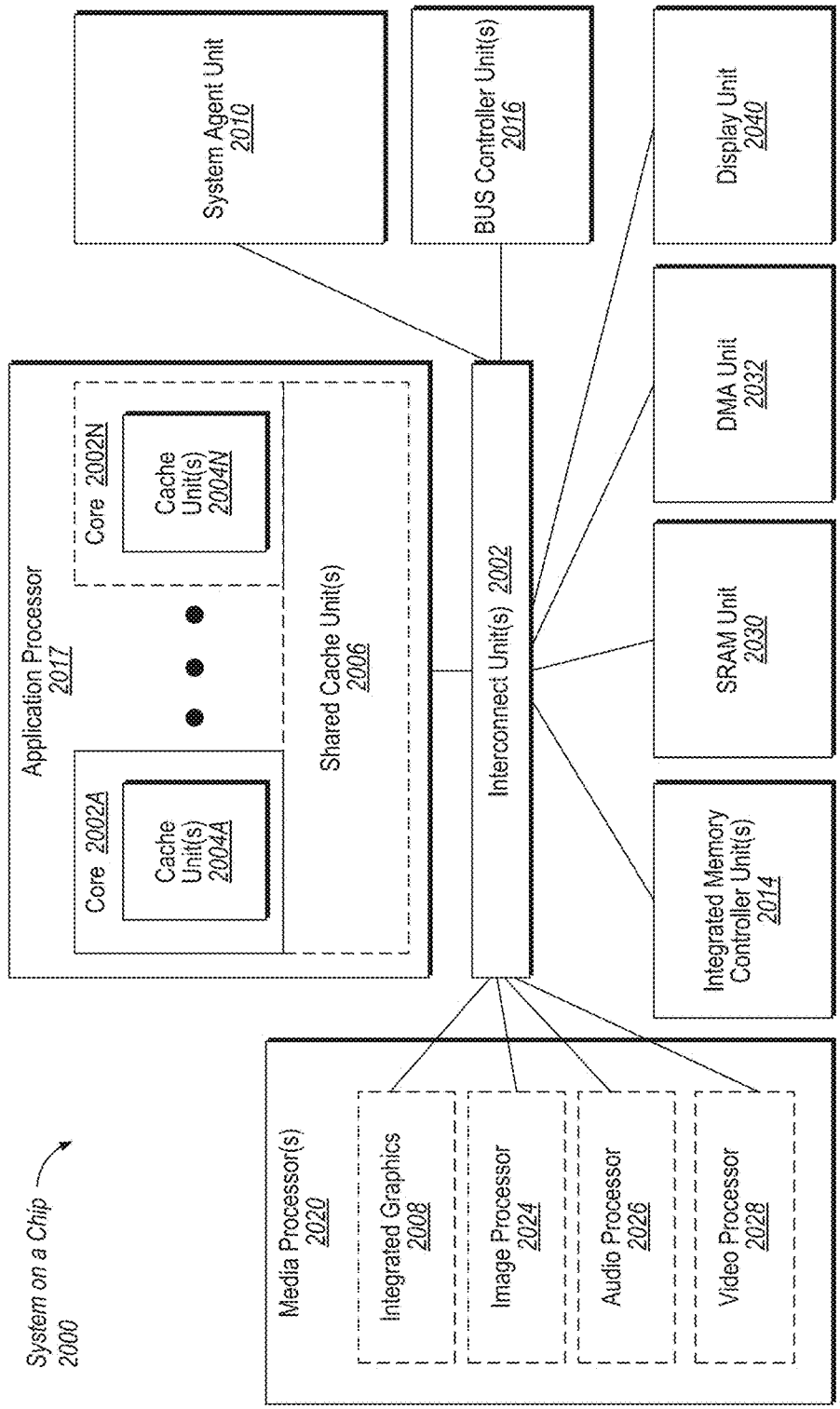
FIG. 20 is a block diagram of a system-on-a-chip according to one implementation.

FIG. 20 is an exemplary system on a chip (SoC) 2000 that may include one or more of the cores 2002A . . . 2002N. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 2000 of FIG. 20, dashed lined boxes are features on more advanced SoCs. An interconnect unit(s) 2002 may be coupled to: an application processor 2017 which includes a set of one or more cores 2002A-N and shared cache unit(s) 2006; a system agent unit 2010; a bus controller unit(s) 2016; an integrated memory controller unit(s) 2014; a set of one or more media processors 2020 which may include integrated graphics logic 2008, an image processor 2024 for providing still and/or video camera functionality, an audio processor 2026 for providing hardware audio acceleration, and a video processor 2028 for providing video encode/decode acceleration; a static random access memory (SRAM) unit 2030; a direct memory access (DMA) unit 2032; and a display unit 2040 for coupling to one or more external displays.

Figure 21:
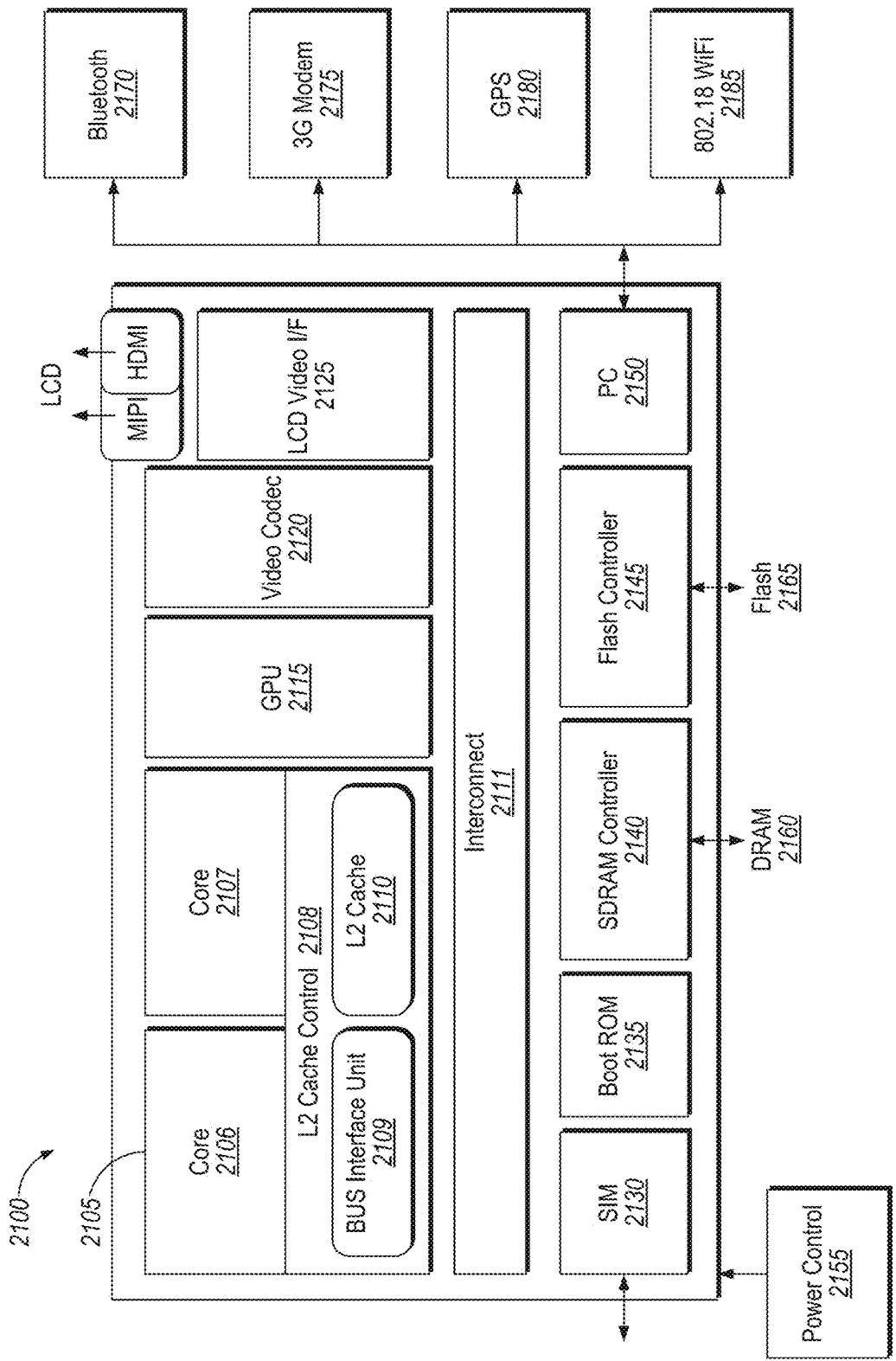
FIG. 21 illustrates another implementation of a block diagram for a computing system.

Turning next to FIG. 21, an embodiment of a system on-chip (SoC) design in accordance with embodiments of the disclosure is depicted. As an illustrative example, SoC 2100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 2100.

Here, SoC 2100 includes 2 cores—2106 and 2107. Similar to the discussion above, cores 2106 and 2107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 2106 and 2107 are coupled to cache control 2108 that is associated with bus interface unit 2109 and L2 cache 2110 to communicate with other parts of system 2100. Interconnect 2111 includes an on-chip interconnect, such as an IOSF, AMBA, or other interconnects discussed above, which can implement one or more aspects of the described disclosure.

In one embodiment, SDRAM controller 2140 may connect to interconnect 2111 via cache 2110. Interconnect 2111 provides communication channels to the other components, such as a Subscriber Identity Module (SIM) 2130 to interface with a SIM card, a boot ROM 2135 to hold boot code for execution by cores 2106 and 2107 to initialize and boot SoC 2100, a SDRAM controller 2140 to interface with external memory (e.g. DRAM 2160), a flash controller 2145 to interface with non-volatile memory (e.g. Flash 2165), a peripheral control 2150 (e.g. Serial Peripheral Interface) to interface with peripherals, video codecs 2120 and Video interface 2125 to display and receive input (e.g. touch enabled input), GPU 2115 to perform graphics related computations, etc. Any of these interfaces may incorporate aspects of the embodiments described herein.

In addition, the system illustrates peripherals for communication, such as a Bluetooth® module 2170, 3G modem 2175, GPS 2180, and Wi-Fi® 2185. Note as stated above, a UE includes a radio for communication. As a result, these peripheral communication modules may not all be included. However, in a UE some form of a radio for external communication should be included.

Figure 22:
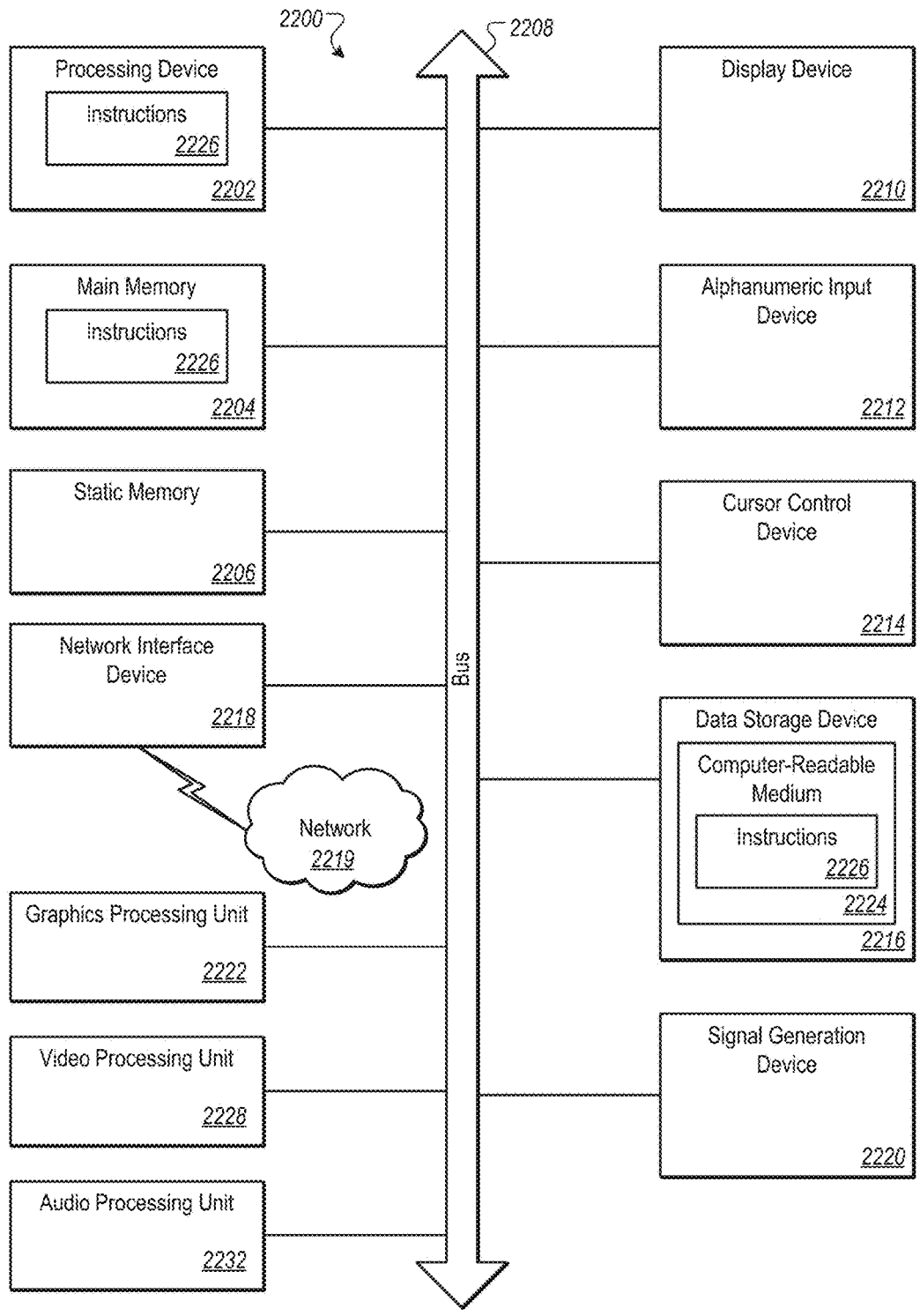
FIG. 22 illustrates another implementation of a block diagram for a computing system.

FIG. 22 illustrates a diagrammatic representation of a machine in the example form of a computing system 2200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 2200.

The computing system 2200 includes a processing device 2202, main memory 2204 (e.g., flash memory, dynamic random access memory (DRAM) (such as synchronous DRAM (SDRAM) or DRAM (RDRAM), etc.), a static memory 2206 (e.g., flash memory, static random access memory (SRAM), etc.), and a data storage device 2218, which communicate with each other via a bus 2208.

Processing device 2202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 2202 may also be one or more special-purpose processing devices such as an application-specific integrated circuit (ASIC), a field programmable gate array (FPGA), a digital signal processor (DSP), network processor, or the like. In one embodiment, processing device 2202 may include one or more processor cores. The processing device 2202 is configured to execute the processing logic 2226 for performing the operations discussed herein.

In one embodiment, processing device 2202 can be part of a processor or an integrated circuit that includes the memory subsystem and the acceleration hardware of FIGS. 1A-1B. Alternatively, the computing system 2200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 2200 may further include a network interface device 2218 communicably coupled to a network 2219. The computing system 2200 also may include a video display device 2210 (e.g., a liquid crystal display (LCD) or a cathode ray tube (CRT)), an alphanumeric input device 2210 (e.g., a keyboard), a cursor control device 2214 (e.g., a mouse), a signal generation device 2220 (e.g., a speaker), or other peripheral devices. Furthermore, computing system 2200 may include a graphics processing unit 2222, a video processing unit 2228 and an audio processing unit 2232. In another embodiment, the computing system 2200 may include a chipset (not illustrated), which refers to a group of integrated circuits, or chips, that are designed to work with the processing device 2202 and controls communications between the processing device 2202 and external devices. For example, the chipset may be a set of chips on a motherboard that links the processing device 2202 to very high-speed devices, such as main memory 2204 and graphic controllers, as well as linking the processing device 2202 to lower-speed peripheral buses of peripherals, such as USB, PCI or ISA buses.

The data storage device 2218 may include a computer-readable storage medium 2224 on which is stored software 2226 embodying any one or more of the methodologies of functions described herein. The software 2226 may also reside, completely or at least partially, within the main memory 2204 as instructions 2226 and/or within the processing device 2202 as processing logic during execution thereof by the computing system 2200; the main memory 2204 and the processing device 2202 also constituting computer-readable storage media.

The computer-readable storage medium 2224 may also be used to store instructions 2226 utilizing the processing device 2202, and/or a software library containing methods that call the above applications. While the computer-readable storage medium 2224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an integrated circuit comprising: 1) a processor to execute instructions of a program and to interact with a memory; 2) acceleration hardware to execute a sub-program corresponding to the instructions; 3) a set of input queues coupled to the acceleration hardware and to the memory, the set of input queues comprising: a) a store address queue to receive, from the acceleration hardware, a first address of the memory, the first address associated with a store operation; and b) a store data queue to receive, from the acceleration hardware, first data to be stored at the first address of the memory; 4) a completion queue to buffer response data for a load operation; and 5) a disambiguator circuit coupled to the set of input queues and the completion queue, the disambiguator circuit to, responsive to determining the load operation that succeeds the store operation has an address conflict with the first address, copy the first data from the store data queue into the completion queue for the load operation.

In Example 2, the integrated circuit of Example 1, further comprising an operations queue coupled to the set of input queues, the operations queue to buffer address arguments for the store operation and the load operation, comprising: a) a channel of the set of input queues at which to retrieve the first address for the store operation; and b) a second channel of the set of input queues at which to retrieve the first address for the load operation.

In Example 3, the integrated circuit of Example 1, further comprising a scheduler circuit coupled to the set of input queues and to a memory interface, the scheduler circuit to: a) schedule issuance of the store operation upon receipt of the first address; and b) trigger generation of a dependency token to indicate, to the load operation, a dependency on the first data stored by the store operation In Example 4, the integrated circuit of Example 3, further comprising an execution circuit coupled to the scheduler circuit, to the set of input queues, and to the memory, the execution circuit to, upon detecting reception of the first data in the store data queue, issue the store operation to the memory with the dependency token, to store the first data at the first address.

In Example 5, the integrated circuit of Example 3, wherein the disambiguator circuit comprises a content-addressable memory (CAM), and the scheduler circuit is further to store an entry in the CAM, the entry comprising the first address and a pointer into the store data queue to a location at which to receive the first data.

In Example 6, the integrated circuit of Example 5, wherein the disambiguator circuit is further to stall in response to the CAM filling up with entries for scheduled store operations.

In Example 7, the integrated circuit of Example 5, wherein the scheduler circuit is further to, upon receipt of the first data in the store data queue, store the first data in the CAM in association with the entry, and wherein the disambiguator circuit is to retain the first data in a disambiguator queue of the disambiguator circuit, the first data to be forwarded to a subsequent memory operation that succeeds the load operation.

In Example 8, the integrated circuit of Example 5, wherein the set of input queues further comprises a load address queue to receive, from the acceleration hardware, the first address for the load operation, and wherein the scheduler circuit is further to: a) detect, based on a search of the CAM, an address conflict between the load operation and the store operation; b) retrieve the pointer from the CAM; and c) annotate an indexed slot of the completion queue with the location in the pointer, to schedule issuance of the load operation upon receipt of the data at the location of the store data queue.

In Example 9, the integrated circuit of Example 1, wherein one of the set of input queues and the completion queue is a ring buffer.

Various embodiments may have different combinations of the structural features described above. For instance, all optional features of the computing system described above may also be implemented with respect to the method or process described herein and specifics in the examples may be used anywhere in one or more embodiments.

Example 10 is a memory ordering circuit comprising: 1) a memory interface coupled to a memory, the memory to store data corresponding to instructions being executed for a program; 2) an operations queue coupled to the memory interface, the operations queue to buffer memory operations corresponding to the instructions; 3) a set of input queues coupled to the memory interface and to acceleration hardware, which is to execute a sub-program corresponding to the instructions, the set of input queues comprising: a) a store address queue to receive, from the acceleration hardware, a first address of the memory for a store operation of the memory operations; and b) a store data queue to receive, from the acceleration hardware, first data to be stored at the first address in completion of the store operation; 4) a disambiguator circuit coupled to the set of input queues, the disambiguator circuit including a disambiguator queue; and 5) an operations manager circuit coupled to the set of input queues and the disambiguator circuit, the operations manager circuit to: a) schedule the store operation to issue to the memory upon receipt of the first address; and b) store an entry in the disambiguator queue, the entry comprising the first address and a pointer into the store data queue to a location at which to receive the first data for the store operation.

In Example 11, the memory ordering circuit of Example 10, wherein the disambiguator circuit comprises one of a disambiguation content-addressable memory (CAM) or a counting Bloom filter.

In Example 12, the memory ordering circuit of Example 10, wherein the set of input queues further comprises a load address queue to receive a second address, from the acceleration hardware, for a succeeding load operation, wherein the operation manager is further to: a) detect, based on a search requested of the disambiguator circuit, no address conflict between the store operation and the succeeding load operation; and b) issue the load operation to the memory without waiting for completion of the store operation.

In Example 13, the memory ordering circuit of Example 10, wherein the set of input queues further comprises a load address queue to receive the first address, from the acceleration hardware, for a load operation that succeeds the store operation, further comprising: 1) a completion queue coupled to the operations manager circuit and to the memory, the completion queue to enqueue data received for completion of the load operation; and 2) a dependency queue coupled to the acceleration hardware and to receive, from the acceleration hardware, a dependency token associated with the first address for the load operation, the dependency token indicating a dependency on the first data to be stored by the store operation.

In Example 14, the memory ordering circuit of Example 13, wherein the completion queue is a ring buffer.

In Example 15, the memory ordering circuit of Example 13, wherein the operations manager circuit is further to: a) detect, based on a search requested of the disambiguator circuit, an address conflict between the load operation and the store operation; b) retrieve the pointer from the disambiguator queue; and c) annotate an indexed slot of the completion queue with the location of the pointer, to schedule issuance of the load operation upon receipt of the data at the location in the store data queue.

In Example 16, the memory ordering circuit of Example 15, wherein the operations manager circuit is further to: a) detect arrival of the first data at the location of the pointer into the store data queue; and b) enqueue the data, from the location in the store data queue, into the indexed slot of the completion queue, to thereby complete data forwarding to the load operation.

In Example 17, the memory ordering circuit of Example 13, further comprising an operations queue coupled to the operations manager circuit and to the memory interface, the operations queue to buffer the load operation and the store operation, each of which comprise a memory argument containing an indication of whether to interact with the disambiguator circuit, wherein the operations manager circuit is further to, responsive to detecting the indication to access the disambiguator circuit: a) direct the disambiguator circuit to store the entry for the store operation; and b) check the disambiguator circuit for an address conflict between the store operation and the load operation In Example 18, the memory ordering circuit of Example 10, wherein the operations manager circuit is further to: a) trigger generation of a dependency token to indicate, to a succeeding dependent memory operation, a dependency on the data stored by the store operation; and b) in response to detecting receipt of the first data into the store data queue, issue a store command containing the dependency token directed to the first address in the memory.

Various embodiments may have different combinations of the structural features described above. For instance, all optional features of the processors and methods described above may also be implemented with respect to a system described herein and specifics in the examples may be used anywhere in one or more embodiments.

Example 19 is a method comprising: 1) queuing memory operations in an operations queue of a memory ordering circuit, the memory operations directed towards a memory in association with acceleration hardware; 2) receiving, into a load address queue of a set of input queues, a load address received from the acceleration hardware for a load operation of the memory operations; 3) determining, by a disambiguator circuit, the load address matches a store address buffered in a store address queue for a store operation of the memory operations, the store operation preceding the load operation according to program order; and 4) marking, by the memory ordering circuit and in response to the determining, the load operation as a store forward with a pointer to a location, within a store data queue of the set of input queues, for reception of data to complete the store operation and the load operation.

In Example 20, the method of Example 19, further comprising: 1) scheduling the store operation to issue to the memory upon receipt of the store address; and 2) storing an entry in a disambiguator queue of the disambiguator circuit, the entry comprising the store address and the pointer.

In Example 21, the method of Example 20, further comprising: 1) storing the data in the disambiguator queue in association with the entry, in response to receiving the data into the store data queue; and 2) retaining the data, in the disambiguator queue, to be forwarded to a subsequent memory operation that succeeds the load operation In Example 22, the method of Example 20, further comprising, in response to receiving the data into the location of the store data queue: 1) copying the data, from the location in the store data queue, into an indexed slot of a completion queue for the load operation; 2) issuing the store operation to the memory to complete the store operation; and 3) sending the data, from the completion queue, to the acceleration hardware in response to the load operation.

In Example 23, the method of Example 22, further comprising retaining the data, in the store data queue, after completion of the store operation, to fulfill at least a second load operation.

In Example 24, the method of Example 22, further comprising: 1) receiving, in a dependency queue of the set of input queues, a dependency token associated with the load address buffered in the load address queue, the dependency token indicating dependency on the data stored by the store operation; 2) duplicating the dependency token for a subsequent memory operation that is dependent on the load operation; and 3) wherein the sending the data to the acceleration hardware further comprises sending the dependency token with the data to the acceleration hardware, to complete the load operation.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An integrated circuit comprising:
   a processor to execute instructions of a program and to interact with a memory;
   acceleration hardware to execute a sub-program corresponding to the instructions;
   a set of input queues coupled to the acceleration hardware and to the memory, the set of input queues comprising:
      a store address queue to receive, directly from the acceleration hardware, a first address of the memory, the first address associated with a store operation, and
      a store data queue to receive, directly from the acceleration hardware, first data to be stored at the first address of the memory;
   a completion queue to buffer response data for a load operation; and
   a disambiguator circuit coupled to the set of input queues and the completion queue, wherein the load operation comprises an indicator field that when set to a first value causes a query of the disambiguator circuit and when set to a second value does not cause the query of the disambiguator circuit, and the disambiguator circuit is to, responsive to the indicator field of the load operation being set to the first value, determine the load operation that succeeds the store operation has an address conflict with the first address, copy the first data from the store data queue into the completion queue for the load operation, wherein to succeed the store operation, the load operation is to semantically follow the store operation according to a semantical order of the sub-program.

2. The integrated circuit of claim 1, further comprising an operations queue coupled to the set of input queues, the operations queue to buffer address arguments for the store operation and the load operation, comprising:
   a channel of the set of input queues at which to retrieve the first address for the store operation; and
   a second channel of the set of input queues at which to retrieve the first address for the load operation.

3. The integrated circuit of claim 1, further comprising a scheduler circuit coupled to the set of input queues and to a memory interface, the scheduler circuit to:
   schedule issuance of the store operation upon receipt of the first address; and
   trigger generation of a dependency token to indicate, to the load operation, a dependency on the first data stored by the store operation.

4. The integrated circuit of claim 3, further comprising an execution circuit coupled to the scheduler circuit, to the set of input queues, and to the memory, the execution circuit to, upon detecting reception of the first data in the store data queue, issue the store operation to the memory with the dependency token, to store the first data at the first address.

5. The integrated circuit of claim 3, wherein the disambiguator circuit comprises a content-addressable memory (CAM), and the scheduler circuit is further to store an entry in the CAM, the entry comprising the first address and a pointer into the store data queue to a location at which to receive the first data.

6. The integrated circuit of claim 5, wherein the disambiguator circuit is further to stall in response to the CAM filling up with entries for scheduled store operations.

7. The integrated circuit of claim 5, wherein the scheduler circuit is further to, upon receipt of the first data in the store data queue, store the first data in the CAM in association with the entry, and wherein the disambiguator circuit is to retain the first data in a disambiguator queue of the disambiguator circuit, the first data to be forwarded to a subsequent memory operation that succeeds the load operation.

8. The integrated circuit of claim 5, wherein the set of input queues further comprises a load address queue to receive, from the acceleration hardware, the first address for the load operation, and wherein the scheduler circuit is further to:
   detect, based on a search of the CAM, an address conflict between the load operation and the store operation;
   retrieve the pointer from the CAM; and
   annotate an indexed slot of the completion queue with the location in the pointer, to schedule issuance of the load operation upon receipt of the data at the location of the store data queue.

9. The integrated circuit of claim 1, wherein one of the set of input queues and the completion queue is a ring buffer.

10. A memory ordering circuit comprising:
    a memory interface coupled to a memory, the memory to store data corresponding to instructions being executed for a program;
    an operations queue coupled to the memory interface, the operations queue to buffer memory operations corresponding to the instructions;
    a set of input queues coupled to the memory interface and to acceleration hardware, which is to execute a sub-program corresponding to the instructions, the set of input queues comprising:
       a store address queue to receive, from the acceleration hardware, a first address of the memory for a store operation of the memory operations, and a store data queue to receive, from the acceleration hardware, first data to be stored at the first address in completion of the store operation;

a disambiguator circuit coupled to the set of input queues and to the acceleration hardware, the disambiguator circuit including a disambiguator queue, wherein each of the memory operations comprises an indicator field that when set to a first value causes a respective query of the disambiguator circuit and when set to a second value does not cause the respective query of the disambiguator circuit; and an operations manager circuit coupled to the set of input queues and the disambiguator circuit, the operations manager circuit to:

schedule the store operation, which resides in the operations queue, to issue to the memory upon receipt of the first address; and store an entry in the disambiguator queue, the entry comprising the first address and a pointer into the store data queue to a location at which to receive the first data for the store operation, wherein locations within the store data queue correspond to out-of-order receipt of data from the acceleration hardware.

11. The memory ordering circuit of claim 10, wherein the disambiguator circuit comprises one of a disambiguation content-addressable memory (CAM) or a counting Bloom filter.

12. The memory ordering circuit of claim 10, wherein the set of input queues further comprises a load address queue to receive a second address, from the acceleration hardware, for a succeeding load operation, wherein the operation manager is further to:

detect, based on a search requested of the disambiguator circuit, no address conflict between the store operation and the succeeding load operation; and issue the load operation to the memory without waiting for completion of the store operation.

13. The memory ordering circuit of claim 10, wherein the set of input queues further comprises a load address queue to receive the first address, from the acceleration hardware, for a load operation that succeeds the store operation, further comprising:

a completion queue coupled to the operations manager circuit and to the memory, the completion queue to enqueue data received for completion of the load operation; and a dependency queue coupled to the acceleration hardware and to receive, from the acceleration hardware, a dependency token associated with the first address for the load operation, the dependency token indicating a dependency on the first data to be stored by the store operation.

14. The memory ordering circuit of claim 13, wherein the completion queue is a ring buffer.

15. The memory ordering circuit of claim 13, wherein operations manager circuit is further to:

detect, based on a search requested of the disambiguator circuit, an address conflict between the load operation and the store operation;

retrieve the pointer from the disambiguator queue; and annotate an indexed slot of the completion queue with the location of the pointer, to schedule issuance of the load operation upon receipt of the data at the location in the store data queue.

16. The memory ordering circuit of claim 15, wherein the operations manager circuit is further to:

detect arrival of the first data at the location of the pointer into the store data queue; and enqueue the data, from the location in the store data queue, into the indexed slot of the completion queue, to thereby complete data forwarding to the load operation.

17. The memory ordering circuit of claim 13, further comprising an operations queue coupled to the operations manager circuit and to the memory interface, the operations queue to buffer the load operation and the store operation, wherein the operations manager circuit is further to, responsive to an indicator field in each of the store operation and the load operation being set to the first value:

direct the disambiguator circuit to store the entry for the store operation; and check the disambiguator circuit for an address conflict between the store operation and the load operation.

18. The memory ordering circuit of claim 10, wherein the operations manager circuit is further to:

trigger generation of a dependency token to indicate, to a succeeding dependent memory operation, a dependency on the data stored by the store operation; and in response to detecting receipt of the first data into the store data queue, issue a store command containing the dependency token directed to the first address in the memory.

19. A method comprising:

queuing memory operations in an operations queue of a memory ordering circuit, the memory operations directed towards a memory and in association with acceleration hardware, wherein the queuing includes queuing a load operation of the memory operations in the operations queue and the load operation comprises an indicator field that when set to a first value causes a query of a disambiguator circuit and when set to a second value does not cause the query of the disambiguator circuit;

receiving, into a load address queue of a set of input queues, a load address received from the acceleration hardware for the load operation;

determining, by the disambiguator circuit coupled to the memory ordering circuit, when the indicator field of the load operation is set to the first value, the load address matches a store address buffered in a store address queue for a store operation of the memory operations, the store operation semantically preceding the load operation according to program order; and marking, by the memory ordering circuit to schedule completion of the load operation and in response to the determining, the load operation as a store forward with a pointer to a location, within a store data queue of the set of input queues, for reception of data to complete the store operation and the load operation.

20. The method of claim 19, further comprising:

scheduling the store operation to issue to the memory upon receipt of the store address; and storing an entry in a disambiguator queue of the disambiguator circuit, the entry comprising the store address and the pointer.

21. The method of claim 20, further comprising:

storing the data in the disambiguator queue in association with the entry, in response to receiving the data into the store data queue; and retaining the data, in the disambiguator queue, to be forwarded to a subsequent memory operation that succeeds the load operation.

22. The method of claim 20, further comprising, in response to receiving the data into the location of the store data queue:
- copying the data, from the location in the store data queue, into an indexed slot of a completion queue for the load operation;
- issuing the store operation to the memory to complete the store operation; and
- sending the data, from the completion queue, to the acceleration hardware in response to the load operation.

23. The method of claim 22, further comprising retaining the data, in the store data queue, after completion of the store operation, to fulfill at least a second load operation.

24. The method of claim 22, further comprising:
- receiving, in a dependency queue of the set of input queues, a dependency token associated with the load address buffered in the load address queue, the dependency token indicating dependency on the data stored by the store operation;
- duplicating the dependency token for a subsequent memory operation that is dependent on the load operation; and
- wherein the sending the data to the acceleration hardware further comprises sending the dependency token with the data to the acceleration hardware, to complete the load operation.

* * * * *